United States Patent
Mehouachi

(10) Patent No.: US 12,175,371 B1
(45) Date of Patent: Dec. 24, 2024

(54) METHODS, SYSTEMS, APPARATUSES, AND DEVICES FOR FACILITATING SIFR OPTIMIZER-BASED EFFICIENT NEURAL NETWORK TRAINING

(71) Applicant: Fares Mehouachi, Gaafour (TN)

(72) Inventor: Fares Mehouachi, Gaafour (TN)

( * ) Notice: Subject to any disclaimer, the term of this patent is extended or adjusted under 35 U.S.C. 154(b) by 0 days.

(21) Appl. No.: 18/637,184

(22) Filed: Apr. 16, 2024

Related U.S. Application Data

(63) Continuation-in-part of application No. 18/483,998, filed on Oct. 10, 2023, now Pat. No. 11,983,635.

(51) Int. Cl.
*G06N 3/04* (2023.01)
*G06N 3/084* (2023.01)

(52) U.S. Cl.
CPC .............. *G06N 3/084* (2013.01); *G06N 3/04* (2013.01)

(58) Field of Classification Search
CPC .................................. G06N 3/084; G06N 3/04
See application file for complete search history.

(56) References Cited

U.S. PATENT DOCUMENTS 11,551,416 B1 * 1/2023 Mehouachi ............. G06T 17/05

OTHER PUBLICATIONS

Mehouachi et al ("Exact Stochastic Second Order Deep Learning" Apr. 2021) (Year: 2021).*
Chazal et al ("Regularized Training of the Extreme Learning Machine using the Conjugate Gradient Method" 2017) (Year: 2017).*

* cited by examiner

*Primary Examiner* — Lut Wong

(57) ABSTRACT

A method using the Sifr optimizer for training a neural network model having layers and parameters comprises providing an input corresponding to each of samples comprised in a batch from a training dataset to an input layer, obtaining outputs from the neural network model, calculating a loss function for each of the samples based on the outputs and corresponding desired values, and determining values of the parameters for minimizing a mismatch between the outputs and the corresponding desired values across the samples for the parameters based on the loss function. Further, the determining of the values for the parameters comprises executing at least one of forward passes and backward passes through the neural network model, obtaining a curvature data based on the executing, obtaining a Sifr update based on the data. The determining of the values for the parameters is based on the Sifr update.

18 Claims, 37 Drawing Sheets

METHODS, SYSTEMS, APPARATUSES, AND DEVICES FOR FACILITATING SIFR OPTIMIZER-BASED EFFICIENT NEURAL NETWORK TRAINING

REFERENCE TO RELATED APPLICATIONS

This application is a continuation in part of U.S. Pat. No. 11,983,635 titled "Methods, Systems, Apparatuses, and Devices for Sifrian-Based Neural Network Training", filed Oct. 10, 2023, which is incorporated by reference herein in its entirety.

FIELD OF THE INVENTION

Generally, the present disclosure relates to the field of machine learning, particularly focusing on methods, systems, and computer-readable media designed for the statistical learning and neural network training process utilizing efficient variants of the Sifr optimizer. More specifically, the present disclosure relates to methods, systems, apparatuses, and devices for facilitating Sifr optimizer-based efficient neural network training.

BACKGROUND OF THE INVENTION

Neural networks, integral to the fields of machine learning and Artificial Intelligence (AI), primarily depend on an iterative learning process that employs gradient-descent algorithms and backpropagation. Backpropagation is a sequence of differentiation operations that simplifies gradient estimation, acting as the core of most descent algorithms to update network weights and biases. This, in turn, minimizes discrepancies between the desired and the actual output of the neural network.

Conventional methods for neural network training encounter significant inefficiencies, particularly when dealing with expansive datasets and highly parameterized models. While first-order methods such as Stochastic Gradient Descent (SGD) and ADAptive Moment estimation (ADAM) prevail as industry standards, they lack the required efficiency, especially for training substantial foundational models. Such models incur exorbitant costs, prolonged training durations, and consequential environmental impacts. The pressing need for more effective technologies has led to second-order training methods, which theoretically offer solutions but are beset by practical challenges. These challenges have been substantially mitigated by the innovative techniques disclosed in U.S. patent application Ser. No. 18/483,998, entitled "Methods, Systems, Apparatuses, and Devices for Sifrian-Based Neural Network Training". Despite these advancements, the aforementioned application acknowledges the use of dimensionality reduction to curb computational demands. The question remains whether the original Sifr optimizer's dimensionality reduction can be bypassed, unlocking further acceleration and performance enhancements. These enhancements are imperative to advancing the fields of Machine Learning and AI, as underscored by the ever-increasing computational demands and the quest for breakthrough efficiencies in neural network training.

Therefore, there is a need for improved methods, systems, apparatuses, and devices for facilitating Sifr optimizer-based efficient neural network training that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for training a neural network model having a plurality of layers comprising an input layer, at least one middle layer, one or more output layers, and a plurality of parameters commonly referred to as weights and biases, in accordance with some embodiments. Accordingly, the method may include a step of providing an input to the input layer. Further, the input corresponds to each of a plurality of samples comprised in a batch from a training dataset. Further, the method may include a step of obtaining one or more outputs from the neural network model based on the input. Further, the method may include a step of calculating a loss function for each of the plurality of samples comprised in the batch based on the one or more outputs and one or more corresponding desired values for each of the plurality of samples comprised in the batch. Further, the method may include a step of determining a plurality of values for the plurality of parameters based on the loss function. Further, the plurality of values for the plurality of parameters minimizes a mismatch between the one or more outputs and the one or more corresponding desired values across the plurality of samples comprised in the batch. Further, the determining of the plurality of values for the plurality of parameters may include executing at least one of one or more forward passes and one or more backward passes through the neural network model. Further, the determining of the plurality of values for the plurality of parameters may include obtaining at least curvature data based on the executing of at least one of the one or more forward passes and the one or more backward passes. Further, the at least one curvature data may include, but is not limited to, covariance or Gram matrices of per-sample gradients, alongside their feasible approximations such as diagonal or block-diagonal matrices. Further, the determining of the plurality of values for the plurality of parameters may include obtaining at least one Sifr update based on the at least one curvature data. Further, the determining of the plurality of values for the plurality of parameters may be further based on the at least one Sifr update.

Further disclosed herein is a method for training a neural network model having a plurality of layers comprising an input layer, at least one middle layer, one or more output layers, and a plurality of parameters commonly referred to as weights and biases, in accordance with some embodiments. Accordingly, the method may include a step of providing an input to the input layer. Further, the input corresponds to each of a plurality of samples comprised in a batch from a training dataset. Further, the method may include a step of obtaining one or more outputs from the neural network model based on the input. Further, the method may include a step of calculating a loss function for each of the plurality of samples comprised in the batch based on the one or more outputs and one or more corresponding desired values for each of the plurality of samples comprised in the batch. Further, the method may include a step of determining a plurality of values for the plurality of parameters based on the loss function. Further, the plurality of values for the plurality of parameters minimizes a mismatch between the one or more outputs and the one or more corresponding desired values across the plurality of samples comprised in the batch. Further, the determining of the plurality of values for the plurality of parameters may include executing at least one of one or more forward passes and one or more backward passes through the neural network model. Further, the determining of the plurality of values for the plurality of parameters may include obtaining at least one curvature data based on the executing of at least one of the one or more forward passes and the one or more backward passes. Further, the at least one curvature data may include, but is not limited to, covariance or Gram matrices of per-sample gradients, alongside their feasible approximations such as diagonal or block-diagonal matrices. Further, the obtaining of the at least one curvature data may include performing a Gram-backpropagation for the batch based on traversing the neural network model during the one or more backward passes and obtaining a Gram matrix or one or more approximations similar to the Gram matrix for the batch based on the performing of the Gram-backpropagation or one or more variations of the Gram-backpropagation. Further, the determining of the plurality of values for the plurality of parameters may include obtaining at least one Sifr update based on the at least one curvature data. Further, the obtaining of the at least one Sifr update may be based on the covariance matrix, the Gram matrix, and the various approximations of the covariance matrix and the Gram matrix. Further, the determining of the plurality of values for the plurality of parameters may be based on the at least one Sifr update.

Further disclosed herein is a neural network model comprising a plurality of layers comprising an input layer, at least one middle layer, one or more output layers, and a plurality of parameters commonly referred to as weights and biases, in accordance with some embodiments. Further, the neural network model may be trained using a method. Further, the method may be a loss-reducing training method. Further, the method may include providing an input to the input layer. Further, the input corresponds to each of a plurality of samples comprised in a batch from a training dataset. Further, the method may include obtaining one or more outputs from the neural network model based on the input. Further, the method may include calculating a loss function for each of the plurality of samples comprised in the batch based on the one or more outputs and one or more corresponding desired values for each of the plurality of samples comprised in the batch. Further, the method may include determining a plurality of values for the plurality of parameters based on the loss function augmented if needed with various regularizations. Further, the plurality of values for the plurality of parameters minimizes a mismatch between the one or more outputs and the one or more corresponding desired values across the plurality of samples comprised in the batch. Further, the determining of the plurality of values for the plurality of parameters may include executing at least one of one or more forward passes and one or more backward passes through the neural network model. Further, the determining of the plurality of values for the plurality of parameters may include obtaining at least one curvature data based on the executing of at least one of the one or more forward passes and the one or more backward passes. Further, the at least one curvature data may include, but is not limited to, covariance or Gram matrices of per-sample gradients, alongside their feasible approximations such as diagonal or block-diagonal matrices. Further, the determining of the plurality of values for the plurality of parameters may include obtaining at least one Sifr update based on the at least one curvature data. Further, the determining of the plurality of values for the plurality of parameters may be based on the at least one Sifr update.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
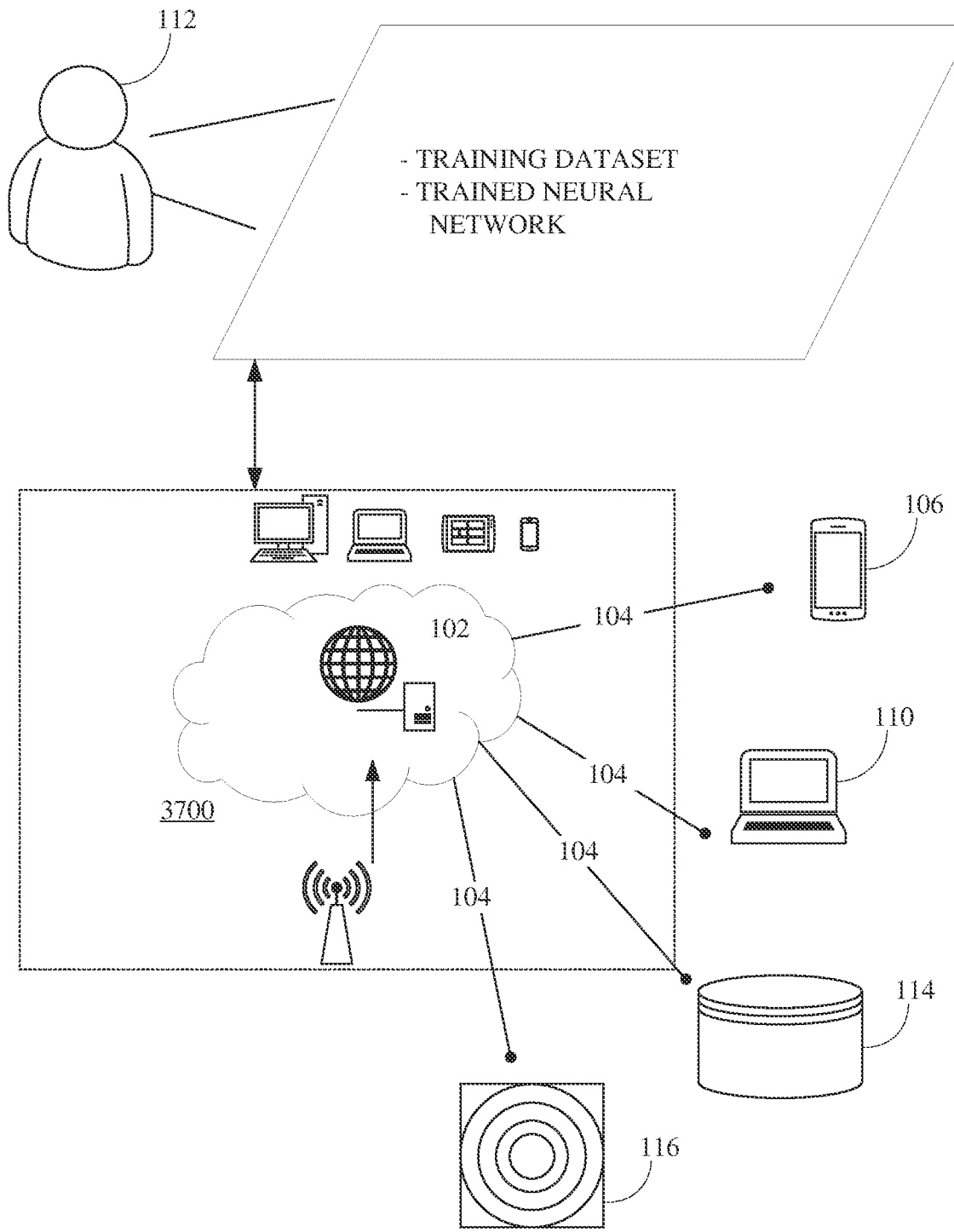
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one" but does not exclude a plurality unless the contextual use dictates otherwise. When used herein to join a list of items, "or" denotes "at least one of the items" but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating Sifr optimizer-based efficient neural network training, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet or a cloud computing infrastructure. In some other embodiments, the method may be performed by one or more of at least one server computer, at least one client device, and at least one network device. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable data (e.g., username, password, passphrase, PIN, secret question, secret answer, etc.) and/or possession of a machine readable secret data (e.g., encryption key, decryption key, bar codes, etc.) and/or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices, and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed in parallel, at least in part using a distributed architecture. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview—Parent Patent (U.S. patent application Ser. No. 18/483,998):

The present disclosure describes methods, systems, apparatuses, and devices for facilitating Sifr optimizer-based efficient neural network training.

Further, the present disclosure describes a method for training a neural network model (a neural network). Further, the present disclosure describes a method termed the 'Sifr optimizer', designed to integrate seamlessly into the training procedure of neural networks to expedite their training process. Further, the Sifr optimizer is a unique solution derived from a novel interpretation of the Sifrian system of equations in a general setting. The Sifrian, a second-order Lagrangian, intertwines three essential elements of neural network training, the forward pass, backpropagation, and gradient definition updates into a unified functional. This unification yields a comprehensive characterization of the second-order Newton direction, after various differentiations. Further, the method is a solution for batch training scenarios, paving the way for more efficient and practical neural network training.

Further, the Sifr optimizer disclosed in the present disclosure leverages the Sifrian system's insights to deliver a novel efficient second-order update of neural network parameters in batch cases. This innovative approach occupies a unique position at the midpoint between the traditional Gauss-Newton method and the Natural Gradient method. Distinct from both, it has demonstrated superior performance to the industry benchmark, ADAM and SGD (Stochastic Gradient Descent) with momentum, in terms of computational time efficiency. Additionally, its theoretical foundation is presented and supported in this document. This second-order update allows for a more accurate and efficient adjustment of the neural network parameters, leading to faster convergence and enhanced training performance. Further, the Sifr optimizer exhibits versatility, applicable across a wide range of neural network types and machine learning tasks, from simple classification problems to intricate deep learning applications. Despite the complexity of the underlying mathematics, the implementation of the Sifr optimizer does not significantly elevate computational complexity, making it a viable choice for a myriad of machine learning scenarios.

Further, the present disclosure describes methods for training neural networks (or neural network models) by implementing the Sifr optimizer. Further, one or more steps of the methods are performed using the Sifr optimizer.

Further, the Sifr optimizer implements the process of neural network training for a neural network. Further, the neural network is regarded as a function $f$, which takes an input $x_{0,p}$, (with '0' signifying the input layer) and generates an output $x_{n,p}$, (where 'n' signifies the output layer). The p index designates a specific sample from a batch of the training dataset and falls within the set $p \in \{1, \ldots, n_B\}$, where $n_B$ represents the batch size. The parameters of the network, including weights, biases, and other factors, are collectively symbolized as $\theta$. The neural network's forward pass involves processing the inputs $x_{n,p} = f(x_{0,p}; \theta)$ and calculating the loss function $\ell(x_{n,p}, y_p)$. Here, $y_p$ is the desired output or label for the sample p. The training process entails discovering an optimal $\theta$ that minimizes mismatches, captured by the expression $\mathrm{argmin}_\theta \mathbb{E}_{p \sim D}[\ell(f(x_{0,p}; \theta), y_p)]$ or through its Empirical Risk Minimization (ERM) formulation $$\mathrm{argmin}_\theta \frac{1}{n_B} \sum_p \ell(f(x_{0,p}; \theta), y_p).$$

This equation essentially outlines the pursuit of the ideal $\theta$ that reduces the collective mismatch between the network's output and the desired output across all samples in a batch. Gradient based method relies essentially on the backpropagation to compute the gradient $\nabla_\theta \ell$. An estimation of the gradient is given by the chain rule:

$$\nabla_\theta \ell = \frac{1}{n_B} \sum_p \left(\frac{dx_{n,p}}{d\theta}\right) \frac{\partial \ell}{\partial x_{n,p}}.$$

The derivative $$\frac{\partial \ell}{\partial x_{n,p}}$$

is easy to compute and it is often done with an analytic expression. The quantity $$\left(\frac{dx_{n,p}}{d\theta}\right)$$

is called the Jacobian and its computation is a bottleneck that is avoided through the concept of backpropagation. $\ell$ is a scalar, $\theta$ is a vector, $$\frac{\partial \ell}{\partial x_{n,p}}$$

is a vector with the same dimension as $x_{n,p}$ and $$\left(\frac{dx_{n,p}}{d\theta}\right)$$

is a matrix (rank 2 tensor) with a row number similar to the dimension of $\theta$ and a column number similar to $x_{n,p}$.

Further, the principles of backpropagation and the Sifrian system are illustrated using an example of a feedforward neural network. In this context, the neural network graph is a straight line, where each layer connects to at most two other layers—the ones immediately preceding and following it—excluding the input and output layers. The parameters $\theta$ for a feedforward network generally consist of a sequence of weight matrices and bias vectors, symbolized as $\theta = \{W_k, \beta_k\}_{k=1\ldots n}$. The transition between layers, or the forward model, is expressed as: $x_{k,p} = \sigma(W_k x_{k-1,p} + \beta_k)$, where $\sigma$ denotes an activation function like the sigmoid function or the Rectified Linear Unit (ReLU) function. Although neural networks can incorporate more complex components such as skip connections, convolutions, attention heads, or recurrent connections, the basic principles explained using the feedforward case still apply. These principles can extend to more sophisticated scenarios, provided that the neural network graph is directed and acyclic—in other words, there is a clear direction through the network's graph, which enables the calculation of backpropagated errors. The gradient could be computed using the Lagrangian, as training neural networks could be framed as a constrained minimization problem. The Lagrangian L multiplies each step of the forward model with a multiplier $\lambda_{k,p}$, using an inner product and adding the loss function l. $L(x, W, \beta) = \ell + \Sigma_{k,p} \langle x_{k,p} - \sigma(W_k x_{k-1,p} + \beta_k), \lambda_{k,p} \rangle$, if the forward model is verified then the Lagrangian is equal to the loss function $L = \ell$. The multipliers' values are flexible, and values that simplify the task of efficiently computing the gradient are selected. Then the Lagrangian is differentiated with respect to the weights and biases to obtain:

$$\begin{cases} \frac{dL}{dW_k} = \frac{\partial L}{\partial W_k} + \sum_{p,l} \frac{dx_{l,p}}{dW_k} \frac{\partial L}{\partial x_{l,p}}, \\ \frac{dL}{d\beta_k} = \frac{\partial L}{\partial \beta_k} + \sum_{p,l} \frac{dx_{l,p}}{d\beta_k} \frac{\partial L}{\partial x_{l,p}}, \end{cases} \forall k \in \{1 \ldots n\}.$$

If the multipliers $\lambda_{k,p}$ is selected such that $$\frac{\partial L}{\partial x_{l,p}} = 0,$$

for all values of p and for all layers then the complicated terms in the above expression can be removed to obtain $$\frac{dL}{dW_k} = \frac{\partial L}{\partial W_k} \text{ and } \frac{dL}{d\beta_k} = \frac{\partial L}{\partial \beta_k},$$

which are straightforward to compute. This approach yields the following backpropagation system:

$$\frac{\partial L}{\partial x_{p,k}} = 0 \to \lambda_{k,p} - 1_{k<n} W_{k+1}^T \nabla \sigma_{k+1,p} \lambda_{k+1,p} + 1_{k=n} \frac{\partial \ell}{\partial x_{n,p}} = 0.$$

The term $\nabla \sigma_{k+1,p}$ correspond to the derivative of the activation function at the layer k+1, when evaluating the sample p. The above equation is solved backward starting from the output layer, hence the name backpropagation. The gradient is given by:

$$\begin{cases} \nabla_{W_k} \ell = \frac{\partial L}{\partial W_k} = -\sum_p \nabla \sigma_{k,p} \lambda_{k,p} x_{k-1,p}^T, \\ \nabla_{\beta_k} \ell = \frac{\partial L}{\partial \beta_k} = -\sum_p \nabla \sigma_{k,p} \lambda_{k,p}, \end{cases} \forall k \in \{1 \ldots n\}.$$

The Sifrian system, conceptualized by Mehouachi and Kasmi (Mehouachi, Fares B., and Chaouki Kasmi. "Exact Stochastic Second Order Deep Learning." arXiv preprint arXiv:2104.03804 (2021); and "Exact Stochastic Newton Method for Deep Learning: the feedforward networks case." (2021), offered a significant advancement but had a limitation. Its original formulation solved only for a single pattern at a time, which is not particularly practical. The general case of a mini-batch, more relevant in real-world applications, remained unsolved until recently in the U.S. patent application Ser. No. 18/483,998, titled "Methods, Systems, Apparatuses, and Devices for Sifrian-Based Neural Network Training". This application is a continuation in part of the aforementioned patent. The Sifrian system, which derives its name from the Arabic word 'Sifr' for zero, for a feedforward network, can be expressed as follows:

$$S(x, \lambda, N, \eta, \gamma, \zeta, \nabla_{W_k} \ell, \nabla_{\beta_k} \ell,) = \sum_{k,p} \langle x_{k,p} - \sigma(W_k x_{k-1,p} + \beta_k), \gamma_{k,p} \rangle +$$

$$\left\langle \lambda_{k,p} - 1_{k<n} W_{k+1}^T \nabla \sigma_{k+1,p} \lambda_{k+1,p} + \frac{\partial \ell}{\partial x_{k,p}}, \zeta_{k,p} \right\rangle +$$

$$\left\langle \nabla_{W_k} \ell + \sum_p \nabla \sigma_{k,p} \lambda_{k,p} x_{k-1,p}^T, N_k \right\rangle + \langle \nabla \sigma_{k,p} \lambda_{k,p}, \eta_k \rangle.$$

The Sifrian introduces four new sets of multipliers ($\gamma_{k,p}$, $\zeta_{k,p})_{k,p}$ and $(N_k, \eta_k)_k$, which needs to be determined to characterize the Newton update. Notably, the Sifrian is always null when the forward, backward, and gradient definitions are verified, implying that all of its derivatives are also null. Differentiation with respect to weights and biases leads to the following equation:

$$\begin{cases} \frac{dS}{dW_k} = 0 = \frac{\partial S}{\partial W_k} + \sum_{p,l} \frac{dx_{l,p}}{dW_k} \frac{\partial S}{\partial x_{l,p}} + \frac{d\lambda_{l,p}}{dW_k} \frac{\partial S}{\partial \lambda_{l,p}} + \sum_m \frac{d\nabla_{W_m} \ell}{dW_k} \frac{\partial S}{\partial \nabla_{W_m} \ell} + \frac{d\nabla_{\beta_m} \ell}{dW_k} \frac{\partial S}{\partial \nabla_{\beta_m} \ell}, \\ \frac{dS}{d\beta_k} = 0 = \frac{\partial S}{\partial \beta_k} + \sum_{p,l} \frac{dx_{l,p}}{d\beta_k} \frac{\partial S}{\partial x_{l,p}} + \frac{d\lambda_{l,p}}{d\beta_k} \frac{\partial S}{\partial \lambda_{l,p}} + \sum_m \frac{d\nabla_{W_m} \ell}{d\beta_k} \frac{\partial S}{\partial \nabla_{W_m} \ell} + \frac{d\nabla_{\beta_m} \ell}{d\beta_k} \frac{\partial S}{\partial \nabla_{\beta_m} \ell}, \end{cases}$$

The terms $$\left( \frac{d\nabla_{W_m} \ell}{dW_k}, \frac{d\nabla_{\beta_m} \ell}{dW_k}, \frac{d\nabla_{\beta_m} \ell}{d\beta_k} \right)$$

correspond to the building blocks of the sought after Hessian. Similar to the Lagrangian approach, the multipliers are selected to create the well-known Newton equation $$(\nabla_\theta^2 \ell) \begin{bmatrix} N \\ \eta \end{bmatrix} = \nabla_\theta \ell.$$

In this case, the multipliers N and η are the second order-update. Such a characterization is equivalent to the following equations:

$$\begin{cases} \frac{\partial S}{\partial x_{l,p}} = 0, & \frac{\partial S}{\partial \lambda_{l,p}} = 0, \forall l \in \{1 \ldots n\}, \forall p, \\ \frac{\partial S}{\partial W_k} = -\nabla_{W_k} \ell, & \frac{\partial S}{\partial \beta_k} = -\nabla_{\beta_k} l, \forall k \in \{1 \ldots n\}, \end{cases}$$

For clarity and to avoid complex formulas, σ is considered to be a piece-wise affine activation function. The above system translates to equations on the new multipliers, yielding four types of equations collectively referred to as the Sifrian system or Sifrian equations (Mehouachi, Fares B., and Chaouki Kasmi. "Exact Stochastic Second Order Deep Learning." arXiv preprint arXiv:2104.03804 (2021); and "Exact Stochastic Newton Method for Deep Learning: the feedforward networks case." (2021))

$$\begin{cases} \sum_p \nabla \sigma_{k,p} (\gamma_{k,p} x_{k-1,p}^T + \lambda_{k,p} x_{k-1,p}^T + 1_{k>1} \lambda_{k,p} \zeta_{k-1,p}^T) = 0, \\ \sum_p \nabla \sigma_{k,p} (\gamma_{k,p} + \lambda_{k,p}) = 0, \\ \gamma_{k,p} - 1_{k<n} W_{k+1}^T \nabla \sigma_{k+1,p} \gamma_{k+1,p} + \\ 1_{k=n} \frac{\partial^2 \ell}{\partial x_{n,p}^2} \zeta_{n,p} + 1_{k<n} N_{k+1}^T \nabla \sigma_{k+1,p} \lambda_{k+1,p} = 0, \forall p, \\ \zeta_{k,p} - 1_{k>1} \nabla \sigma_{k,p} W_k \zeta_{k-1,p} + \nabla \sigma_{k,p} (N_k x_{k-1,p} + \eta_k) = 0, \forall p, \end{cases}$$

The Hessian matrix could be expressed as $$\nabla_\theta^2 \ell = \sum_p \left( \frac{dx_{n,p}}{d\theta} \right) \frac{\partial^2 \ell}{\partial x_{n,p}^2} \left( \frac{dx_{n,p}}{d\theta} \right)^T + \left( \frac{d^2 x_{n,p}}{d\theta^2} \right) \frac{\partial \ell}{\partial x_{n,p}}.$$

The T corresponds to the transposition operator. The Gauss-Newton approximation leads to a positive estimation of the Hessian as follows:

$$\nabla_\theta^2 \ell \sim \frac{1}{n_B} \sum_p \left(\frac{dx_{n,p}}{d\theta}\right) \frac{\partial^2 \ell}{\partial x_{n,p}^2} \left(\frac{dx_{n,p}}{d\theta}\right)^T.$$

The Gauss-Newton method, notably as it is essentially one Jacobian calculation away from the Sifr optimizer. Unlike the Gauss-Newton approach, which is derived via truncation. The Sifr optimizer innovatively incorporates previously overlooked quadratic terms.

Mehouachi and Kasmi (2021) introduced the Sifrian system of equations, which delineates the dynamics of the Newton update with a level of granularity surpassing that of Pearlmutter's R-operator. However, solving this system has proven challenging. Until now, the solution has only been found in the narrow context of online training, where a single sample 'p' is considered. Yet, these online learning results are easily outdone by traditional methods such as stochastic gradient descent with momentum.

In the practical world of neural network training, a batch of data, i.e., multiple samples, is processed simultaneously, and a comprehensive solution to the Sifrian system in this context has remained elusive. The present disclosure describes a process for solving the Sifrian system that encompasses various strategies, including but not limited to a convexity correction, damping, dimensionality reduction, and direct or iterative solving.

Further, the Sifr optimizer disclosed in the present disclosure is a novel tool designed for the efficient training of neural networks using batches of training data. The optimizer's core component is an innovative resolution of the Sifrian system in batch cases. The Sifrian is a functional, inspired by the Lagrangian, that uniquely consolidates the forward pass, backpropagation, and gradient update into one unified functional. Contrasting the Lagrangian, the Sifrian excludes the loss function and introduces second-order adjoint variables. When chosen strategically, these variables lead to a precise and efficient characterization of the second-order update, which is called the Sifrian equation of Sifrian system. The term "Sifr", translating to "zero" in Arabic, was chosen because the Sifrian functional and its differentials remain zero throughout the training of neural networks, embodying the essence of this innovative approach. The term "Sifrian" originates from the Arabic word "sifr-ain" (roughly means Two-Zero), which highlights the unique feature of the functional that becomes null when both forward and backward equations are met, in both its original form and its derivative. The Sifrian functional and the Sifr optimizer application in this patent are inspired by this mathematical property, leveraging the idea of "Inversion of the Two-Zero" equations in neural network optimization. The main innovation is the resolution of the complex Sifrian system in the batch scenario and building the Sifr optimizer around it for efficient neural network training.

Further, the present disclosure describes a method to optimize neural network learning. This method includes establishing the neural network with its associated parameters, such as weight matrices and bias vectors, formulating a loss function for error minimization, and integrating the gradient computed via backpropagation into the Sifrian characterization of the second order Newton update. Building the second order characterization involves differentiating the Sifrian functional to derive the co-adjoint equations for the forward and backward pass, as well as equations for second-order parameter updates. The main novelty of the Sifr optimizer is the resolution in the batch case. Through a process of judicious selection, the Sifrian system simplifies to a singular pivotal equation. To address the potential ill-conditioning of this key equation, damping is included. Depending on the model size, this equation can be directly inverted or sketched to reduce dimensionality before a direct solver or iterative solver can be used to deduce the Sifr update.

Further, the present disclosure describes a system for optimizing the learning process of neural networks. This system comprises a computing device and memory storage. The computing device is programmed to execute the method outlined above, with the memory storage configured to store the network parameters. These parameters are continually updated through the Sifr optimizer. The name "Sifr" was selected for this optimizer to underline its unique methodology and features. Translating to "zero" in Arabic, "Sifr" reflects the optimizer's dependence on a null functional to derive a second-order update. While the fundamental structure of the Sifr optimizer takes inspiration from the Newton method, the significant modifications implemented ensure it stands distinct. This substantial divergence justifies its distinct identity—the Sifr optimizer.

Further, the present disclosure describes systems, methods, and computer-readable media pertaining to the application of the Sifr Optimizer within machine learning paradigms. This optimizer capitalizes on curvature information to determine efficient second-order updates during the batch training process of neural networks. Deriving its approach from the Sifrian—a Lagrangian-like function—the Sifr Optimizer enables a detailed and intricate second-order characterization of the Newton direction. The Sifrian formulates a set of equations that capture the essence of the Newton update without involving the Hessian matrix directly. The Sifr Optimizer, a product of this system, is distilled to a single essential equation through a process of careful selection and differential considerations. This equation can be solved directly or further 'sketched' to yield a dimensionally reduced representation of the sought second-order update. The inversion process can be simplified using damping and an efficient estimation of the Gram matrix derived from this pivotal equation. Given the relatively smaller size of batches compared to parameter count in modern neural networks, this innovative approach allows for highly efficient neural network parameter updates. It provides a solution to the slow convergence issues linked to traditional gradient descent methods. Notably, the Sifr Optimizer, though drawing inspiration from the Newton method, distinguishes itself with enhanced computational resource efficiency and speed.

Further, the present disclosure describes a method for neural network training. The method incorporates collecting training, testing, and validation datasets, initializing network parameters such as weights and biases, executing forward passes on complete or batched training datasets, and iteratively updating the model. The model updating process continues until the network output aligns with a predetermined output within a specified threshold or after a certain number of iterations. This model and the associated optimization problem feature a loss function. The model, i.e., the neural network parameters, is iteratively updated based on the Sifr optimizer, which induces an exact Newton update at the output layer and deduces parameter perturbations facilitating this correction. This unique methodology, derived from the Sifrian functional which unifies the forward and backward passes of the neural network along with the gradient definition, dramatically contrasts with the original Newton method where the gradient is adjusted by neural network-wide curvature. The Sifrian functional, equal to zero when the forward and backward passes and gradient align with their neural network values, excludes the loss function, which measures output layer discrepancies. The method further includes generating network predictions with the updated model for performance evaluation.

Further, the present disclosure describes a method for neural network training involving a computing system. The system receives training data and commences the process of training a neural network. This process requires initializing parameters to evade null updates. The training process further involves generating output data, comparing it to the desired output, and verifying if the mismatches are within a tolerance threshold. The Sifrian functional is employed to fully characterize the second-order Newton direction, thereby guiding the optimization and inference of the neural network parameters. The Sifr optimizer builds on the Sifrian functional to provide a manageable and efficient solution. The training process further includes iteratively refining the model, using updates supplied by the Sifr optimizer, until the prediction data corresponds with the desired data within the predetermined tolerance threshold.

Further, the present disclosure describes a machine learning apparatus purposefully designed for training neural networks. This apparatus comprises an interface and a data processing unit. The interface is engineered to receive, accept, and store datasets, which serve as resources for training, validating, and testing the neural network. The stored data contributes to the learning process, enabling the improvement of neural network performance over time. The data processing unit, interconnected with the interface, oversees the execution of the model updating routine and manages any required synchronization. It is designed to generate prediction data by propagating an input sample through the trained neural network. Subsequently, the data processing unit utilizes a predetermined loss function to assess the disparity between the predicted output and the desired output. Should the deviation between these two datasets surpass a predefined tolerance threshold, this event initiates the continuation of the updating sequence. The data processing unit employs these quantified mismatches to iteratively refine the initial model and all subsequent updates using the Sifr optimizer. This iterative refinement continues until the predicted output closely approximates the desired output. The desired output can take various forms, ranging from classification labels to the input data itself for autoencoder models, and from text for language generation models to other outputs, depending on the task. In facilitating these iterative updates, the data processing unit resolves the Sifr pivotal equation, which incorporates a damping term to handle potential ill-conditioning. The data processing unit is also equipped with a solver for the Sifr update, which delivers an enhanced model that minimizes the mismatch between the predicted and actual data. The specific solver used can vary and may employ techniques such as but not limited to the Cholesky solver, iterative conjugate gradient, or Gauss-Jordan elimination method. The step length of the update is generally substantial, often close to one, which is a common attribute of any Newton-type method. Though the use of a line search strategy is optional, a fixed step length could alternatively be utilized. Ultimately, the data processing unit is designed to execute the iterative process either until the predicted output aligns with the desired output within the tolerance threshold, or until a predefined maximum number of iterations is reached. In machine learning, the gradient is a critical construct. It encapsulates the sensitivity of the model's loss function relative to variations in the model's parameters. Serving as the cornerstone of numerous machine learning algorithms, the gradient steers the modification of model parameters during the training phase, aiming to minimize prediction error. Another essential concept in machine learning is the Hessian, alternatively referred to as the Hessian matrix or the Hessian tensor. The Hessian is a square matrix composed of the second-order partial derivatives of a scalar-valued function or scalar field. As a rank-2 covariant symmetric tensor of second derivatives, the Hessian illustrates the local curvature of a function that involves multiple variables, impacting optimization procedures in machine learning. The Gram matrix plays a pivotal role in machine learning and optimization. This matrix representation captures the inner products of vectors within a set, illustrating the correlation among various data dimensions. By providing a comprehensive understanding of the dataset's geometry, the Gram matrix is an integral component in several machine learning algorithms, such as support vector machines and kernel methods. Computing the gradient using backpropagation is implemented in most modern software using automatic differentiation, which generates the neural network graph and optimizes the execution of the backpropagation algorithm. Estimating the Newton update N i.e., the second-order update is more convolved since the Newton update scales the gradient with the inverse of the Hessian $N = (\nabla_\theta^2 \ell)^{-1} \nabla_\theta \ell$.

Further, the Sifr optimizer is the resolution of the Sifrian system in a batch setting. For feedforward neural networks, the system can be denoted as follows:

$$\begin{cases} (s1) \sum_p \nabla \sigma_{k,p}(\gamma_{k,p} x_{k-1,p}^T + \lambda_{k,p} x_{k-1,p}^T + 1_{k>1} \lambda_{k,p} \zeta_{k-1,p}^T) = 0, \\ (s2) \sum_p \nabla \sigma_{k,p}(\gamma_{k,p} + \lambda_{k,p}) = 0, \\ (s3) \gamma_{k,p} - 1_{k<n} W_{k+1}^T \nabla \sigma_{k+1,p} \gamma_{k+1,p} + \\ \qquad 1_{k=n} \frac{\partial^2 \ell}{\partial x_{n,p}^2} \zeta_{n,p} + 1_{k<n} N_{k+1}^T \nabla \sigma_{k+1,p} \lambda_{k+1,p} = 0, \\ (s4) \zeta_{k,p} - 1_{k>1} \nabla \sigma_{k,p} W_k \zeta_{k-1,p} + \nabla \sigma_{k,p}(N_k x_{k-1,p} + \eta_k) = 0, \end{cases}$$

Solving the Sifrian system requires identifying multipliers $(\gamma_{k,p}, \zeta_{k,p}, N_k, \eta_k)$ that satisfy the aforementioned equations, from which the Newton update will then be informed by $(N_k, \eta_k)$. Such a resolution is difficult because of some missing (neglected) terms in the Newton method.

We provide, a novel explanation of each equation by considering $(N_k, \eta_k)_k$ as parameters perturbation. The last equation s4, quantifies the perturbation of the neural network variables $x_{p,k}$ after introducing the new weights and biases perturbations $(-N_k, -\eta_k)_k$. The input $x_{0,p}$ is not perturbed, $x_{1,p}$ is perturbed by $\delta x_{1,p} = \zeta_{1,p}$ induced only by parameter perturbation $(N_1, \eta_1)$ of the first layer. The second layer perturbation $\delta x_{2,p}$ has two origins due to the perturbation induced by the parameters $(-N_2, -\eta_2)$ and the perturbations due to the previous layer. Essentially, these observations are summarized as $\delta x_{k,p} = \zeta_{k,p}(-N, -\eta)$. The equation s3 does the same perturbation quantification for the Lagrange multiplier i.e., $\delta \lambda_{k,p} = \gamma_{k,p}(-N, -\eta)$. The equations s1 and s2 dictate that the introduced perturbations should cancel the gradient.

Beyond the Sifrian and the R-operator, the Newton method fundamentally looks for an update that cancels the gradient. Nonetheless, upon analyzing the perturbations of the Sifrian, a few missing terms are identified. Essentially, the Newton method is a first-order perturbation of the gradient, designed to cancel it out, and it neglects any product of perturbations. Incorporating these missing products (quadratic) terms from the Sifrian is at the heart of the Sifr optimizer resolution, providing a critical breakthrough in addressing the elusive batch case. The cancellation of the gradient is expressed as follows:

$$\begin{cases} \nabla_{W_k - N_k} \ell = -\sum_p \nabla \sigma_{k,p} (\lambda_{k,p} + \delta\lambda_{k,p})(x_{k-1,p} + \delta x_{k-1,p})^T = 0, \\ \nabla_{\beta_k - \eta_k} \ell = -\sum_p \nabla \sigma_{k,p} (\lambda_{k,p} + \delta\lambda_{k,p}) = 0, \end{cases}$$

The activation function is presumed to be piecewise linear, although a comprehensive development for $C^2$ activation functions can also be developed. Using the results of the perturbation analysis $\delta x_{k,p} = \zeta_{k,p}(-N, -\eta)$ and $\delta\lambda_{k,p} = \gamma_{k,p}(-N, -\eta)$, the following equation is obtained:

$$\begin{cases} (s1e) \; \nabla_{W_k - N_k} \ell = \\ -\sum_p \nabla \sigma_{k,p} \left( \lambda_{k,p} x_{k-1,p}^T + \gamma_{k,p} x_{k-1,p}^T + 1_{k>1} \lambda_{k,p} \zeta_{k-1,p}^T + \underbrace{1_{k>1} \gamma_{k,p} \zeta_{k-1,p}^T}_{\text{missing term}} \right) = 0, \\ (s2e) \; \nabla_{\beta_k - \eta_k} \ell = -\sum_p \nabla \sigma_{k,p} (\gamma_{k,p} + \lambda_{k,p}) = 0, \end{cases}$$

The term absent from the preceding equation was neglected as it represents a second-order perturbation of the gradient, which is not classically incorporated in the Newton method. The introduction of this term signifies a distinctive divergence of the Sifr optimizer from the traditional Newton method. Correspondingly, including the previously omitted terms (now underlined) from equations s3 and s4 results in:

$$\begin{cases} (s3e) \; \gamma_{k,p} - 1_{k<n} W_{k+1}^T \nabla \sigma_{k+1,p} \gamma_{k+1,p} \\ + 1_{k=n} \frac{\partial^2 \ell}{\partial x_{n,p}^2} \zeta_{n,p} + 1_{k<n} N_{k+1}^T \nabla \sigma_{k+1,p} (\lambda_{k+1,p} + \underline{\gamma_{k+1,p}}) = 0 \\ (s4e) \; \zeta_{k,p} - 1_{k>1} \nabla \sigma_{k,p} W_k \zeta_{k-1,p} + \\ \nabla \sigma_{k,p} (N_k (x_{k-1,p} + \underline{\zeta_{k-1,p}}) + \eta_k) = 0, \end{cases}$$

Solving the extended Sifrian system (s1e, s2e, s3e, and s4e) is the foundation of the Sifr optimizer. Creating a perturbation of the adjoint that cancels the adjoint itself, i.e., $(\lambda_{k,p} + \delta\lambda_{k,p}) = 0$, solves immediately the three first equations (s1e, s2e, and s3e) and yields the following reduced system, which is called the pivotal Sifr equation:

$$\begin{cases} \frac{\partial^2 \ell}{\partial x_{n,p}^2} \zeta_{n,p} = -\frac{\partial \ell}{\partial x_{n,p}}, \\ \zeta_{k,p} - 1_{k>1} \nabla \sigma_{k,p} W_k \zeta_{k-1,p} + \nabla \sigma_{k,p} (N_k (x_{k-1,p} + \zeta_{k-1,p}) + \eta_k) = 0. \end{cases}$$

Conceptually, the pivotal Sifr equation attempts to create an exact Newton correction at the output layer only and seeks parameter perturbation that creates such a second-order correction at the last layer. If the second-order parameter perturbation is designated as, $\delta\theta = [N, \eta]$ then in essence The Sifr equation can be stated as follows in the general case:

$$\begin{cases} \frac{\partial^2 \ell}{\partial x_{n,p}^2} \zeta_{n,p} = -\frac{\partial \ell}{\partial x_{n,p}}, \\ \zeta_{n,p} = \left( \frac{dx_{n,p}}{d\theta} \right)^T_{\theta - \delta\theta} S, \end{cases}$$

Another feasible modification involves enforcing the convexity correction explicitly at the output layer, which provides a more condensed formula:

$$\left( \frac{dx_{n,p}}{d\theta} \right)^T_{\theta - \delta\theta} S = -\left( \frac{\partial^2 \ell}{\partial x_{n,p}^2} \right)^{-1} \frac{\partial \ell}{\partial x_{n,p}}$$

This results in an explicit exact Newton update at the final layer.

The quadratic nature of the pivotal Sifr equation, specifically due to the term $N_k \lambda_{k-1,p}$, renders it incompatible with linear solvers. If this quadratic term is ignored and the resulting equation is multiplied by the Jacobian from the right then the Gauss-Newton system is obtained. This step corroborates the pioneering theoretical development underpinning the Sifr optimizer. Notably, both Gauss-Newton and Sifr methodologies address the convexity challenge associated with the Newton method. However, where Gauss-Newton employs truncation, the Sifr optimizer uses the inclusion of high-order terms. Additionally, the Gauss-Newton system typically exceeds the disclosed method in terms of size and computational requirements. The Sifr equation, by reducing the dimensionality of inversion, lays the groundwork for superior performance. The Sifr equation introduces a rectangular system, which can be exploited to solve the problem in a least squares sense. By making an abstraction of the sample p, the following equation is derived $$\frac{\partial^2 \ell}{\partial x_n^2} \left( \frac{dx_{n,p}}{d\theta} \right)^T_\theta S = \frac{\partial \ell}{\partial x_n} + \varepsilon.$$

Here, $\varepsilon$ represents a standard Gaussian error term common in ordinary least squares regression $Ax = b + \varepsilon$, where b and $\varepsilon$ are typically assumed to be independent. Small-scale neural networks could feasibly execute a direct resolution. Alternatively, the Conjugate Gradient Least Squares (CGLS) method would also be an appropriate selection. For a greater performance, a 'natural sketch' is proposed that involves multiplying the regression equation by $$\left( \frac{\partial \ell}{\partial x_n} \right)^T,$$

yielding the primary equation that needs to be solved:

$$\left( \frac{d\ell}{d\theta} \right)^T S = \left( \frac{\partial \ell}{\partial x_n} \right)^T \frac{\partial \ell}{\partial x_n} + \epsilon.$$

If the matrix of convexity corrected gradient $$\left(\frac{d\ell}{d\theta}\right)$$

is full rank, it would possess a right inverse, which allows the Sifr update to be expressed as:

$$S = \frac{d\ell}{d\theta}\left(\left(\frac{d\ell}{d\theta}\right)^T \frac{d\ell}{d\theta}\right)^{-1}\left(\frac{\partial \ell}{\partial x_n}\right)^T \frac{\partial \ell}{\partial x_n} = \frac{d\ell}{d\theta}v.$$

Essentially the complex term $$\left(\left(\frac{d\ell}{d\theta}\right)^T \frac{d\ell}{d\theta}\right)^{-1}\left(\frac{\partial \ell}{\partial x_n}\right)^T \frac{\partial \ell}{\partial x_n}$$

can be reduced to a vector that can be called v. Thus, the quest for the Sifr update could be recast using a Gram matrix $$\left(\frac{d\ell}{d\theta}\right)^T \frac{d\ell}{d\theta}$$

as shown below:

$$\left(\frac{d\ell}{d\theta}\right)^T \underbrace{\frac{d\ell}{d\theta}v}_{\text{Sifr update}} = \left(\frac{\partial \ell}{\partial x_n}\right)^T \frac{\partial \ell}{\partial x_n}.$$

The dimensionality of the problem is significantly reduced from the size of θ (ranging from millions to billions) to the size of v (typically within the hundreds: 64~512). The acceleration of the Sifr optimizer is attributed to this considerable reduction in dimensionality. A variety of methods may be applied for estimating the Gram matrix and conducting the inversion, either directly or iteratively, with or without preconditioning, in an appropriate manner.

Further, another dimensionally reduced version of the Sifr equation, leading to a scalar quantity on the left-hand side is derived. We consider the case when the Newton update is forced on the output layer. Further, the derivation is as follows:

$$\left(\frac{\partial \ell}{\partial \theta}\right)^T = \left(\frac{\partial \ell}{\partial x_n}\right)^T \left(\frac{\partial x_n}{\partial \theta}\right)^T,$$

Gradient Chain Rule (Transposed)

Multiplying $$\left(\frac{\partial \ell}{\partial x_n}\right)^T \text{ to the } \textit{Sifr} \text{ equation } \left(\left(\frac{\partial x_n}{\partial \theta}\right)^T S = \left(\frac{\partial^2 \ell}{\partial x_n^2}\right)^{-1}\left(\frac{\partial \ell}{\partial x_n}\right) + \epsilon\right)$$

results in:

$$\left(\frac{\partial \ell}{\partial x_n}\right)^T \times \left(\left(\frac{\partial x_n}{\partial \theta}\right)^T S = \left(\frac{\partial^2 \ell}{\partial x_n^2}\right)^{-1}\left(\frac{\partial \ell}{\partial x_n}\right) + \epsilon\right)$$

Obtaining the dimensionally reduced Sifr equation based on the multiplication:

$$\left(\frac{\partial \ell}{\partial \theta}\right)^T S = \left(\frac{\partial \ell}{\partial x_n}\right)^T \left(\frac{\partial^2 \ell}{\partial x_n^2}\right)^{-1}\left(\frac{\partial \ell}{\partial x_n}\right) + \epsilon$$

Further, this derivation process is called natural sketching as it makes quantities similar to the empirical Fisher matrix of the Natural Gradient method appear. A convexity correction term in the dimensionally reduced Sifr equation sets apart the Sifr sketched equation (dimensionally reduced Sifr equation) from the Natural Gradient method. The resolution of this sketched equation is designed for lower computational resource consumption, thus increasing efficiency in system performance. The descriptor "natural" is adopted due to the sketching's introduction of terms reminiscent of the Natural Gradient method on the right-hand side of the pivotal Sifr equation. Despite these modifications, the left-hand side of the Sifr pivotal equation maintains its uniqueness, distinguishing it from preceding methodologies. The iterative method employed can take various forms, including but not limited to, conjugate gradient with or without preconditioning. This specific application of the Sifr optimizer sharply contrasts with prior conjugate-gradient based Hessian-free optimizations, which necessitated iterations on the order of the model parameters—potentially reaching millions or billions. In a novel departure, the iterative version of the Sifr optimizer needs a number of iterations lesser than the batch size, enhancing computational efficiency. The versatility of this version of the Sifr optimizer lies in its adaptability to diverse optimization scenarios. For example, it can effectively support extensive datasets while ensuring minimal utilization of computational resources. It delivers a manageable optimization solution. This optimizes system resources, making it the optimizer of choice for demanding neural network training processes, and substantially pushing the boundaries of current Hessian-free optimization methods.

Further, the Sifr equation $$\left(\left(\frac{\partial x_n}{\partial \theta}\right)^T S = \left(\frac{\partial^2 \ell}{\partial x_n^2}\right)^{-1}\left(\frac{\partial \ell}{\partial x_n}\right) + \epsilon\right)$$

uniquely depart from the Newton equation $$\frac{\partial^2 \ell}{\partial \theta^2} N = \frac{\partial \ell}{\partial \theta}.$$

The Sifr equation adopts the ordinary least squares format, thus incorporating an error term, denoted as epsilon. In line with standard practices in the least squares regression, this error term is assumed to represent an isotropic centered Gaussian variable. This pivotal Sifrian equation (Sifr equation) essentially discerns the parameter perturbations that yield an exact Newton update at the output layer only, indicating a distinct conceptual departure from standard Newton methods. Despite its transformative potential, directly solving the Sifrian pivotal equation could be computationally demanding due to its complexity. Notably, the Sifr Equation features a unique left-hand term, corresponding to the Newton step executed at the output layer preceding the loss computation. This special term is a defining characteristic that sets the Sifr optimizer apart from its counterparts.

Further, the present disclosure describes the 'Sifr optimizer', which is a novel solution for enhancing the training process in various types of neural networks, embodied in methods, systems, and computer-readable media for the aforementioned purposes. The optimizer builds upon the Sifrian system-a unified functional that merges the forward pass, backpropagation, and gradient update of neural network training. The Sifr optimizer provides an innovative resolution to the Sifrian system tailored for batch training scenarios, after adding some missing high order terms, which is a crucial advancement in optimization for machine learning. This resolution to the Sifrian system yields an efficient second-order update of model parameters, leading to faster convergence and improved training performance. Despite the underlying mathematical complexity, the Sifr optimizer maintains practical computational demands, making it suitable for diverse machine learning scenarios. The Sifr optimizer offers substantial potential to enrich learning speed, efficiency, and convergence in a broad spectrum of applications within artificial intelligence, machine learning, and data science fields.

Overview—Continuation in Part:

The present disclosure describes a subsidiary significant advancement in the Sifr optimizer, embodying a novel efficient second-order neural network learning method that not only significantly enhances its performance but also circumvents the inherent dimensionality reduction typically needed for performance enhancement. This development is particularly relevant to statistical/Machine learning applications involving large datasets and overparameterized models, where it seeks to improve both the efficiency and efficacy of the optimization process.

Further, the present disclosure describes a novel variant of the Sifr Equation and the Sifr optimizer. While the novel variant of the Sifr Equation and the Sifr optimizer builds on the insights of the original Sifr Equation and the Sifr optimizer as described in the above paragraphs, it diverges by not creating a second-order update at the output layer. Instead, we focus on interpreting the original Sifr equation's intent differently, aiming to zero the loss function directly-aptly named the Sifr optimizer, with "Sifr" meaning zero in Arabic. This new approach eschews solving Newton's equation for optimization or its variations in the classic sense. The novel variant of the Sifr optimizer is demonstrated to be a second-order method, where its update constitutes a descent direction, accommodating large step sizes, typically unity. Theoretical proofs of convergence are provided to substantiate these claims.

The efficiency of resolving the novel variant of the Sifr equation in the context of large-scale models hinges on the rapid and precise estimation of the Gram matrix (or approximations) of the per-sample gradients within automatic differentiation frameworks. While per-sample gradient estimation is feasible for smaller models, a more efficient implementation of the novel variant of the Sifr optimizer necessitates algorithmic or, optimally, hardware-level adjustments. Such adjustments extend beyond gradient accumulation to include layer-by-layer or parameter-by-parameter aggregation or summation of mini-Gram matrices, a process referred to as Gram-Backpropagation.

Upon the estimation of the Gram matrix of gradients via Gram-Backpropagation for a given batch, its positive symmetric nature may be leveraged for acceleration through specialized hardware and software during multiplication, inversion, and linear system resolution. Diagonal and block diagonal approximations of the Gram and or the original covariance matrix are also possible alternatives. These steps are essential for the least squares estimation of the Sifr update. Subsequently, the Sifr update may be refined with step-size search algorithms, adapting to various objectives of Machine learning or neural network training. These applications include, but are not limited to, adversarial attack and defense strategies, sharpness aware minimization, modifications to suit diverse loss functions, regularizations, neural network architectures, models, and datasets. Any potential ill-conditioning in matrices can be addressed with damping techniques, as commonly recognized in the field. The original Sifr optimizer was initially conceptualized through the Sifrian functional-a Lagrangian-like structure that integrates the forward model, backpropagation, and gradient definition. Differentiation of this functional yields equations necessary for estimating the Newton update. While the R-operator (Pearlmutter, 1991) has been the primary means of characterizing second-order effects on vectors within Machine Learning, it lacked transparency, prompting the development of the Sifrian approach. The Sifrian is a Lagrangian-like function that is null at equilibrium (when the forward model, backpropagation, and gradient definition are satisfied). Consequently, its derivatives are also null, leading to a characterization of the Newton update. To illustrate the novel variant of the Sifr optimizer, the following notations are introduced:

Considering a function $f$, which takes an input $x_{0,p}$, (with '0' signifying the input layer) and generates an output $x_{n,p}$, (where 'n' signifies the output layer). p denotes the index of the sample within the training dataset D; essentially $p \in D$. The parameters of the model, including weights, biases, and other factors, are collectively symbolized as $\theta$. The model's forward pass involves processing the inputs $x_{n,p}=f(x_{0,p}; \theta)$ for various values of p (at least one, preferably more) and calculating the loss function $l(x_{n,p}, y_p)$. Here, $y_p$ is the desired output or label for the sample p. The training process entails discovering an optimal $\theta$ that minimizes mismatches, captured by the following expression of $\mathrm{argmin}_\theta \; \mathbb{E}_{p \sim D}[\ell(f(x_{0,p}; \theta), y_p)]$. This equation essentially outlines the pursuit of the suitable $\theta$ that reduces the collective mismatch between the model's output and the desired output across all samples in a batch. In practice, the averaging operator is used in place of $\mathbb{E}_{p \sim D}$, and this maneuver is often referred to as Empirical Risk Minimization (ERM). Denoting $\ell_p = \ell(f(x_{0,p}; \theta), y_p)$, when the loss is computed only for one sample p. Gradient based method relies essentially on the backpropagation to compute the gradient $\nabla_\theta \ell$ efficiently while bypassing any superfluous Jacobian matrix estimation. Essentially estimation of the gradient is given by the chain rule:

$$\nabla_\theta \ell = \mathbb{E}_{p \sim D}\left[\left(\frac{dx_{n,p}}{d\theta}\right) \frac{\partial \ell}{\partial x_{n,p}}\right].$$

The derivative $$\frac{\partial \ell}{\partial x_{n,p}}$$

is easy to compute and it is often done with an analytic expression. The quantity $$\left(\frac{dx_{n,p}}{d\theta}\right)$$

is called the Jacobian and its computation is a bottleneck that is avoided through the concept of backpropagation. $\ell$ is a scalar, $\theta$ is a vector, $$\frac{\partial \ell}{\partial x_{n,p}}$$

is a vector with the same dimension as $x_{n,p}$ and $$\left(\frac{dx_{n,p}}{d\theta}\right)$$

is a matrix (rank 2 tensor) with a row number similar to the dimension of $\theta$ and a column number similar to $x_{n,p}$.

The original Sifr optimizer used with the empirical risk $$\operatorname{argmin}_\theta \frac{1}{n_D} \sum_p \ell(f(x_{0,p}; \theta), y_p),$$

leads to the following the original Sifr equation:

$$\frac{\partial^2 \ell}{\partial x_n^2}\left(\frac{dx_{n,p}}{d\theta}\right)^T_\theta \delta\theta = \frac{\partial \ell}{\partial x_n} + \varepsilon_p, \forall\, p \in D$$

The above equation indicates that the Sifr update $\delta\theta$ is the least squares estimate that creates a second order update at the output level with some random noise $\varepsilon_p$ whose mean should be zero $\mathbb{E}_{p\sim D}[\varepsilon_p]=0$, for an unbiased estimation. Further hypotheses from the regression field such as the Gaussian distribution of the noise could be used or added for further properties. Further, a dimensionality reduction may be used to make the resolution more manageable. Essentially multiplying by $$\left(\frac{\partial \ell}{\partial x_n}\right)^T$$

on the left side under the further independence hypothesis; it was essential for computational tractability.

Further, the present disclosure describes removing the dimensionality reduction without compromising the computational efficiency. The steps involved in this new approach are explained below:

The Newton method, while well-established, is intrinsically limited by various computational factors. The original Sifr equation as established seeks to determine an update, denoted $\delta\theta$, which approximates a Newton update specifically at the output layer. These methods do encounter certain limitations. The fundamental goal of the learning algorithm is to minimize the loss function, ideally to zero, across all samples. Alternatively, at a minimum, the remaining discrepancies should be negligible, demonstrating a nearly-zero mean and minimal variance. It is well established that optimization in general and the classical Newton method in particular strive to nullify the gradient, corresponding to critical points that may represent minima, maxima, or saddle points. This is where the assumption of convexity becomes crucial. However, in the realm of Machine Learning, convexity cannot be guaranteed and is often an unrealistic expectation, thus presenting a fundamental challenge that each second-order method must solve.

The new approach presented herein fundamentally reimagines the usage of the Newton method in optimization: rather than seeking critical points with null gradients, we seek to directly nullify the loss function. The critical insight comes from the realization that the original Sifr equation can be reformulated through a factorization with respect to derivation:

$$\frac{\partial^2 \ell}{\partial x_{n,p}^2}\left(\frac{dx_{n,p}}{d\theta}\right)^T_\theta \delta\theta = \frac{\partial \ell}{\partial x_{n,p}} + \varepsilon_p \rightarrow \frac{\partial}{\partial x_{n,p}}\left(\frac{\partial \ell}{\partial x_{n,p}}\left(\frac{\partial x_{n,p}}{d\theta}\right)^T_\theta \delta\theta - \ell_p\right) = \varepsilon_p.$$

Such a relation assumes that the derivative $$\frac{dx_{n,p}}{d\theta}$$

with respect to $x_{n,p}$ is null, which could be reasonable since $$\left(\frac{dx_{n,p}}{d\theta}\right)$$

is the Jacobian which describes the sensitivity of the output to the model's parameters and often with neural networks, it does not depend on the output itself. It is also assumed that $\delta\theta$ has a null derivative with respect to $x_{n,p}$ which is not necessarily true, but for the sake of this intuitive explanation, an assumption that it is the case is made. Most importantly, the re-apparition of the gradient $$\frac{\partial \ell}{\partial x_{n,p}}\left(\frac{dx_{n,p}}{d\theta}\right)^T_\theta = \nabla_\theta \ell_p,$$

within a very familiar first order Taylor expansion (the minus sign could be absorbed in the $\delta\theta$). The new approach, instead of using dimensionality reduction, includes solving directly the following regression:

$$\ell_p(\theta + \delta\theta) \sim \ell_p(\theta) + \frac{\partial \ell}{\partial x_{n,p}}\left(\frac{dx_{n,p}}{d\theta}\right)^T_\theta \delta\theta = \varepsilon_p, \forall\, p \in D, \mathbb{E}_{p\sim D}[\varepsilon_p] = 0$$

Or in a slightly compact notations, the novel variant of the Sifr equation is:

$$\ell_p(\theta) + (\nabla_\theta \ell_p)^T \delta\theta = \varepsilon_p,$$

$\varepsilon_p$ is a scalar, assuming that the samples $p \in D$ are i.i.d. (independent identically distributed), the following least squares estimator is obtained:

$$\delta\theta^* = -\mathbb{E}_{p\sim D}[\nabla_\theta \ell_p \nabla_\theta \ell_p^T]^{-1} \mathbb{E}_{p\sim D}[\ell_p \nabla_\theta \ell_p],$$

Or the damped (ridge) regression version with D, a positive damping matrix, typically but no limited $D=\varepsilon I$, with I the identity and $\varepsilon$ a positive damping factor:

$$\delta\theta^* = -\mathbb{E}_{p\sim D}[\nabla_\theta \ell_p \nabla_\theta \ell_p^T + D]^{-1} \mathbb{E}_{p\sim D}[\ell_p \nabla_\theta \ell_p],$$

This approach is novel in Machine Learning and could be seen as a mixture of the Gauss-Newton method and the Natural Gradient method. Yet it differs from both. The classic Gauss-Newton method is applied to minimize a sum of least-squares, however in this case it is applied directly to the loss function $\ell$ without further assumptions. The scaling matrix is different from the Generalized Gauss-Newton (GGN) matrix, $$GGN = \sum_p \left(\frac{dx_{n,p}}{d\theta}\right) \frac{\partial^2 \ell}{\partial x_{n,p}^2} \left(\frac{dx_{n,p}}{d\theta}\right)^T_\theta$$

and corresponds rather to the empirical Fisher matrix $F = \mathbb{E}_{p\sim D}[\nabla_\theta \ell_p \nabla_\theta \ell_p^T]$, which appears in the Natural Gradient method. The main difference with the Natural Gradient here is the novel term $\mathbb{E}_{p\sim D}[\ell_p \nabla_\theta \ell_p]$, which is the average gradient, weighted with its loss over the samples p~D. The Natural gradient has a different theoretical foundation and would only use $\mathbb{E}_{p\sim D}[\nabla_\theta \ell_p]$. Moreover, employing the Gram matrix of the per-sample gradients for regression analysis is advantageous. This method proves to be more efficient than utilizing the covariance matrix, which in this case corresponds to the empirical Fisher matrix.

Further, the novel variant of the Sifr Optimizer represents a significant departure from traditional applications of the Newton method for optimization. Instead, it aligns more closely with the principles of the Newton-Raphson algorithm for one-dimensional root finding, yet it is adapted for use in an optimization context.

This new Sifr optimizer variant, motivated by a factorization of the original Sifr equation, weaves together elements of the Gauss-Newton and Natural Gradient methods into a novel, different method. The term 'Sifr', which translates to 'zero' in Arabic, aptly describes the central aim of the method: the direct minimization of the loss function ideally to an absolute zero point. By employing a least squares estimator within the framework of the Sifr method, the novel variant of the Sifr optimizer achieves a more straightforward and efficient means of optimizing the loss function, setting a new precedent in Machine Learning. Such an approach holds desirable properties most notably, an update is meant to yield the following expression.

$$\ell \text{hd } p(\theta + \delta\theta) = \varepsilon_p + \mathcal{O}(\|\delta\theta\|^2)$$

Therefore:

$$\mathbb{E}_{p\sim D}[\ell_p(\theta + \delta\theta)] = \mathcal{O}(\|\delta\theta\|^2).$$

Convergence: The update created by using the novel variant of the Sifr Optimizer is novel and not referenced in previous literature, hence the convergence needs to be established. Assuming a sequence of updates $0, 1, 2 \ldots N$ and the associated Sifr updates $\delta\theta_0, \delta\theta_1, \ldots, \delta\theta_N$. Further, the sequence of weights $\theta_0, \theta_1, \ldots, \theta_N$ may also be used. Further assuming $C^2$ continuity of the loss, at the N step the following Taylor-Lagrange development is obtained:

$$\ell_p(\theta_{N+1}) = \ell_p(\theta_N + \delta\theta_N) =$$

$$\ell_p(\theta_N) + (\nabla_\theta \ell_p(\theta_N))^T \delta\theta_N + \frac{1}{2}\delta\theta_N^T \nabla_\theta^2 \ell_p(\theta + \zeta_{p,N}\delta\theta_N)\delta\theta_N, \zeta_{p,N} \in [0, 1]$$

Since $\delta\theta_N$ solves the least squares problems, the following equation is obtained:

$$\ell_p(\theta_N) + (\nabla_\theta \ell_p(\theta))^T \delta\theta_N = \varepsilon_{p,N} \sim \mathcal{N}(0, \sigma_N)$$

The Gaussian assumption is not necessary (and can be relaxed) but the introduction of the Gaussian assumption clarifies that the residuals have a zero mean and a certain variance, providing the following equation:

$$\ell_p(\theta_{N+1}) = \varepsilon_{p,N} + \frac{1}{2}\delta\theta_N^T \nabla_\theta^2 \ell_p(\theta + \zeta_{p,N}\delta\theta_N)\delta\theta_N, \zeta_{p,N} \in [0, 1].$$

Hence:

$$\mathbb{E}_{p\sim D}[\ell_p(\theta_{N+1})] = \frac{1}{2}\delta\theta_N^T \mathbb{E}_{p\sim D}[\nabla_\theta^2 \ell_p(\theta + \zeta_{p,N}\delta\theta_N)]\delta\theta_N,$$

Considering the N+1 update:

$$\ell_p(\theta_{N+1}) + (\nabla_\theta \ell_p(\theta_{N+1}))^T \delta\theta_{N+1} = \varepsilon_{p,N+1}$$

The resolution of the optimal $\delta\theta_{N+1}$ yields $$\delta\theta_{N+1} = -\mathbb{E}_{p\sim D}[\nabla_\theta \ell_p(\theta_{N+1}) \nabla_\theta \ell_p(\theta_{N+1})^T]^{-1} \mathbb{E}_{p\sim D}[\ell_p(\theta_{N+1}) \nabla_\theta \ell_p(\theta_{N+1})]$$

Denoting the Fisher matrix as $F_{N+1} = \mathbb{E}_{p\sim D}[\nabla_\theta \ell_p(\theta_{N+1}) \nabla_\theta \ell_p(\theta_{N+1})^T]$ and assuming the residuals from the previous step to be independent of the current gradients $\nabla_\theta \ell_p(\theta_{N+1})$, results in the following equation:

$$\mathbb{E}_{p\sim D}[\ell_p(\theta_{N+1}) \nabla_\theta \ell_p(\theta_{N+1}),] =$$

$$\frac{1}{2}\mathbb{E}_{p\sim D}\left[\delta\theta_N^T \nabla_\theta^2 \ell_p(\theta + \zeta_{p,N}\delta\theta_N)\delta\theta_N \nabla_\theta \ell_p(\theta_{N+1})\right]$$

Hence:

$$\delta\theta_{N+1} = -\frac{1}{2}F_{N+1}^{-1}\mathbb{E}_{p\sim D}\left[\delta\theta_N^T \nabla_\theta^2 \ell_p(\theta + \zeta_{p,N}\delta\theta_N)\delta\theta_N \nabla_\theta \ell_p(\theta_{N+1})\right]$$

Assuming classic uniform boundness hypotheses on the Inverse of the Fisher Matrix and the gradients of the loss, then $\exists M > 0$:

$$\|\delta\theta_{N+1}\| \leq M\|\delta\theta_N\|^2$$

Therefore, the model $\theta_0, \theta_1, \ldots, \theta_N$ parameters are a special case of Cauchy sequences. Further, assuming $\exists k \in \mathbb{N}$: such that $M\|\delta\theta_K\| < 1$, then in any Banach space a guaranteed convergence of the model parameter sequence is obtained.

Convergence of the novel variant of the Sifr Optimizer to a minimum: To establish the convergence of the novel variant of the Sifr optimizer to a minimum, an assumption of convergence and hypotheses from the previous section is made, hence $$\lim_{N\to\infty} \theta_N = \theta^*, \lim_{N\to\infty} \delta\theta_N = 0,$$

which by definition of the Sifr equation yields $\ell(\theta^*)=\mathbb{E}_{p\sim D}[\ell_p(\theta^*)]=0$. Around the convergence point, the following equation is obtained:

$$\ell(\theta^* + \delta\theta) = (\nabla_\theta \ell(\theta^*))^T \delta\theta + \frac{1}{2}\delta\theta \nabla_\theta^2 \ell(\theta + \zeta\delta\theta)\delta\theta, \zeta \in [0, 1]$$

since the loss function is always positive if the $\nabla_\theta \ell(\theta^*)$ is non null, then $\delta\theta$ can be built such that the $l(\theta^*+\delta\theta)<0$, which mean that necessarily $\nabla_\theta \ell(\theta^*)=0$. Assuming that the loss has $C^3$ continuity, then it can be shown that the Hessian $\nabla_\theta^2 \ell(\theta^*)$ cannot have negative eigenvalues, hence it is positive and the novel variant of the Sifr optimizer converges necessarily to a minimum. Further, no convexity assumption of the loss $\ell(\theta)$ is needed for the novel variant of the Sifr optimizer. And the only thing that is needed is positivity.

Quadratic Convergence Rate of the novel variant of the Sifr Optimizer: Using the following notation $\Delta\theta_{N+1}=\theta^*-\theta_{N+1}=\theta^*-\theta_N+\theta_N-\theta_{N+1}=\Delta\theta_N-\delta\theta_{N+1}$.

$$\ell_p(\theta^*) = 0 = \ell_p(\theta_N) + (\nabla_\theta \ell_p(\theta_N))^T \Delta\theta_N + \frac{1}{2}\Delta\theta_N^T \nabla_\theta^2 \ell_p(\theta_N + \zeta_p \Delta\theta_N)\Delta\theta_N,$$

which yields $$\ell_p(\theta^*) =$$
$$\epsilon_p = \ell_p(\theta_N) + (\nabla_\theta \ell_p(\theta_N))^T (\Delta\theta_{N+1} + \delta\theta_{N+1}) + \frac{1}{2}\Delta\theta_N \nabla_\theta^2 \ell_p(\theta_N + \zeta_p \Delta\theta_N)\Delta\theta_N,$$

given the definition of the Sifr update, the following is obtained, $$\ell_p(\theta^*) = \epsilon_p = \epsilon_{p,N} + (\nabla_\theta \ell_p(\theta_N))^T (\Delta\theta_{N+1}) + \frac{1}{2}\Delta\theta_N \nabla_\theta^2 \ell_p(\theta_N + \zeta_p \Delta\theta_N)\Delta\theta_N,$$

Applying the gradient and taking the expectation yields:

$$\Delta\theta_{N+1} = \frac{1}{2} F_{N+1}^{-1} \mathbb{E}_{p\sim D}\left[\Delta\theta_N^T \nabla_\theta^2 \ell_p(\theta_N + \zeta_p \Delta\theta_N)\Delta\theta_N \nabla_\theta \ell_p(\theta_N)\right]$$

Therefore, under some extra classic assumption about the Fisher matrix and the gradients norms a quadratic rate of convergence is obtained:

$$\exists M>0, \|\Delta\theta_{N+1}\| \le M\|\Delta\theta_N\|^2.$$

This means that the novel variant of the Sifr optimizer would converge quadratically towards a minimum.

Practical Implementation "Gram-Backpropagation": For a given batch of samples, and given the current typical values used in Machine Learning (hundreds or thousands of samples). The least squares solution of the Sifr could be estimated more efficiently by using the Gram matrix instead of the covariance matrix. The size of the Gram matrix would be much smaller than the covariance matrix, hence saving computation time and resources. As per the practice standards, damping should be added to counter any ill-conditioning. For a given batch $B_D \subseteq D$, the naïve approach consists of computing the per-sample gradients $(\nabla_\theta \ell_p)_{p \in B_D}$, store them, and then compute the inner product of each two gradients per sample of the selected batch.

$$p \in {}_BD; \; G_r[p,q] = \langle \nabla_\theta \ell_p | \nabla_\theta \ell_q \rangle,$$

Such an approach requires a large amount of RAM and is expensive beyond basic models. Instead, learning frameworks and neural networks in particular involve the concept of layers and backpropagation, hence it is more advantageous to estimate the Gram matrix along with the forward and backward steps of any automatic differentiation framework and it could be further hardware optimized. Considering a layer k and its part of the model parameters $\theta_k$. Further, an assumption is made that the layer has an input $x_{p,k-1}$ and an output $x_{p,k}$. Such a description is universal and applicable to various neural network architectures:

The per-sample gradient is given by the following chain rule:

$$\nabla_{\theta_k} \ell_p = \frac{\partial x_{p,k}}{\partial \theta_k} \frac{d\ell_p}{dx_{p,k}}$$

The term $$\frac{d\ell_p}{dx_{p,k}}$$

is the backpropagated residuals and is efficiently computed through backpropagation. In modern Machine Learning frameworks (PyTorch for e.g.) such a quantity is easily accessed through Backward hooks, but even so, a low-level implementation or hardware optimized implementation is more desired. The effect of the tensor term $$\frac{\partial x_{p,k}}{\partial \theta_k}$$

could be efficiently estimated on the backpropagated error $$\frac{d\ell_p}{dx_{p,k}},$$

by storing any necessary information during the forward pass. Computing $$\frac{\partial x_{p,k}}{\partial \theta_k}$$

and storing it directly is highly discouraged for performance reasons, however, its effect could be easily applied depending on the traversed layer. In essence, this approach follows the logic of backpropagation but instead of summing the per-sample gradient over the batch, partial Gram Matrices at each traversed layer are estimated and their values are sum-reduced.

Further, the novel variant of the Sifr optimizer may be conceptually deconstructed into an atypical multidimensional root finding Newton algorithm overlayed with a stochastic aspect, reduced in practice to performing a form of regression to estimate the Sifr update.

In the optimization literature, the Newton method is typically used to find a root for the derivative (not the function itself), which would yield a critical point (i.e., null derivative). However, setting aside the stochastic aspect of regression, the novel variant of the Sifr optimizer engages in a multidimensional form of root finding directly on the loss function's estimates, a method that draws similarities with the classic Gauss-Newton method. Nonetheless, the Sifr unlike Gauss Newton is applied directly to the loss instead of a sum of least squares. The Gauss-Newton method requires the computation of the Jacobian $$\frac{\partial x_{p,k}}{\partial \theta_k}$$

to form the generalized Gauss Newton matrix $$GGN = \sum_p \left(\frac{dx_{n,p}}{d\theta}\right) \frac{\partial^2 \ell}{\partial x_{n,p}^2} \left(\frac{dx_{n,p}}{d\theta}\right)^T_\theta,$$

yet the Sifr optimizer performs the scaling using the empirical Fisher matrix. Beyond situating the Sifr optimizer between the Gauss-Newton and Natural Gradient method. Adopting a nullifying approach with the Sifr optimizer would, in a deterministic setting, introduce challenges, particularly if the loss function lacks a zero value, potentially leading to aberrant oscillations and instability due to the absence of a true root and a negligible derivative near a minimum. To mitigate this, the introduction of damping is imperative.

The Critical Role of Damping of the Sifr Optimizer and Heursitics to Determine Damping: The Sifr optimizer performs an inversion of the Empirical Fisher Matrix or the corresponding Gram matrix, however, these matrices may be ill-conditioned and thus require damping with a matrix D to preserve the stability of the training process.

$$F_n = \mathbb{E}_{p \sim D}[\nabla_\theta \ell_p(\theta_n) \nabla_\theta \ell_p(\theta_n)^T] \to \mathbb{E}_{p \sim D}[\nabla_\theta \ell_p(\theta_n) \nabla_\theta \ell_p(\theta_n)^T + D]$$

This modification alters the dynamics of convergence, with the following equation representing the ideal undamped update, for the sake of simplicity we still assume that the Fisher is invertible for conceptual illustration purposes:

$$\delta\theta_n^* = -F_n^{-1} \mathbb{E}_{p \sim D}[\ell_p(\theta_n) \nabla_\theta \ell_p(\theta_n)^T]$$

In practice, we compute the damped update:

$$\delta\theta_n = -(F_n + D)_{-1} \mathbb{E}_{p \sim D}[\ell_p(\theta_n) \nabla_\theta \ell_p(\theta_n)^T]$$

The relation between these two quantities is as follows:

$$\delta\theta_n = (I + F_n^{-1} D)^{-1} \delta\theta_n^*$$

Or more suitably:

$$\delta\theta_n = \delta\theta_n^* - F_n^{-1} D \delta\theta_n$$

Injecting into the Taylor Largrange development yields:

$$\ell_p(\theta_n + \delta\theta_n) = \epsilon_{n,p} - (\nabla_\theta \ell_p(\theta_n))^T F_n^{-1} D \delta\theta_n + \frac{1}{2} \delta\theta_n^T \nabla_\theta^2 \ell_p(\theta + \zeta_{p,N} \delta\theta_n) \delta\theta_n,$$

$$\zeta_{p,N} \in [0, 1]$$

It becomes evident that the term $(\nabla_\theta \ell_p(\theta_n))^T F_n^{-1} D \delta\theta_n$, might jeopardize the quadratic convergence. An arbitrary selection of damping could decelerate convergence or fail to address the ill-conditioning of the Fisher matrix. With these considerations in mind, it $\mathbb{E}_{p \sim D}[\|\nabla_\theta \ell_p(\theta_n)\|\|\|\delta\theta_n v$, which should at least preserve the quadratic convergence rate. This heuristic for selecting a damping value is suggested as a general approach within this patent. It serves as a guideline rather than a stringent rule, acknowledging that alternative and potentially more fitting damping parameters might be determined by practitioners skilled in the art, and tailored to specific scenarios and requirements.

Within the domain of Machine Learning, the novel variant of the Sifr optimizer's methodology is validated both theoretically and through empirical evidence, as demonstrated in the accompanying figures. Further, the leveraging of the positivity of the loss function and tackling the nullification of the loss directly is unprecedented in Machine Learning and is the foundation of the new development of the Sifr optimization.

Further, the present disclosure describes a method of performing Machine learning, Neural Network training, or statistical learning using the Sifr Optimizer.

Further, the present disclosure describes methods, systems, and computer-readable media designed for Machine Learning, neural network training, or statistical learning and processes utilizing efficient variants of the Sifr optimizer.

FIG. 1 is an illustration of an online platform 100 consistent with various embodiments of the present disclosure. By way of non-limiting example, the online platform 100 to facilitate Sifr optimizer-based efficient neural network training may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, users, administrators, service providers, service consumers, and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 3700.

Figure 2:
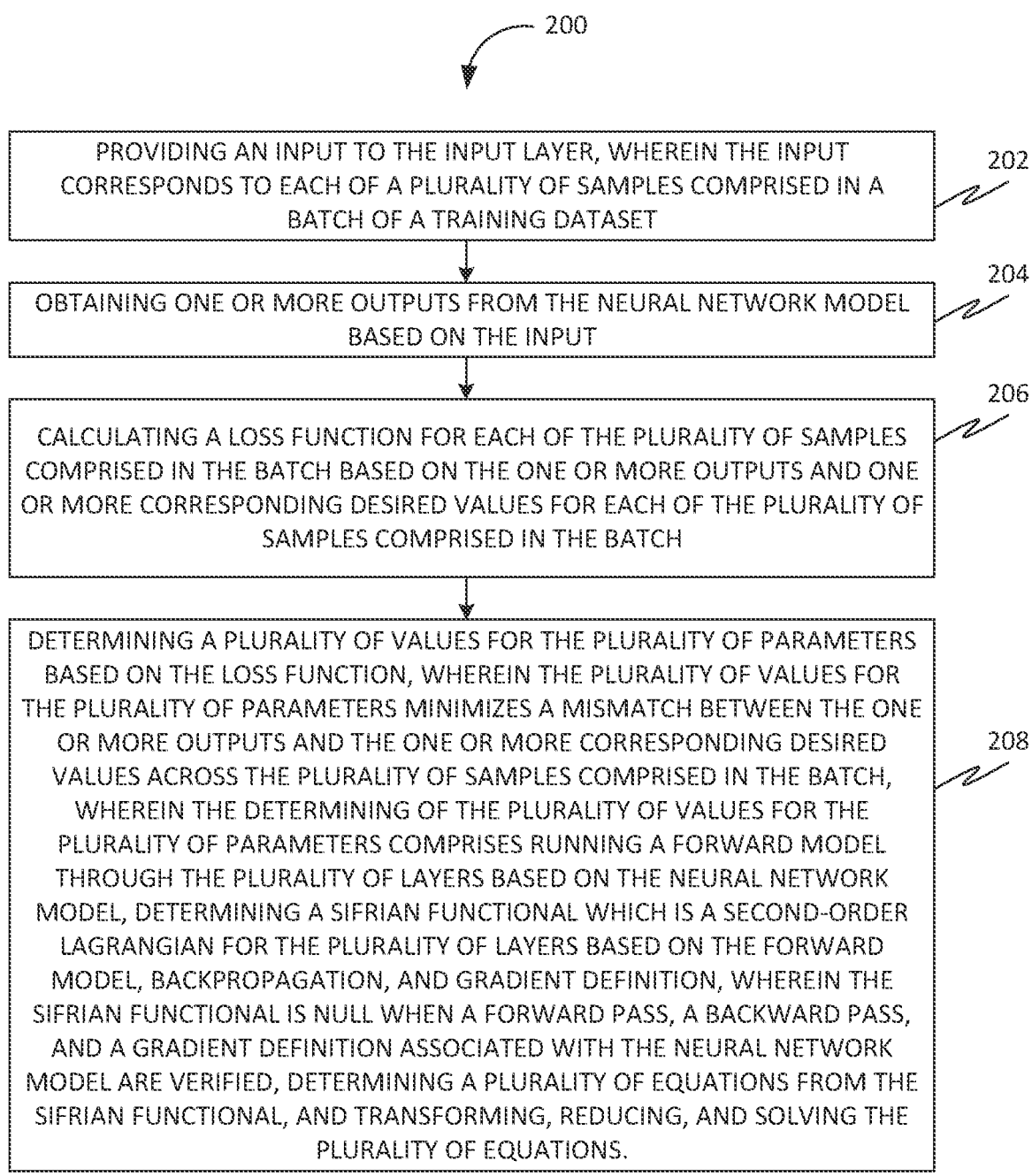
FIG. 2 is a flowchart of a method 200 for training a neural network model having a plurality of layers comprising an input layer, at least one middle layer, an output layer, and a plurality of parameters, in accordance with some embodiments.

FIG. 2 is a flowchart of a method 200 for training a neural network model having a plurality of layers comprising an input layer, at least one middle layer, one or more output layers, and a plurality of parameters commonly referred to as weights and biases, in accordance with some embodiments. Further, the neural network model may be a neural network. Further, the neural network model may be associated with a neural network architecture. Further, the at least one middle layer may be a hidden layer. Further, the plurality of parameters may include weights and biases. Further, the plurality of parameters may include weight matrices and bias vectors.

Accordingly, at 202, the method 200 may include providing an input to the input layer. Further, the input corresponds to each of a plurality of samples comprised in a batch of a training dataset.

Further, at 204, the method 200 may include obtaining one or more outputs from the neural network model based on the input. Further, in an embodiment, the one or more outputs may be obtained at the one or more output layers. Further, in an embodiment, the one or more outputs may be obtained at one or more of the input layer, the at least one middle layer, and the one or more output layers corresponding to the input.

Further, at 206, the method 200 may include calculating a loss function for each of the plurality of samples comprised in the batch based on the one or more outputs and one or more corresponding desired values for each of the plurality of samples comprised in the batch. Further, the one or more corresponding desired values may include one or more desired outputs for each of the plurality of samples.

Further, at 208, the method 200 may include determining a plurality of values for the plurality of parameters based on the loss function. Further, the determining of the plurality of values for the plurality of parameters may be determining a plurality of optimal values for the plurality of parameters. Further, the plurality of values for the plurality of parameters minimizes a mismatch between the one or more outputs and the one or more corresponding desired values across the plurality of samples comprised in the batch. Further, the determining of the plurality of values for the plurality of parameters may include running a forward model through the plurality of layers based on the neural network model. Further, the forward model is determined based on the neural network architecture of the neural network model. Further, the determining of the plurality of values for the plurality of parameters may include determining a Sifrian functional which is a second-order Lagrangian (or Lagrangian) for the plurality of layers based on the forward model, backpropagation, and gradient definition. Further, the determining of the Sifrian functional may be based on the loss function. Further, the Sifrian functional may be a Sifrian system. Further, the Sifrian functional may be null when a forward pass, a backward pass, and a gradient definition associated with the neural network model may be verified. Further, the determining of the plurality of values for the plurality of parameters may include determining a plurality of equations from the Sifrian functional. Further, the plurality of equations may be Sifrian system of equations, Sifrian equations, Sifr system, Sifr equation, etc. Further, the determining of the plurality of values for the plurality of parameters may include transforming, reducing, and solving the plurality of equations. Further, the solving of the Sifrian system includes various strategies, including but not limited to a convexity correction, damping, dimensionality reduction, and direct or iterative solving.

Further, in an embodiment, the solving of the plurality of equations may include employing a plurality of solving methods. Further, the plurality of solving methods may include convexity correction, damping, dimensionality reduction, and both direct and iterative solving methods. Further, the convexity correction may be implicitly accounted for as the Sifr optimizer ensures a descent direction. Further, the damping involves an addition of an epsilon-scaled identity matrix to circumvent issues with non-invertible matrices. Further, the damping may include adding εI to the equations. Further, the dimensionality reduction may be achieved by pre-multiplying both sides of the Sifr equation (a plurality of equations) with a matrix and solving, a common technique in large-scale problems.

Further, in some embodiments, the Sifrian functional integrates the forward pass, the backward pass, and the gradient definition for the neural network model.

Further, in some embodiments, the determining of the Sifrian functional may include excluding the loss function from the Sifrian functional and including a plurality of second-order adjoint variables in the Sifrian functional.

Further, in an embodiment, the determining of the plurality of equations may include determining a characterization of at least a second-order update for the neural network model via at least one of the plurality of second-order adjoint variables.

Figure 3:
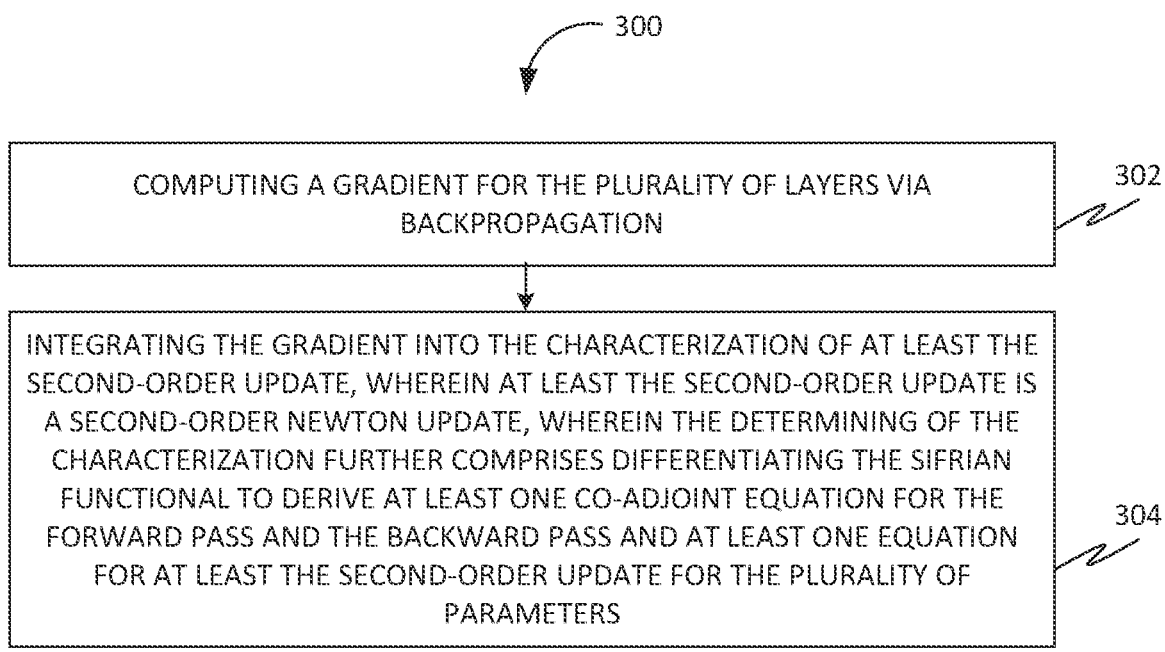
FIG. 3 is a flowchart of a method 300 for determining the plurality of values for the plurality of parameters for the training of the neural network model, in accordance with some embodiments.

FIG. 3 is a flowchart of a method 300 for determining the plurality of values for the plurality of parameters for the training of the neural network model, in accordance with some embodiments. Further, at 302, the method 300 may include computing a gradient for the plurality of layers via backpropagation.

Further, at 304, the method 300 may include integrating the gradient into the characterization of at least the second-order update. Further, at least the second-order update may be a second-order Newton update. Further, the determining of the characterization further may include differentiating the Sifrian functional to derive at least one co-adjoint equation for the forward pass and the backward pass and at least one equation for at least the second-order update for the plurality of parameters. Further, the plurality of equations may include the at least one co-adjoint equation and the at least one equation for at least the second-order update for the plurality of parameters.

Figure 4:
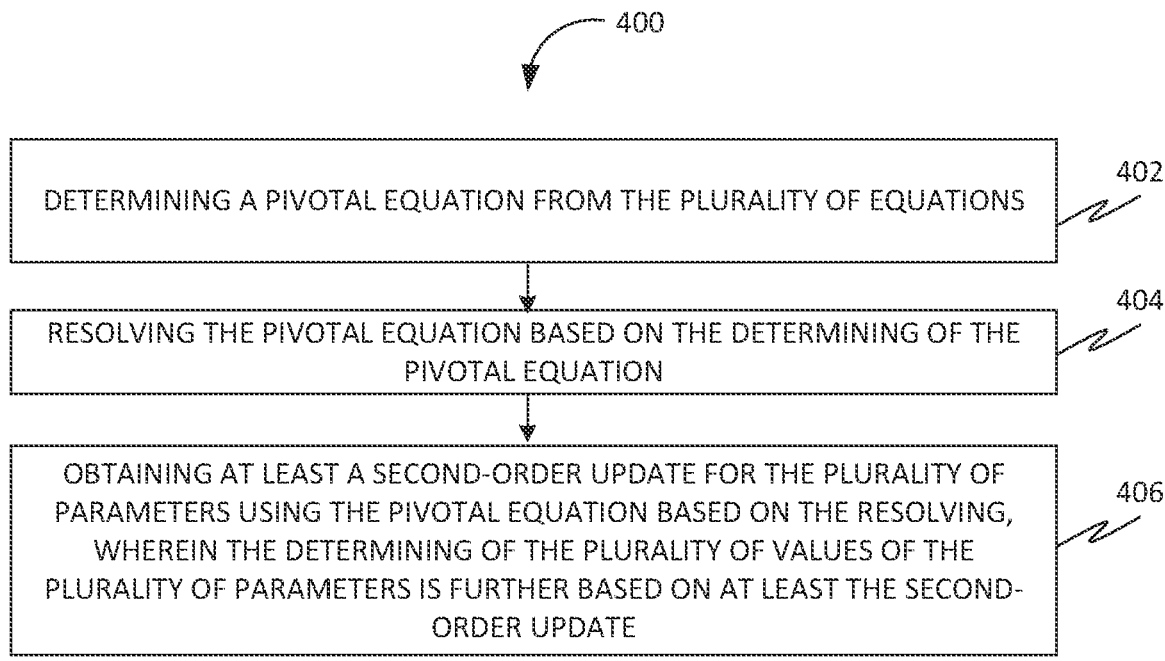
FIG. 4 is a flowchart of a method 400 for solving the plurality of equations for the training of the neural network model, in accordance with some embodiments.

FIG. 4 is a flowchart of a method 400 for solving the plurality of equations for the training of the neural network model, in accordance with some embodiments. Further, the solving of the plurality of equations may include allowing transformations. Further, at 402, the method 400 may include determining a pivotal equation from the plurality of equations.

Further, the pivotal equation may be a singular pivotal equation, a Sifr pivotal equation, a Sifrian pivotal equation, a pivotal Sifr equation, etc.

Further, at 404, the method 400 may include resolving the pivotal equation based on the determining of the pivotal equation.

Further, at 406, the method 400 may include obtaining at least a second-order update for the plurality of parameters using the pivotal equation based on the resolving. Further, the determining of the plurality of values of the plurality of parameters may be further based on at least the second-order update. Further, the obtaining of at least the second-order update may include solving the pivotal equation to estimate at least the second-order update. Further, at least the second-order update may be used for training the neural network model.

Further, in some embodiments, the pivotal equation may include a damping term to handle potential ill-conditioning of the pivotal equation.

Figure 5:
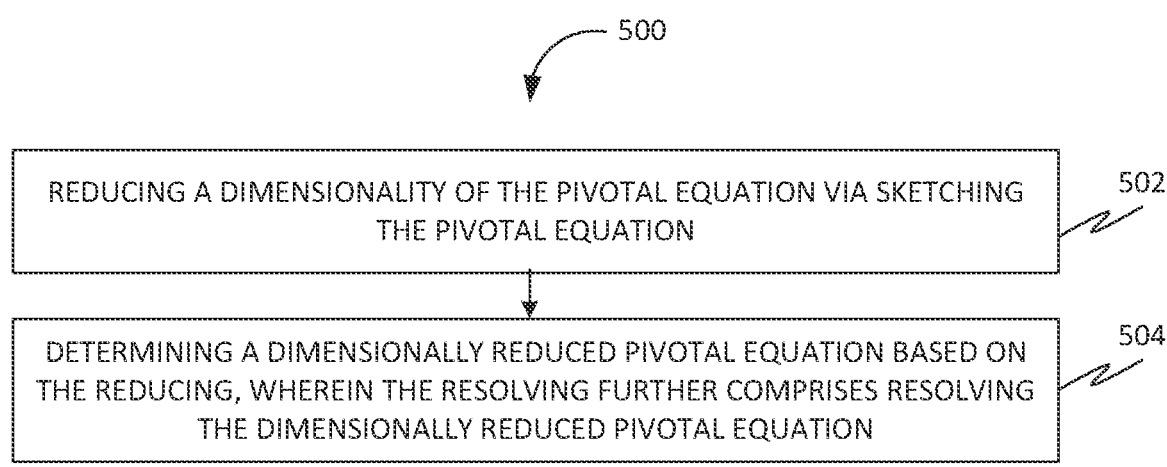
FIG. 5 is a flowchart of a method 500 for solving the plurality of equations for the training of the neural network model, in accordance with some embodiments.

FIG. 5 is a flowchart of a method 500 for solving the plurality of equations for the training of the neural network model, in accordance with some embodiments. Further, at 502, the method 500 may include reducing a dimensionality of the pivotal equation via sketching the pivotal equation. Further, the sketching may include a natural sketching.

Further, at 504, the method 500 may include determining a dimensionally reduced pivotal equation based on the reducing. Further, the resolving may include resolving the dimensionally reduced pivotal equation. Further, the dimensionally reduced pivotal equation may be a dimensionally reduced singular pivotal equation.

Further, in some embodiments, the dimensionally reduced pivotal equation may be $$\left(\frac{\partial \ell}{\partial \theta}\right)^T S = \left(\frac{\partial \ell}{\partial x_n}\right)^T \left(\frac{\partial^2 \ell}{\partial x_n^2}\right)^{-1} \left(\frac{\partial \ell}{\partial x_n}\right) + \epsilon.$$

Figure 6:
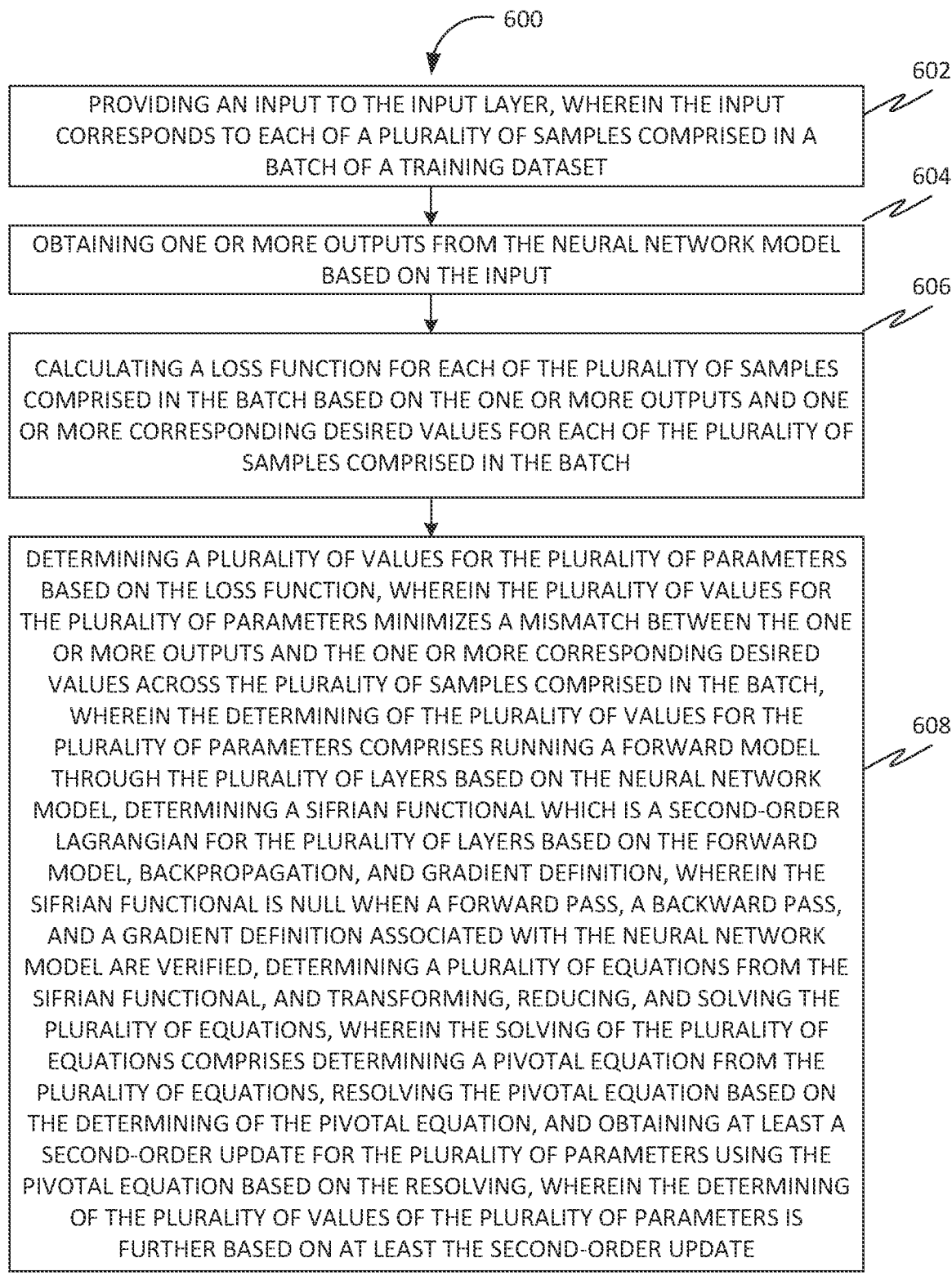
FIG. 6 is a flowchart of a method 600 for training a neural network model having a plurality of layers comprising an input layer, at least one middle layer, an output layer, and a plurality of parameters, in accordance with some embodiments.

FIG. 6 is a flowchart of a method 600 for training a neural network model having a plurality of layers comprising an input layer, at least one middle layer, one or more output layers, and a plurality of parameters commonly referred to as weights and biases, in accordance with some embodiments. Accordingly, at 602, the method 600 may include providing an input to the input layer. Further, the input corresponds to each of a plurality of samples comprised in a batch of a training dataset.

Further, at 604, the method 600 may include obtaining one or more outputs from the neural network model based on the input.

Further, at 606, the method 600 may include calculating a loss function for each of the plurality of samples comprised in the batch based on the one or more outputs and one or more corresponding desired values for each of the plurality of samples comprised in the batch.

Further, at 608, the method 600 may include determining a plurality of values for the plurality of parameters based on the loss function. Further, the plurality of values for the plurality of parameters minimizes a mismatch between the one or more outputs and the one or more corresponding desired values across the plurality of samples comprised in the batch. Further, the determining of the plurality of values for the plurality of parameters may include running a forward model through the plurality of layers based on the neural network model. Further, the determining of the plurality of values for the plurality of parameters may include determining a Sifrian functional which is a second-order Lagrangian for the plurality of layers based on the forward model backpropagation, and gradient definition. Further, the Sifrian functional may be null when a forward pass, a backward pass, and a gradient definition associated with the neural network model may be verified. Further, the determining of the plurality of values for the plurality of parameters may include determining a plurality of equations from the Sifrian functional. Further, the determining of the plurality of values for the plurality of parameters may include transforming, reducing, and solving the plurality of equations. Further, the solving of the plurality of equations may include determining a pivotal equation from the plurality of equations. Further, the solving of the plurality of equations may include resolving the pivotal equation based on the determining of the pivotal equation. Further, the solving of the plurality of equations may include obtaining at least a second-order update for the plurality of parameters using the pivotal equation based on the resolving. Further, the determining of the plurality of values of the plurality of parameters may be further based on at least the second-order update.

Further, in some embodiments, the Sifrian functional integrates the forward pass, the backward pass, and the gradient definition for the neural network model.

Figure 7:
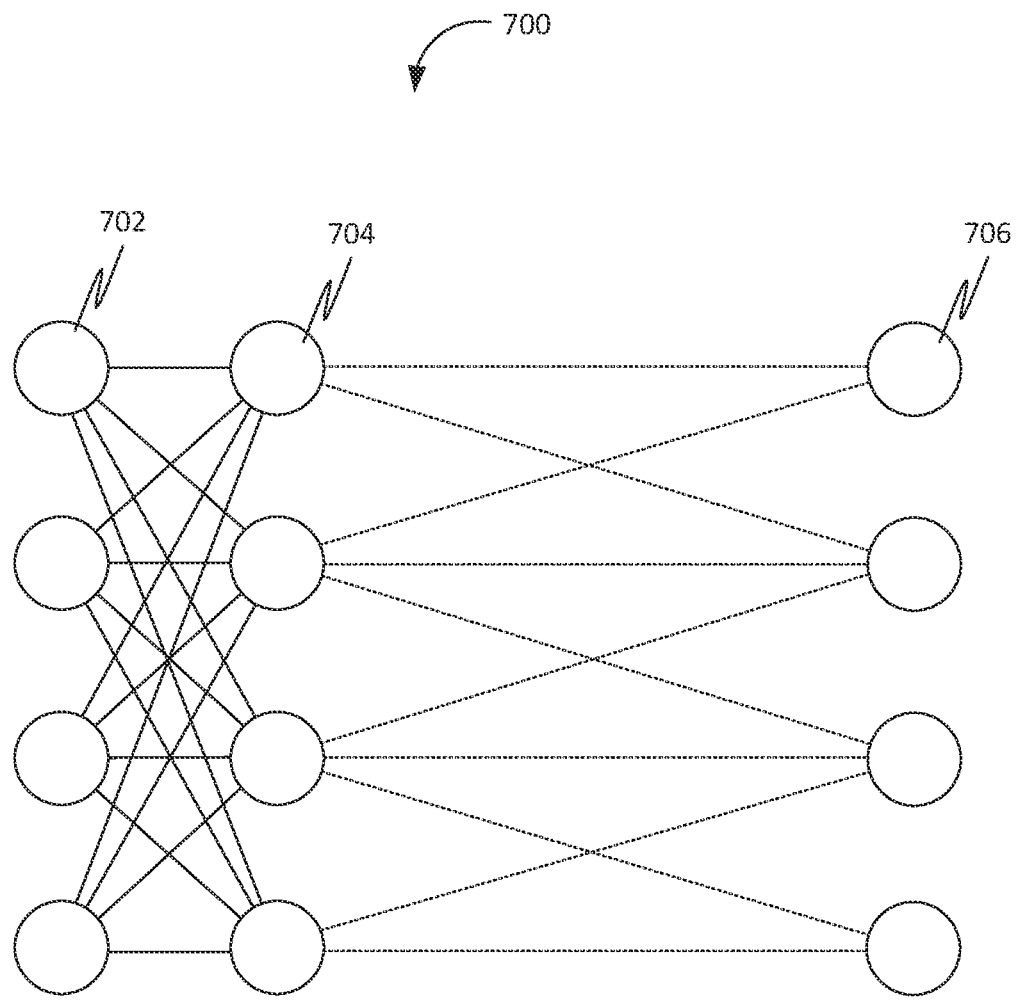
FIG. 7 illustrates a neural network model 700 comprising a plurality of layers 702-706 comprising an input layer 702, at least one middle layer 704, an output layer 706, and a plurality of parameters, in accordance with some embodiments.

FIG. 7 illustrates a neural network model 700 comprising a plurality of layers 702-706 comprising an input layer 702, at least one middle layer 704, one or more output layers 706, and a plurality of parameters commonly referred to as weights and biases, in accordance with some embodiments. Further, the neural network model 700 may be trained using a method. Further, the method may include a step of providing an input to the input layer 702. Further, the input corresponds to each of a plurality of samples comprised in a batch of a training dataset. Further, the method may include a step of obtaining one or more outputs from the neural network model 700 based on the input. Further, the method may include a step of calculating a loss function for each of the plurality of samples comprised in the batch based on the one or more outputs and one or more corresponding desired values for each of the plurality of samples comprised in the batch. Further, the method may include a step of determining a plurality of values for the plurality of parameters based on the loss function. Further, the plurality of values for the plurality of parameters minimizes a mismatch between the one or more outputs and the one or more corresponding desired values across the plurality of samples comprised in the batch. Further, the determining of the plurality of values for the plurality of parameters may include running a forward model through the plurality of layers 702-706 based on the neural network model 700. Further, the determining of the plurality of values for the plurality of parameters may include determining a Sifrian functional which is a second-order Lagrangian for the plurality of layers 702-706 based on the forward model, backpropagation, and gradient definition. Further, the Sifrian functional may be null when a forward pass, a backward pass, and a gradient definition associated with the neural network model 700 may be verified. Further, the determining of the plurality of values for the plurality of parameters may include determining a plurality of equations from the Sifrian functional. Further, the determining of the plurality of values for the plurality of parameters may include transforming, reducing, and solving the plurality of equations.

Further, in some embodiments, the Sifrian functional integrates the forward pass, the backward pass, and the gradient definition for the neural network model 700.

Further, in some embodiments, the determining of the Sifrian functional may include excluding the loss function from the Sifrian functional and including a plurality of second-order adjoint variables in the Sifrian functional.

Further, in an embodiment, the determining of the plurality of equations may include determining a characterization of at least a second-order update for the neural network model 700 by selecting at least one of the plurality of second-order adjoint variables.

Further, in an embodiment, the determining of the plurality of values for the plurality of parameters may include computing a gradient for the plurality of layers 702-706 via backpropagation. Further, the determining of the plurality of values for the plurality of parameters may include integrating the gradient into the characterization of at least the second-order update. Further, at least the second-order update may be a second-order Newton update. Further, the determining of the characterization further may include differentiating the Sifrian functional to derive at least one co-adjoint equation for the forward pass and the backward pass and at least one equation for at least the second-order update for the plurality of parameters.

Further, in some embodiments, the solving of the plurality of equations may include allowing transformations. Further, the solving of the plurality of equations may include determining a pivotal equation from the plurality of equations. Further, the solving of the plurality of equations may include resolving the pivotal equation based on the determining of the pivotal equation. Further, the solving of the plurality of equations may include obtaining at least a second-order update for the plurality of parameters using the pivotal equation based on the resolving. Further, the determining of the plurality of values of the plurality of parameters may be further based on at least the second-order update.

Further, in an embodiment, the pivotal equation may include a damping term to handle potential ill-conditioning of the pivotal equation.

Further, in an embodiment, the solving of the plurality of equations may include reducing a dimensionality of the pivotal equation via sketching the pivotal equation. Further, the solving of the plurality of equations may include determining a dimensionally reduced pivotal equation based on the reducing. Further, the resolving may include resolving the dimensionally reduced pivotal equation.

Further, in an embodiment, the dimensionally reduced pivotal equation may be $$\left(\frac{\partial \ell}{\partial \theta}\right)^T S = \left(\frac{\partial \ell}{\partial x_n}\right)^T \left(\frac{\partial^2 \ell}{\partial x_n^2}\right)^{-1} \left(\frac{\partial \ell}{\partial x_n}\right) + \epsilon.$$

Figure 8:
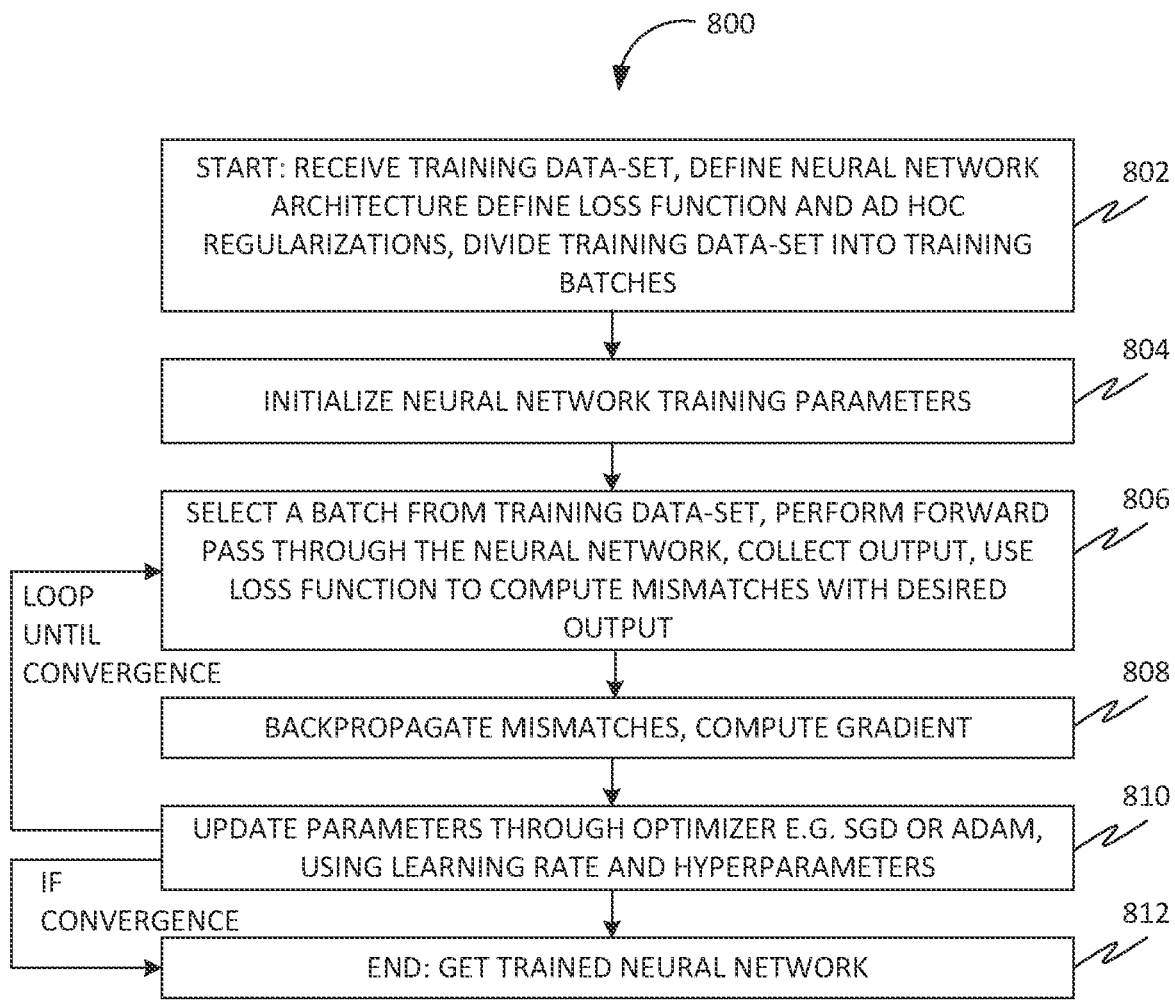
FIG. 8 is a flowchart of a method 800 for training a neural network.

FIG. 8 is a flowchart of a method 800 for training a neural network. Further, the method starts with step 802 of the method 800. Further, the step 802 of the method 800 may include receiving a training dataset, defining neural network architecture defining loss function and ad hoc regularizations, and dividing the training dataset into training batches. Further, the step 802 is followed by step 804 of the method 800. Further, the step 804 of the method 800 may include initializing neural network training parameters. Further, the step 804 is followed by step 806 of the method 800. Further, the step 806 of the method 800 may include selecting a batch from the training dataset, performing a forward pass through the neural network, collecting an output, and using a loss function to compute mismatches with a desired output. Further, the step 806 is followed by step 808 of the method 800. Further, the step 808 of the method 800 may include backpropagating the mismatches and computing a gradient. Further, the step 808 is followed by step 810 of the method 800. Further, the step 810 of the method 800 may include updating the parameters (neural network parameters) through an optimizer e.g., SGD or ADAM, using a learning rate and hyperparameters. Further, after step 810 a convergence for the neural network is determined. Further, the method 800 may include looping steps 806, 808, and 810 after the step 810 until the convergence is achieved. Further, the step 810 is followed by step 812 of the method 800 if the convergence is achieved after the step 810. Further, the method 800 ends at the step 812, and a trained neural network is obtained.

Further, the method 800 is a conventional neural network training process utilizing traditional optimizers such as Stochastic Gradient Descent (SGD) or ADAM. Further, the process includes the forward and backward propagation of data and gradients, until convergence of the training process. Further, the process describes the role of the optimizer in adjusting the neural network's weights and biases which are the neural network training parameters.

Figure 9:
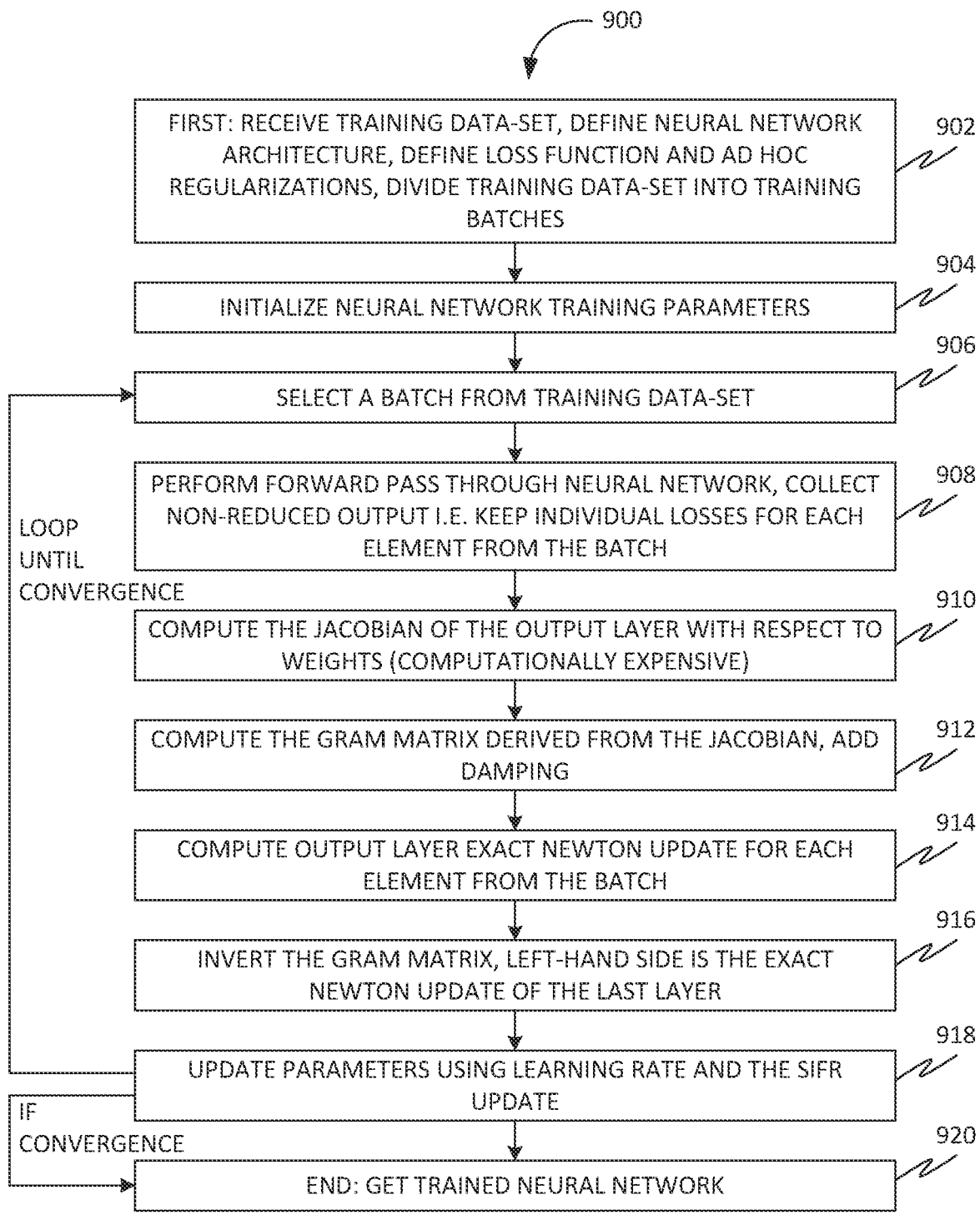
FIG. 9 is a flowchart of a method 900 for training a neural network, in accordance with some embodiments.

FIG. 9 is a flowchart of a method 900 for training a neural network, in accordance with some embodiments. Further, the method 900 starts with step 902 of the method 900. Further, the step 902 of the method 900 may include receiving a training dataset, defining a neural network architecture, defining a loss function and ad hoc regularizations, and dividing the training dataset into training batches. Further, the step 902 is followed by step 904 of the method 900. Further, the step 904 of the method 900 may include initializing neural network training parameters. Further, the step 904 is followed by step 906 of the method 900. Further, the step 906 of the method 900 may include selecting a batch from the training dataset. Further, the step 906 is followed by step 908 of the method 900. Further, the step 908 of the method 900 may include performing a forward pass through the neural network and collecting non-reduced output i.e., keeping individual losses for each element from the batch.

Further, the step 908 is followed by step 910 of the method 900. Further, the step 910 of the method 900 may include computing the Jacobian of the output layer with respect to weights. Further, the computing of the Jacobian is computationally expensive. Further, the step 910 is followed by step 912 of the method 900. Further, the step 912 of the method 900 may include computing the gram matrix derived from the Jacobian and adding damping. Further, the step 912 is followed by step 914 of the method 900. Further, the step 914 of the method 900 may include computing an output layer exact newton update for each element from the batch. Further, the step 914 is followed by step 916 of the method 900. Further, the step 916 of the method 900 may include inverting the gram matrix, and the left-hand side is the exact Newton update of the last layer. Further, the step 916 is followed by step 918 of the method 900. Further, the step 918 of the method 900 may include updating parameters (such as neural network training parameters) using a learning rate and the Sifr update. Further, after step 918 a convergence for the neural network is determined. Further, the method 900 may include looping steps 906, 908, 910, 912, 914, 916, and 918 after the step 918 until the convergence is achieved. Further, the step 918 is followed by step 920 of the method 900 if the convergence is achieved after the step 918. Further, the method 900 ends at the step 920, and a trained neural network is obtained.

Further, the method 900 is a neural network training process that employs a version of the Sifr optimizer during forward pass and backward pass. Further, this version of the Sifr optimizer has a significant RAM footprint, rendering it most suitable for scenarios involving smaller-scale models and datasets, or applications with restricted batch sizes.

Figure 10:
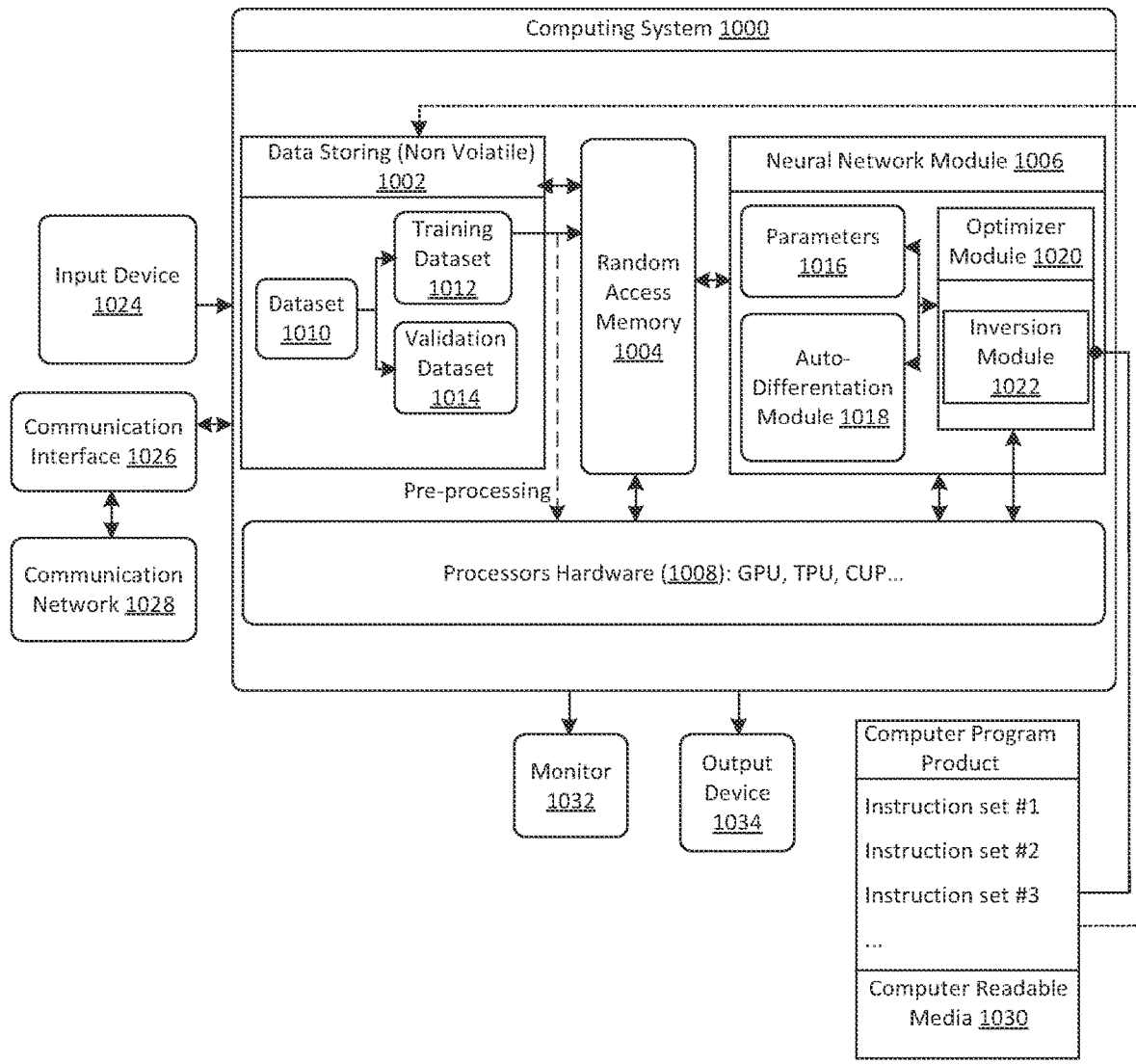
FIG. 10 is a block diagram of a computing system 1000 for training a neural network, in accordance with some embodiments.

FIG. 10 is a block diagram of a computing system 1000 for training a neural network, in accordance with some embodiments. Further, the computing system 1000 may include a data storing module (non-volatile) 1002, a random-access memory 1004, a neural network module 1006, and a processor hardware 1008.

Further, the data storing module 1002 may include a dataset 1010, a training dataset 1012, and a validation dataset 1014. Further, the training dataset 1012 and the validation dataset 1014 may be associated with the dataset 1010.

Further, the neural network module 1006 may include parameters (such as weights and biases) 1016, an auto differentiation module 1018, and an optimizer module 1020 comprising an inversion module 1022. Further, the parameters 1016 and the auto differentiation module 1018 may be associated with the optimizer module 1020.

Further, the data storing module 1002, the neural network module 1006, and the processor hardware 1008 may be communicatively coupled with the random-access memory 1004.

Further, the training dataset 1012 may be preprocessed using processor hardware 1008. Further, the training dataset 1012 may be received by the random-access memory 1004. Further, the optimizer module 1020 may be coupled with the processor hardware 1008.

Further, the processor hardware 1008 may include GPU, TPU, CPU, etc.

Further, the computing system 1000 may be associated with an input device 1024, a communication interface 1026, a communication network 1028, a computer readable media 1030, a monitor 1032, and an output device 1034. Further, the input device 1024, the communication interface 1026, the monitor 1032, and the output device 1034 may be communicatively coupled with the computing system 1000.

Further, the communication network 1028 may be communicatively coupled with the communication interface 1026. Further, the computer readable media 1030 may include a computer program product comprising a plurality of instruction sets.

Further, the computing system 1000 is a special-purpose computing system designed to implement the Sifr Optimizer. Further, the special-purpose computing system may include hardware and software that is necessary for optimal operation of the Sifr Optimizer. The special-purpose computing system is equipped with various modules allowing for user interaction, data input, and output. special-purpose computing system houses an array of hardware processors including for example CPUs, GPUs, and TPUs. Additionally, the special-purpose computing system incorporates RAM (random access memory) and non-volatile storage units (data storing module). The neural network module within this setup incorporates an optimization module, where the Sifr Optimizer is implemented as a dedicated set of instructions, enabling efficient and enhanced neural network training.

Figure 11:
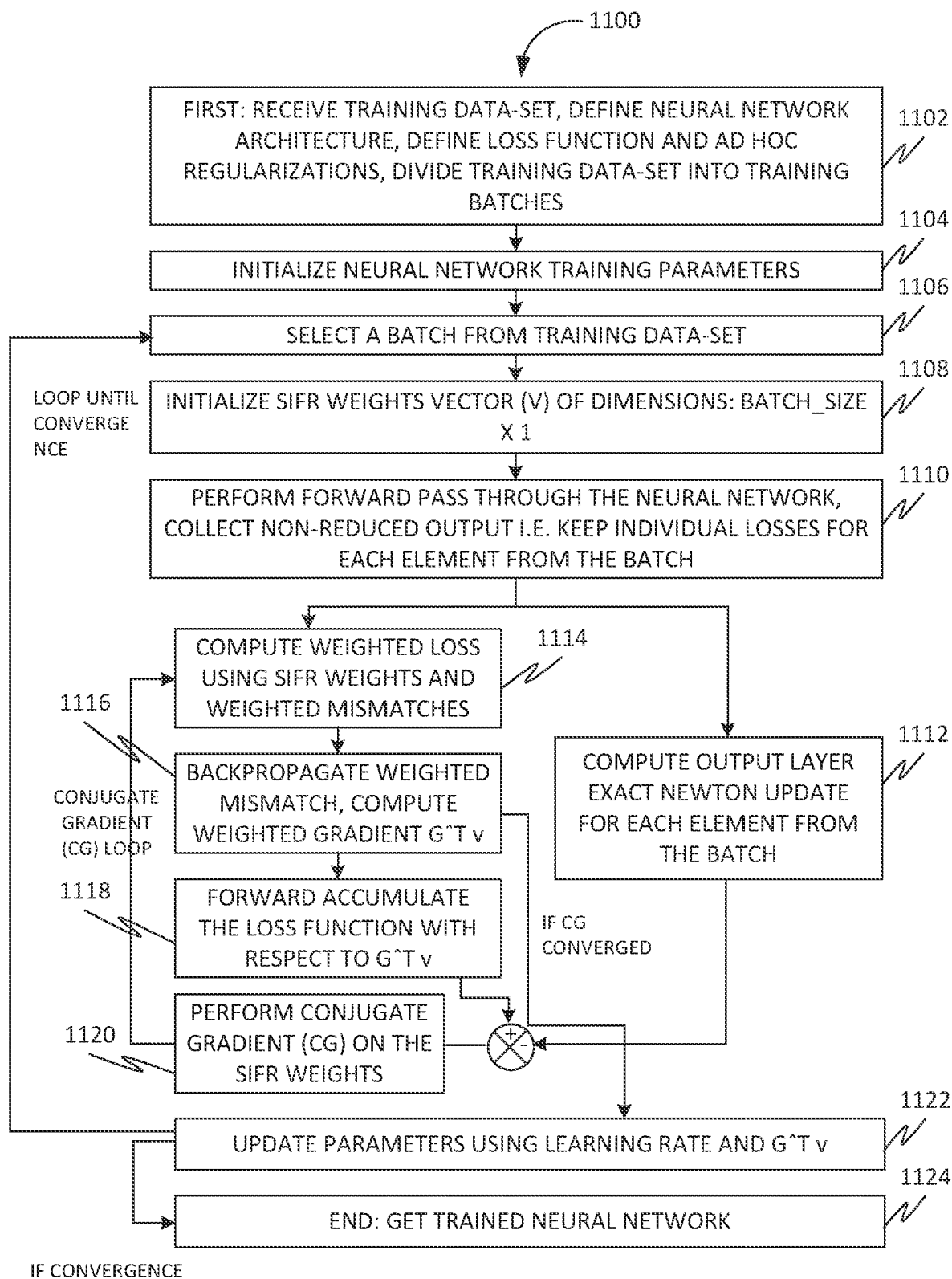
FIG. 11 is a flowchart of a method 1100 for training a neural network, in accordance with some embodiments.

FIG. 11 is a flowchart of a method 1100 for training a neural network, in accordance with some embodiments. Further, the method 1100 starts with step 1102 of the method 1100. Further, the step 1102 of the method 1100 may include receiving a training dataset, defining a neural network architecture, defining a loss function and ad hoc regularizations, and dividing the training dataset into training batches. Further, the step 1102 is followed by step 1104 of the method 1100. Further, the step 1104 of the method 1100 may include initializing neural network training parameters. Further, the step 1104 is followed by step 1106 of the method 1100. Further, the step 1106 of the method 1100 may include selecting a batch from the training dataset. Further, the step 1106 is followed by step 1108 of the method 1100. Further, the step 1108 of the method 1100 may include initializing Sifr weights vector (v) of dimensions: batch_size×1. Further, the step 1108 is followed by step 1110 of the method 1100. Further, the step 1110 of the method 1100 may include performing a forward pass through the neural network and collecting a non-reduced output i.e., keeping individual losses for each element from the batch. Further, the step 1110 is followed by steps 1112 and 1114 of the method 1100. Further, the step 1112 of the method 1100 may include computing an output layer exact newton update for each element from the batch. Further, the step 1114 of the method 1100 may include computing weighted loss using Sifr weights and weighted mismatches. Further, the step 1114 is followed by step 1116 of the method 1100. Further, the step 1116 of the method 1100 may include backpropagating weighted mismatches and computing weighted gradient G^T v. Further, the step 1116 is followed by step 1118 of the method 1100. Further, the step 1118 of the method 1100 may include forward accumulating the loss function with respect to G^T v. Further, the output layer exact Newton update is subtracted from the loss function after the steps 1112 and 1118. Further, the steps 1118 and 1112 are followed by step 1120 of the method 1100. Further, the step 1120 of the method 1100 may include performing conjugate gradient (CG) on the Sifr weights. Further, a convergence of CG is determined after the step 1116. Further, the method 1100 may include looping steps 1114, 1116, 1118, and 1120 if the convergence of CG is not achieved after the step 1116. Further, the step 1116 is followed by step 1122 if the convergence of CG is achieved. Further, the step 1122 may include updating parameters (such as neural network training parameters) using a learning rate and G^T v. Further, a convergence is determined after the step 1122. Further, the method 1100 may include looping steps 1106, 1108, 1110, 1112, 1114, 1116, 1118, 1120, and 1122 after the step 1122 if the convergence is not achieved after the step 1122. Further, the step 1122 is followed by step 1124 of the method 1100 if the convergence is achieved after the step 1122. Further, the method 1100 ends at the step 1124, and a trained neural network is obtained.

Further, the method 1100 is a neural network training process that employs a specific variant of the Sifr optimizer in neural network training. In this variant, direct inversion of the pivotal equation is avoided, saving computational resources, and making it ideal for larger models and extensive datasets. Further, the neural network training process utilizes sketching and an iterative estimation technique for efficient optimization. This iteration contrasts with previous conjugate-gradient based optimizations as it requires iterations equivalent to the batch size, not the model parameters. Further, the Sifr optimizer circumvents the direct inversion in the Sifr pivotal equation, ensuring minimal computational resource requirements and providing a conducive environment for handling large models and expansive datasets. Further, the neural network training process deploys a "natural" sketching approach for dimensionality reduction of the Sifr pivotal equation.

Figure 12:
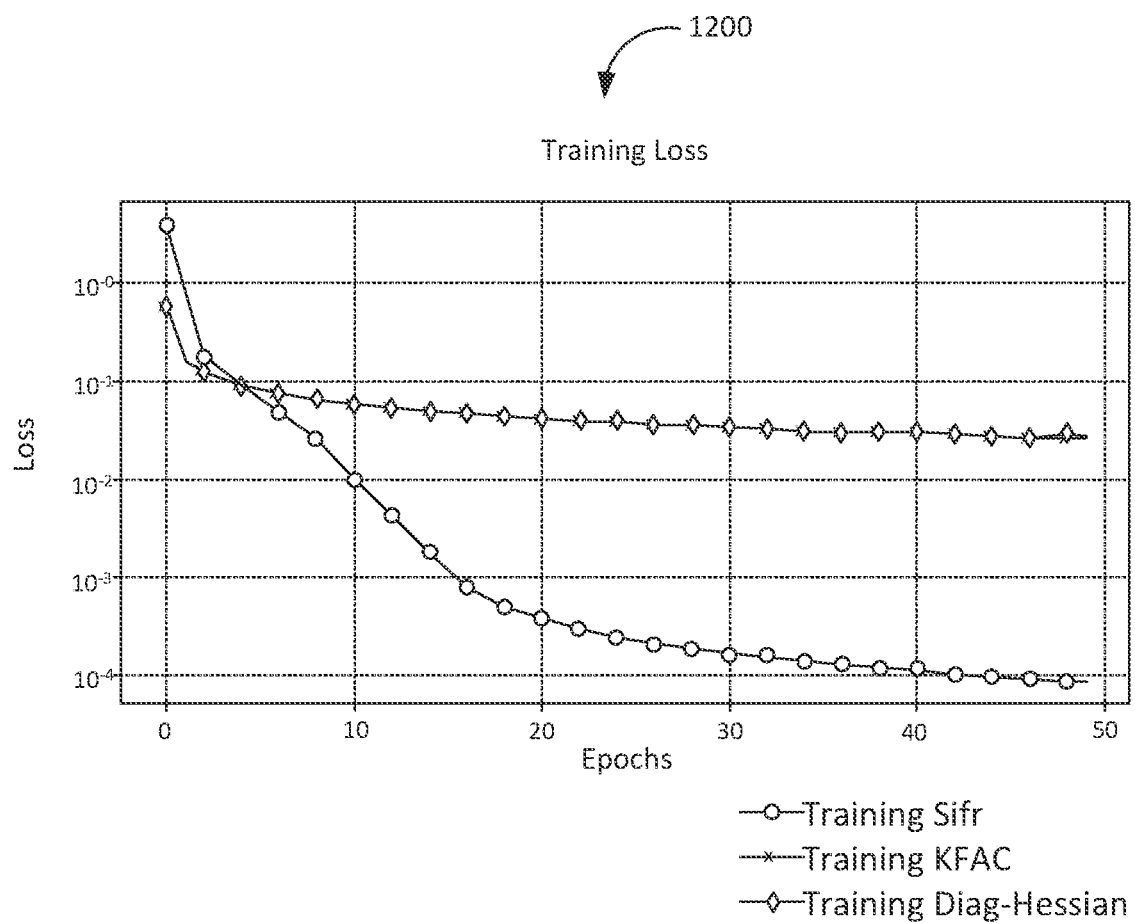
FIG. 12 is a graph 1200 of a training loss for facilitating a performance comparison of a Sifr optimizer with other second order methods for neural network training, in accordance with some embodiments.

FIG. 12 is a graph 1200 of a training loss for facilitating a performance comparison of a Sifr optimizer with other second order methods for neural network training, in accordance with some embodiments. Further, the other second order methods may include a KFAC and a diagonal Hessian approximation scaling. Further, the loss of the training loss is measured against epoch. Further, the comparison is drawn using the MNIST dataset with a consistent batch size of 256 and a uniform learning rate of 0.1 which is applied across all methods.

Figure 13:
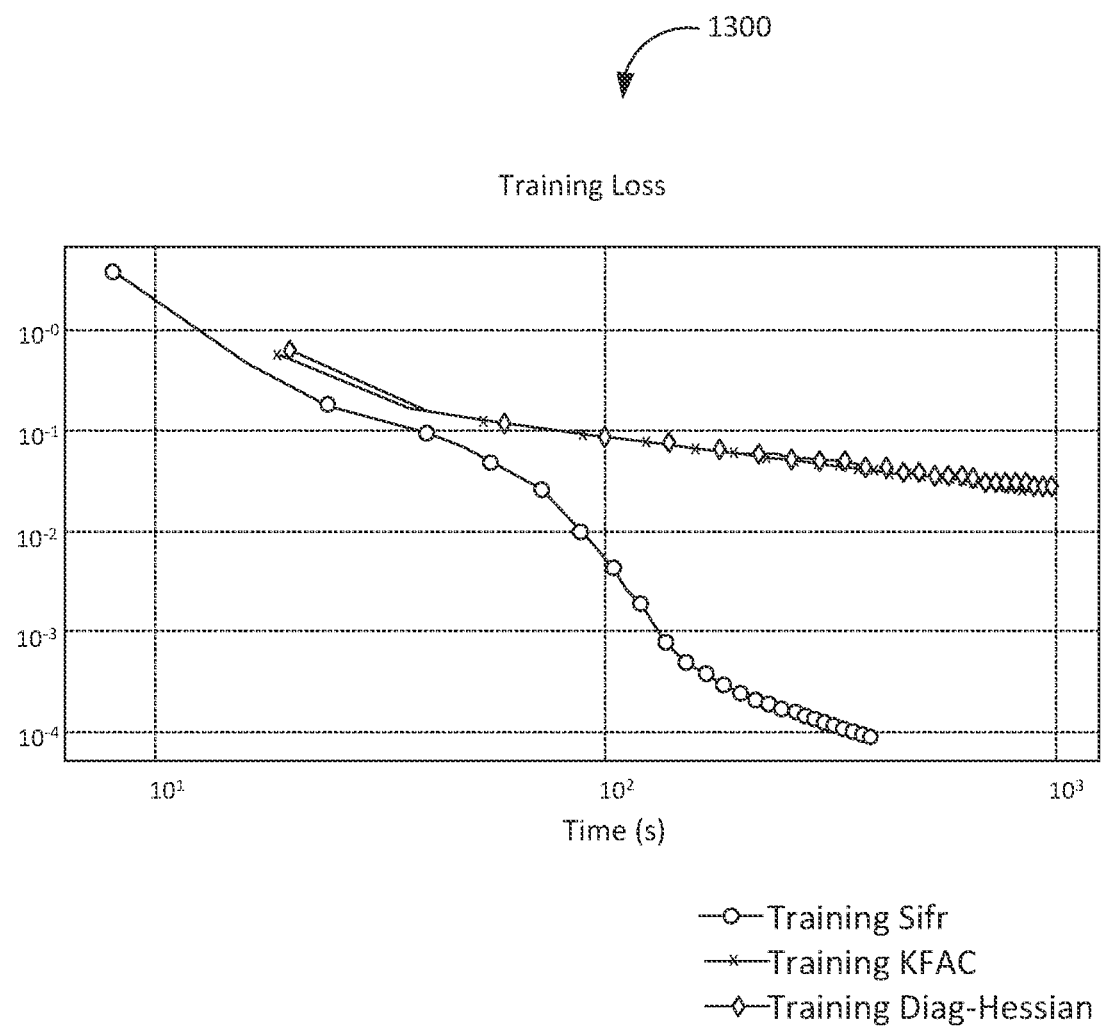
FIG. 13 is a graph 1300 of a training loss for facilitating the performance comparison of the Sifr optimizer with the other second order methods for the neural network training, in accordance with some embodiments.

FIG. 13 is a graph 1300 of a training loss for facilitating the performance comparison of the Sifr optimizer with the other second order methods for the neural network training, in accordance with some embodiments. Further, the loss of the training loss is measured against time (s).

Figure 14:
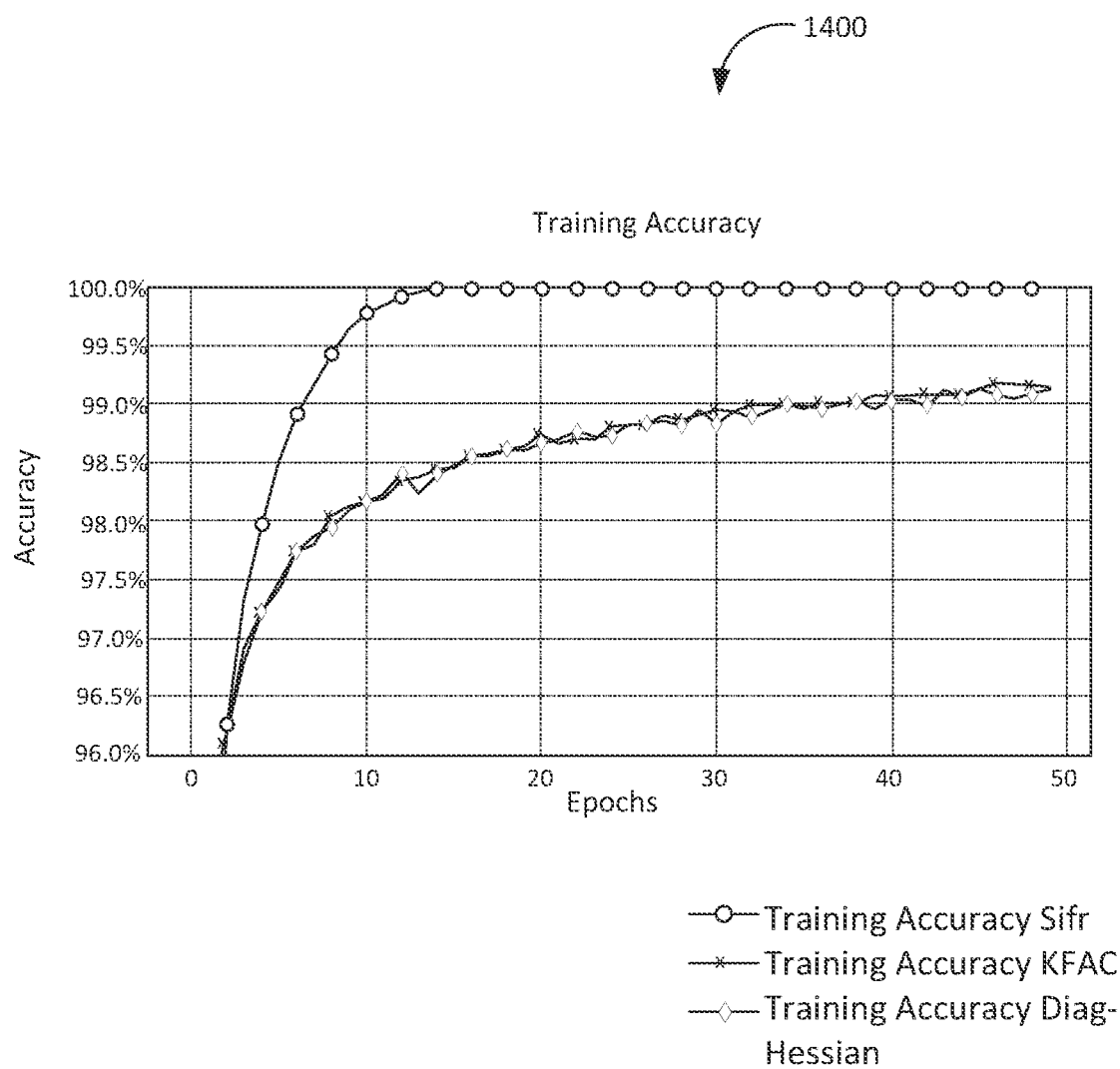
FIG. 14 is a graph 1400 of a training accuracy for facilitating the performance comparison of the Sifr optimizer with the other second order methods for the neural network training, in accordance with some embodiments.

FIG. 14 is a graph 1400 of a training accuracy for facilitating the performance comparison of the Sifr optimizer with the other second order methods for the neural network training, in accordance with some embodiments. Further, the accuracy of the training accuracy is measured against epoch.

Figure 15:
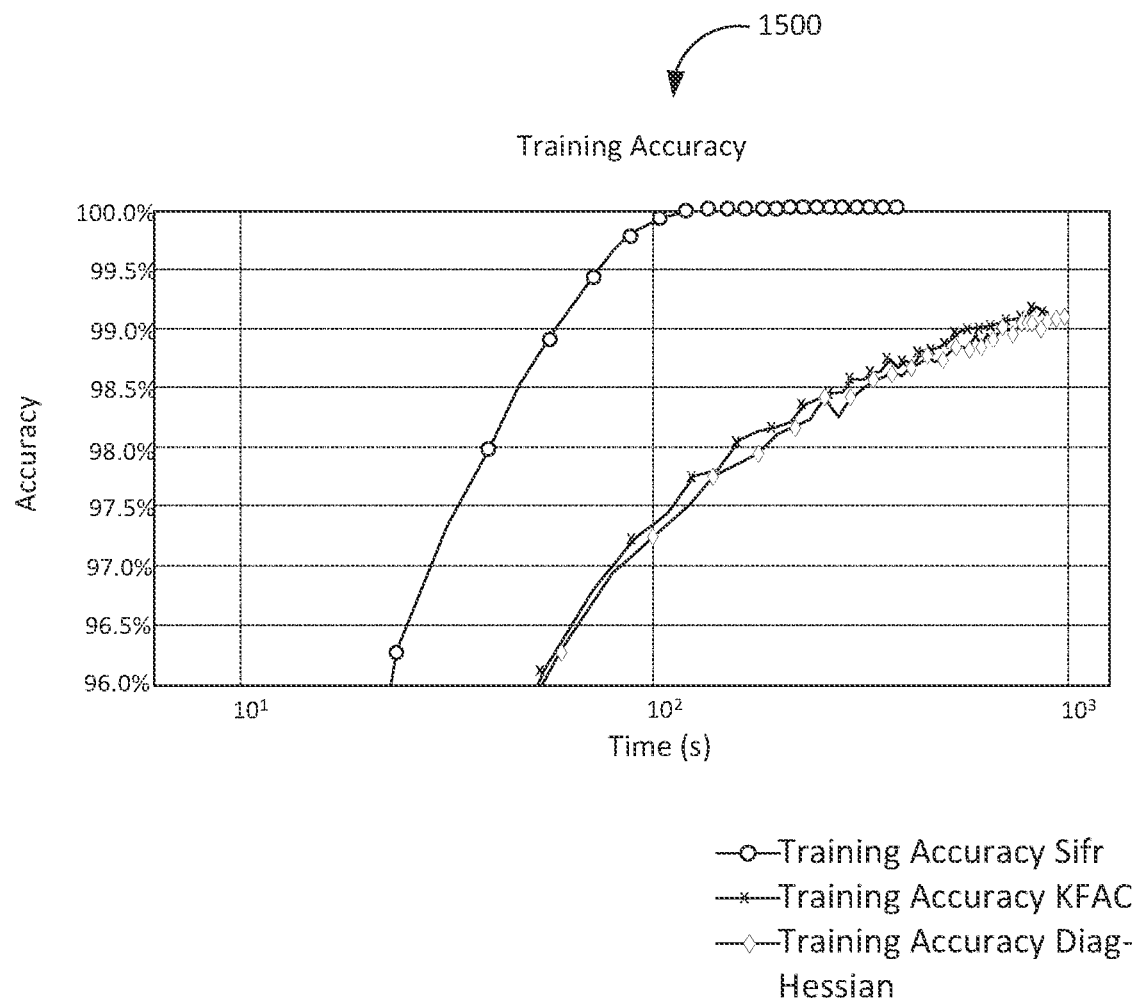
FIG. 15 is a graph 1500 of a training accuracy for facilitating the performance comparison of the Sifr optimizer with the other second order methods for the neural network training, in accordance with some embodiments.

FIG. 15 is a graph 1500 of a training accuracy for facilitating the performance comparison of the Sifr optimizer with the other second order methods for the neural network training, in accordance with some embodiments. Further, the accuracy of the training accuracy is measured against time (s).

Figure 16:
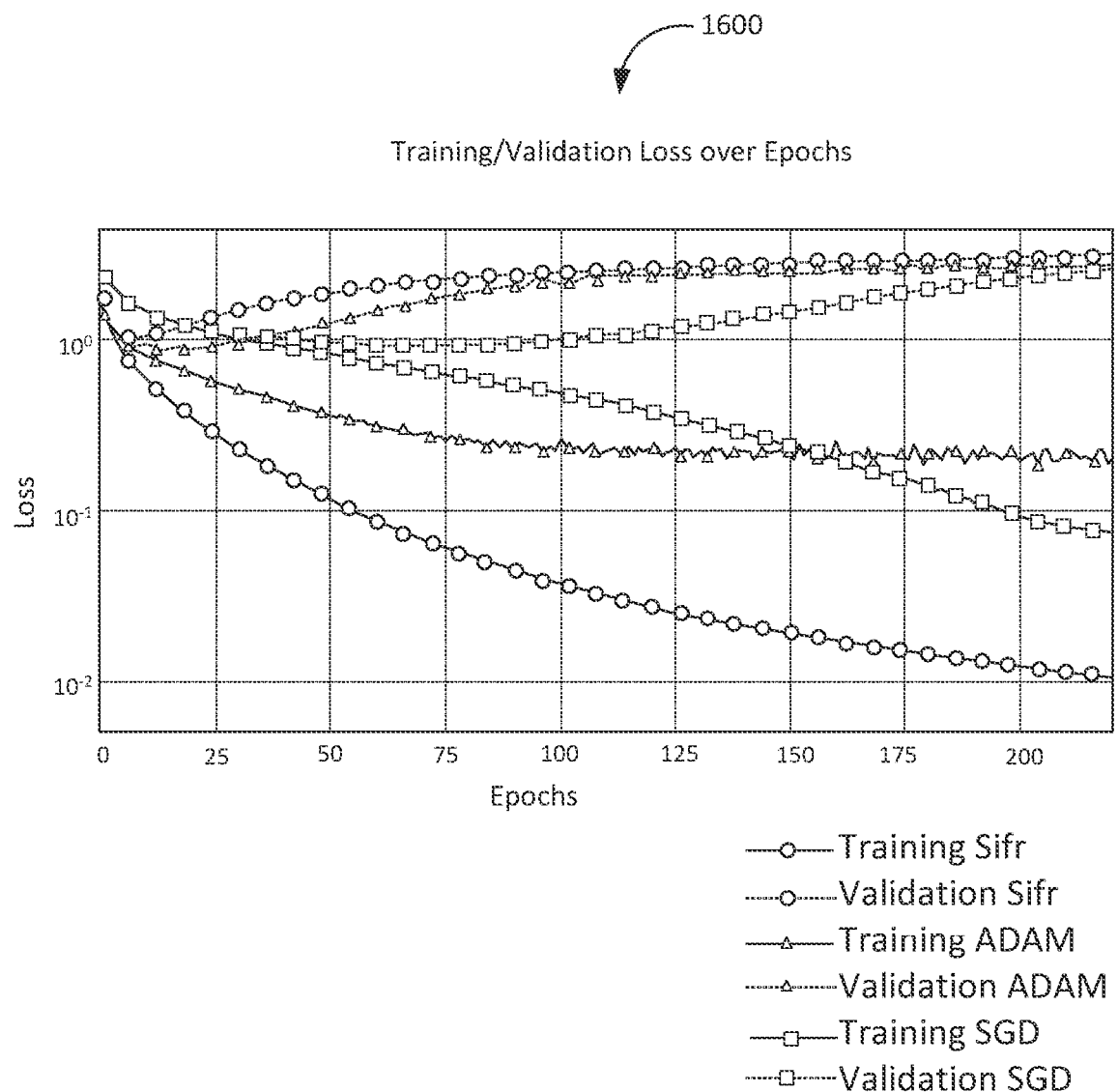
FIG. 16 is a graph 1600 of a training/validation loss over epochs for facilitating the performance comparison of a Sifr optimizer with the other first order methods for neural network training, in accordance with some embodiments.

FIG. 16 is a graph 1600 of a training/validation loss over epochs for facilitating the performance comparison of a Sifr optimizer with the other first order methods for neural network training, in accordance with some embodiments. Further, the loss of the training/validation loss is measured against epoch. Further, the other first order methods may include ADAM, SGD with momentum, etc. Further, the training/validation of the neural network is performed using the CIFAR-10 dataset and the neural network is a convolutional network consisting of three convolutional layers and one dense fully connected layer. The dataset was normalized to a range between 0.0 and 1.0 and split into training and validation (test) sets. A fixed learning rate of 0.1 was assigned for the Sifr Optimizer, while ADAM and SGD were deployed with TensorFlow's default parameters. The Sifr Optimizer outperforms by driving the loss function towards zero whilst maintaining competitive validation accuracy.

Figure 17:
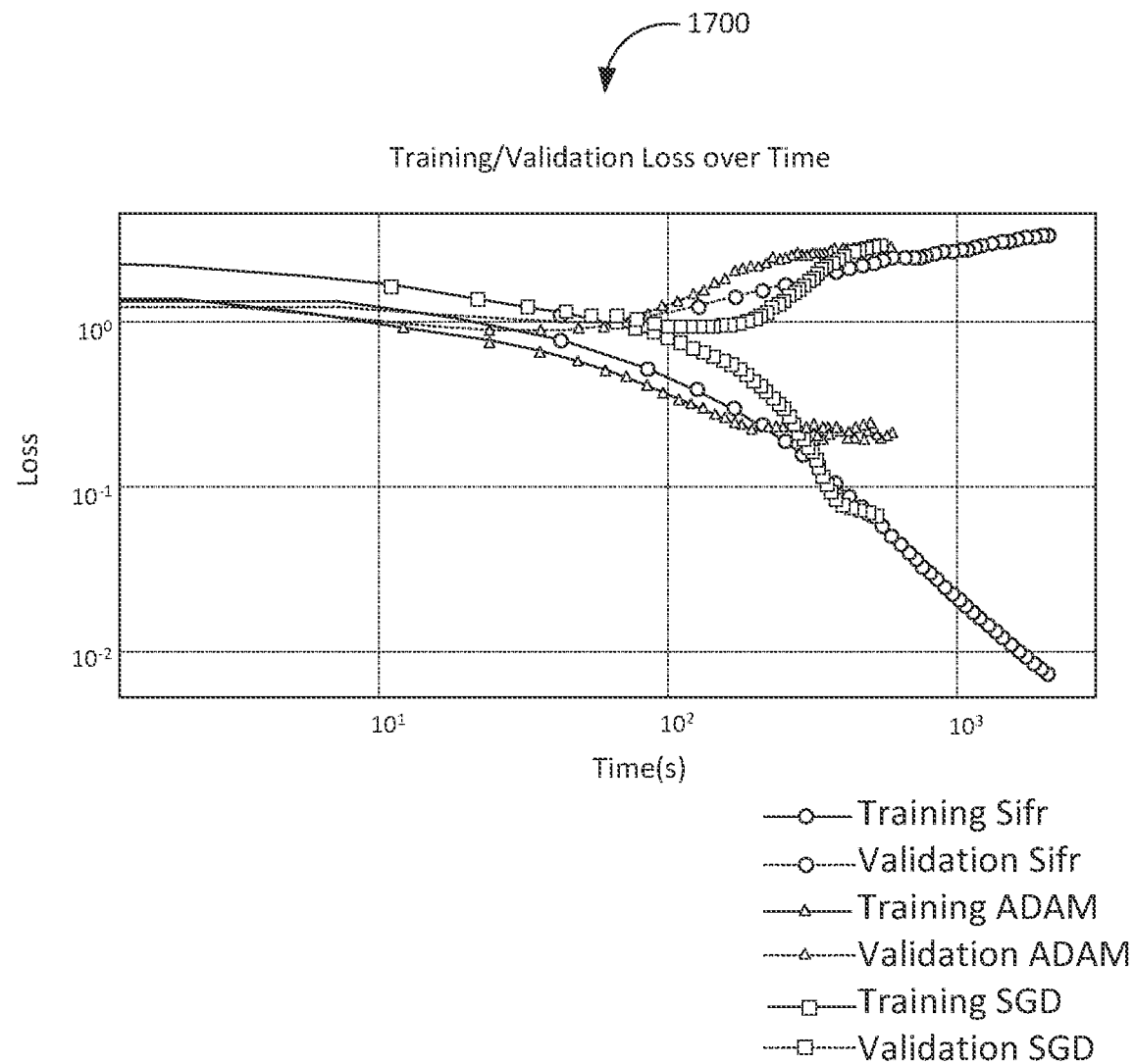
FIG. 17 is a graph 1700 of a training/validation loss over time for facilitating the performance comparison of the Sifr optimizer with the other first order methods for the neural network training, in accordance with some embodiments.

FIG. 17 is a graph 1700 of a training/validation loss over time for facilitating the performance comparison of the Sifr optimizer with the other first order methods for the neural network training, in accordance with some embodiments. Further, the loss of the training/validation loss is measured against time (s).

Figure 18:
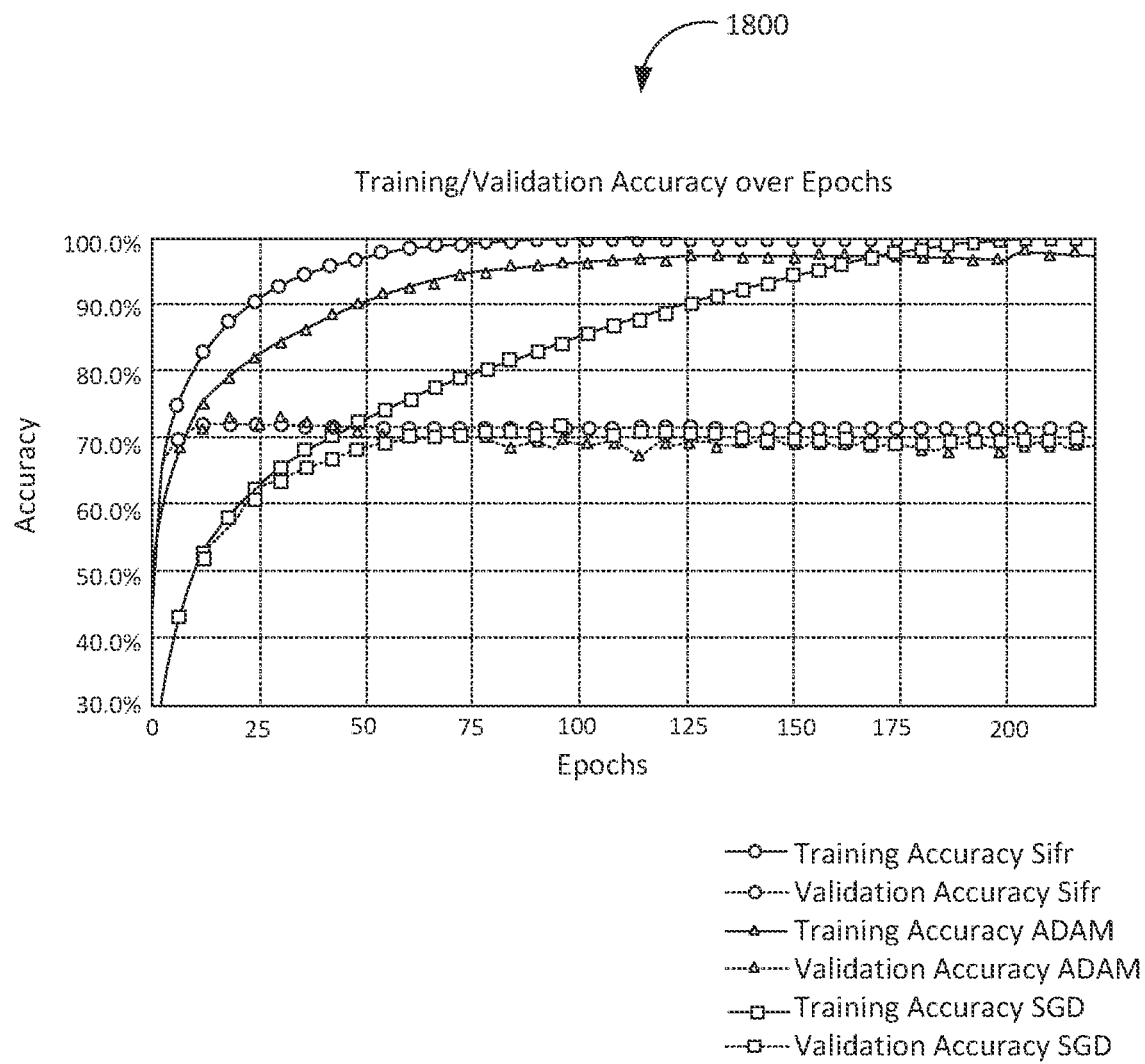
FIG. 18 is a graph 1800 of a training/validation accuracy over epochs for facilitating the performance comparison of the Sifr optimizer with the other first order methods for the neural network training, in accordance with some embodiments.

FIG. 18 is a graph 1800 of a training/validation accuracy over epochs for facilitating the performance comparison of the Sifr optimizer with the other first order methods for the neural network training, in accordance with some embodiments. Further, the accuracy of the training/validation accuracy is measured against the epoch.

Figure 19:
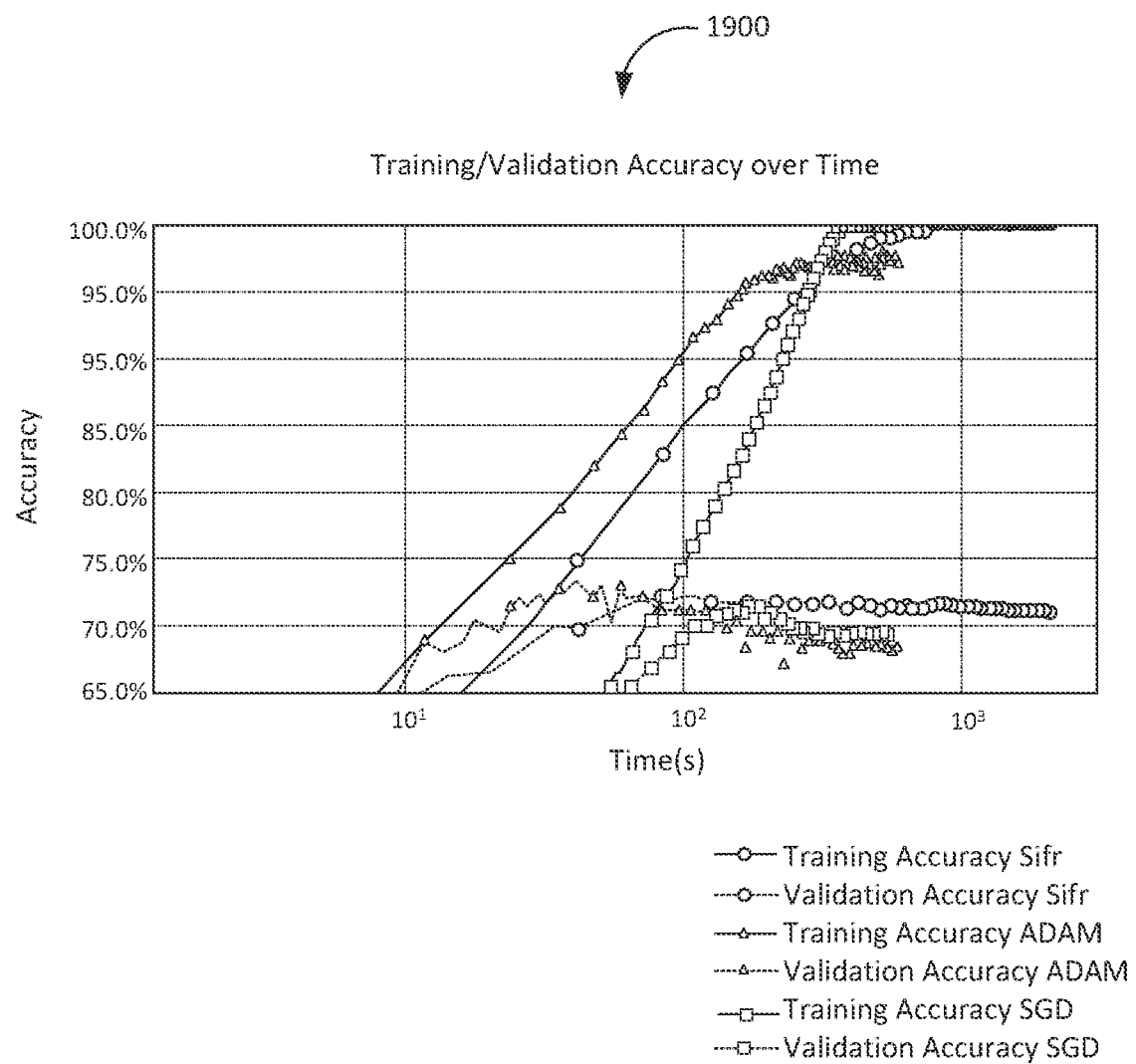
FIG. 19 is a graph 1900 of a training/validation accuracy over time for facilitating the performance comparison of the Sifr optimizer with the other first order methods for the neural network training, in accordance with some embodiments.

FIG. 19 is a graph 1900 of a training/validation accuracy over time for facilitating the performance comparison of the Sifr optimizer with the other first order methods for the neural network training, in accordance with some embodiments. Further, the accuracy of the training/validation accuracy is measured against time (s).

Figure 20:
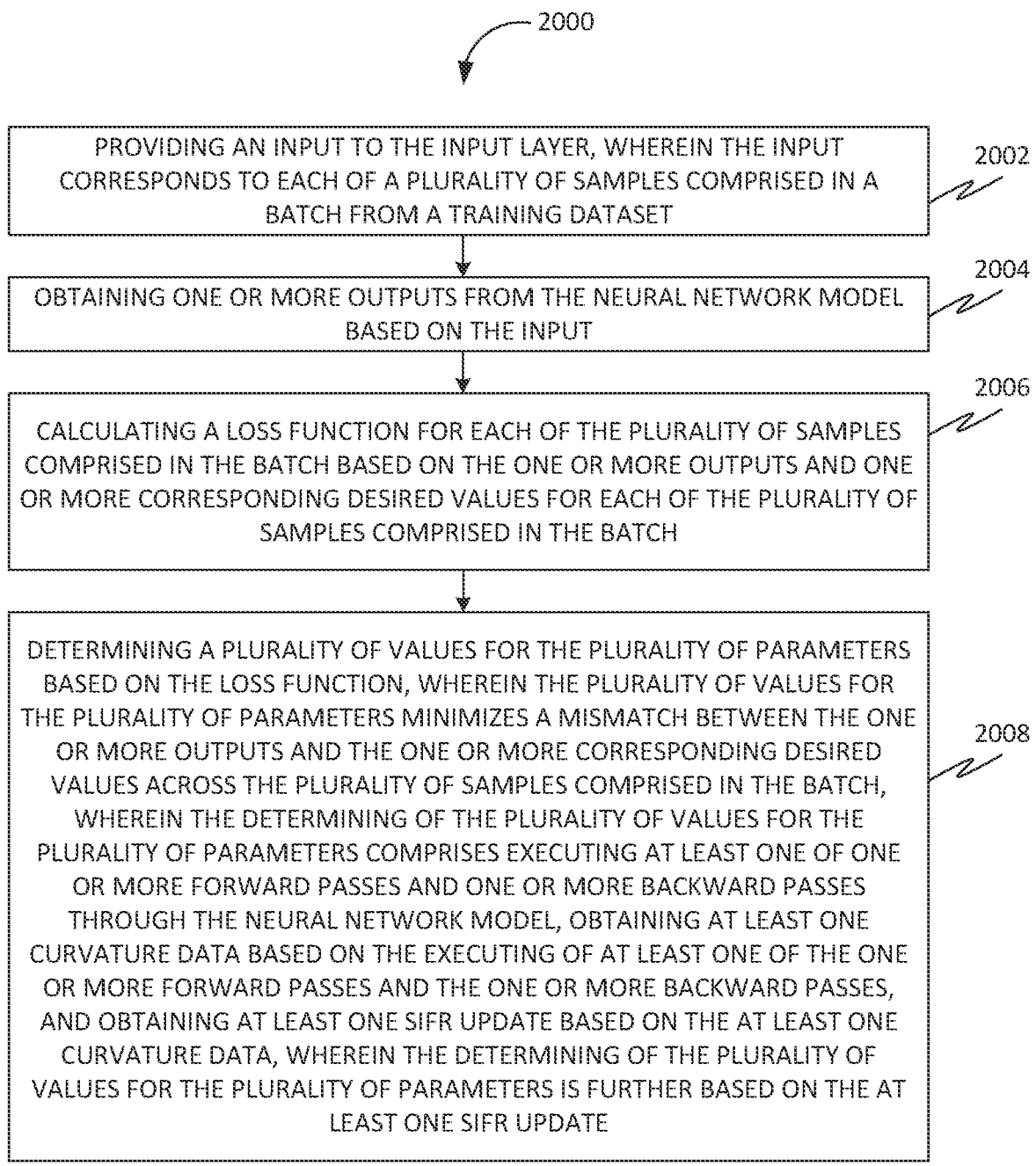
FIG. 20 is a flowchart of a method 2000 for training a neural network model having a plurality of layers comprising an input layer, at least one middle layer, one or more output layers, and a plurality of parameters commonly referred to as weights and biases, in accordance with some embodiments.

FIG. 20 is a flowchart of a method 2000 for training a neural network model having a plurality of layers comprising an input layer, at least one middle layer, one or more output layers, and a plurality of parameters commonly referred to as weights and biases, in accordance with some embodiments. Further, the method 2000 may employ a novel variant of a Sifr optimizer. Further, the method 2000 may be adaptable to a plurality of architectures of the neural network model and a plurality of batch sizes. Further, the neural network model may include an overparameterized model, a large-scale model, a large scale network, etc.

Further, at 2002, the method 2000 may include providing an input to the input layer. Further, the input corresponds to each of a plurality of samples comprised in a batch from a training dataset. Further, the batch may be associated with a batch size. Further, the batch size corresponds to a number of the plurality of samples comprised in the batch.

Further, at 2004, the method 2000 may include obtaining one or more outputs from the neural network model based on the input. Further, the obtaining of the one or more outputs may be based on generation of the one or more outputs in response to the input to the neural network model.

Further, at 2006, the method 2000 may include calculating a loss function for each of the plurality of samples comprised in the batch based on the one or more outputs and one or more corresponding desired values for each of the plurality of samples comprised in the batch. Further, the calculating of the loss function may include computing the loss function with at least one option for at least one additional regularization.

Further, at 2008, the method 2000 may include determining a plurality of values for the plurality of parameters based on the loss function. Further, the determining of the plurality of values for the plurality of parameters may include optimizing the plurality of parameters. Further, the plurality of values for the plurality of parameters minimizes a mismatch between the one or more outputs and the one or more corresponding desired values across the plurality of samples comprised in the batch. Further, the determining of the plurality of values for the plurality of parameters may include executing at least one of one or more forward passes and one or more backward passes through the neural network model. Further, the one or more backward passes may include backpropagation. Further, the determining of the plurality of values for the plurality of parameters may include obtaining at least one curvature data based on the executing of at least one of the one or more forward passes and the one or more backward passes. Further, the determining of the plurality of values for the plurality of parameters may include obtaining at least one Sifr update based on the at least one curvature data. Further, the determining of the plurality of values for the plurality of parameters may be based on the at least one Sifr update.

Further, in some embodiments, the at least one curvature data may include at least one key data. Further, the obtaining of the at least one curvature data may include collecting the at least one key data for at least one Sifr equation for enabling a second order Sifr update.

Further, in an embodiment, the collecting of the at least one key data may include selecting the at least one key data from a plurality of key data based on a computational capacity of at least one computing device used for the training of the neural network model. Further, the computation capacity may correspond to a computing resource of the at least one computing device. Further, the at least one key data may include one or more sample-specific losses, one or more derivatives of the one or more sample-specific losses with respect to the one or more outputs, and one or more curvatures. Further, the one or more curvatures may include one or more second derivatives of the one or more sample-specific losses with respect to the one or more outputs. Further, the at least one key data may include one or more Jacobian matrices associated with the one or more outputs and the plurality of parameters. Further, the one or more Jacobian matrices may be collected based on a small size of the neural network model and an ample computational capacity. Further, the at least one key data may include one or more per-sample gradients or one or more curvature-adjusted versions of the one or more per-sample gradients. Further, the one or more per-sample gradients or the one or more curvature-adjusted versions of the one or more per-sample gradients may be collected subject to the computational capacity. Further, the at least one key data may include a covariance matrix or a Gram matrix of one or more per-sample gradients. Further, the covariance matrix of the Gram matrix of the one or more per-sample gradients may be collected for efficiency or when large matrices are impractical.

Further, in some embodiments, the determining of the plurality of values for the plurality of parameters may include resolving at least one Sifr equation based on the at least one curvature data. Further, the resolving of the at least one Sifr equation may include solving the at least one Sifr equation by integrating at least one element of the at least one curvature data. Further, the at least one element may include one or more sample-specific losses, one or more derivatives of the one or more sample-specific losses with respect to the one or more outputs, one or more curvatures, one or more Jacobian matrices, one or more per-sample gradients, a covariance matrix, a Gram matrix, etc. Further, the obtaining of the at least one Sifr update may be based on the resolving of the at least one Sifr equation. Further, the at least one curvature data may include at least one of a covariance matrix and a Gram matrix of per-sample gradients. Further, the at least one curvature data may include one or more feasible approximations of at least one of the covariance matrix and the Gram matrix. Further, the one or more feasible approximations may include at least one of diagonal matrices and block-diagonal matrices. Further, the at least one curvature data informs a computation of the at least one Sifr update. Further, the at least one Sifr update is distinct Further, in an embodiment, the obtaining of the at least one curvature data may be based on the at least one Sifr equation. Further, the at least one curvature data aligns with at least one resolution method for the resolving of the at least one Sifr equation. Further, the at least one resolution method may include a least square method with the potential for damping and foregoing dimensionality reduction.

Further, in an embodiment, the at least one Sifr equation may be $\ell_p(\theta)+(\nabla_\theta \ell_p)^T\delta\theta=\varepsilon_p$, for the batch of the plurality of samples, with $\ell_p(\theta)$ representing the loss associated with a particular parameter $\theta$ for a sample p, $\nabla_\theta \ell_p$ denoting a gradient of the loss function with respect to $\theta$, $\delta\theta$ signifying a parameter update, and EP representing an error term that is minimized through at least one of least squares and one or more variants of the least squares. Further the at least one Sifr equation forms the foundation for calculating the at least one Sifr update. Further, the at least one Sifr equation may be a novel variant of at least one Sifr equation. Further, $$\ell_p(\theta + \delta\theta) \sim \ell_p(\theta) + \frac{\partial \ell}{\partial x_{n,p}}\left(\frac{dx_{n,p}}{d\theta}\right)^T_\theta \delta\theta = \epsilon_p, \forall\ p \in D, \mathbb{E}_{p \sim D}[\epsilon_p] = 0$$

transforms to $\ell_p(\theta)+(\nabla_\theta \ell_p)^T\delta\theta=\varepsilon_p$ by using a compact notation.

Further, in some embodiments, the obtaining of the at least one curvature data may include performing a Gram-backpropagation for the batch based on traversing the neural network model during the one or more backward passes. Further, the Gram-back propagation may be a process for layer-by-layer or parameter-by-parameter aggregation or summation of mini-Gram matrices. Further, the obtaining of the at least one curvature data may include obtaining a Gram matrix for the batch based on the performing of the Gram-backpropagation. Further, the obtaining of the at least one Sifr update may be based on the Gram matrix. When computational resources allow it, the covariance matrix could be formed and used as the at least one curvature data. Further, tractable approximations (diagonal, block diagonal, etc.) of the covariance matrix and/or the Gram matrix could be used with or without momentum to approximate the curvature data. Further Gram-Backpropagation remains preferred given its ability to generate an accurate curvature data efficiently.

Further, in an embodiment, the performing of the Gram-backpropagation may include creating one or more partial Gram matrices for each of the plurality of layers based on the executing of the one or more backward passes. Further, the performing of the Gram-backpropagation may include sum reducing, aggregating, and performing an operation similar to the sum reducing and aggregating to the one or more partial Gram matrices of each of the plurality of layers based on the creating of the one or more partial Gram matrices. Further, the obtaining of the Gram matrix may be based on the sum reducing, the aggregating, and the performing of the operation to the one or more partial Gram matrices.

Further, in some embodiments, the determining of the plurality of values for the plurality of parameters may include obtaining at least one preliminary Sifr update based on the at least one curvature data: Gram, covariance matrix, and approximations thereof. Further, the determining of the plurality of values for the plurality of parameters may include refining the at least one preliminary Sifr update using at least one step-size search algorithm based on the obtaining of the at least one preliminary Sifr update. Further, the obtaining of the at least one Sifr update may be based on the refining. Further, the at least one Sifr update may be adapted to at least one objective associated with the training of the neural network model based on the refining.

Further, in some embodiments, the determining of the plurality of values comprising one or more values for the plurality of parameters comprising one or more network parameters may include obtaining at least one preliminary Sifr update using a selected curvature information associated with the at least one curvature data. Further, the at least one curvature data may include at least one of a covariance matrix and a Gram matrix of per-sample gradients. Further, the at least one curvature data may include one or more feasible approximations of at least one of the covariance matrix and the Gram matrix. Further, the obtaining at least one preliminary Sifr update may include employing at least one of the covariance matrix and the one or more feasible approximations of the covariance matrix, and the Gram matrix and the one or more feasible approximations of the Gram Matrix. Further, the employing may be contingent upon an availability of computational resources. Further, a representation of a curvature may be refined by utilizing a historical curvature data with an introduction of damping as needed to maintain an invertibility of the at least one curvature data. Further, the determining of the plurality of values comprising the one or more values for the plurality of parameters comprising the one or more network parameters may include refining the at least one preliminary Sifr update by potentially incorporating the historical curvature data through one or more momentum strategies or performing one or more Sifr update calculations in line with one or more acceleration schemes to facilitate a rapid convergence and an improved optimization efficiency. Further, the determining of the plurality of values comprising the one or more values for the plurality of parameters comprising the one or more network parameters may include selecting a step size for the at least one Sifr update, typically adhering to a unity step size characteristic of an optimizer, while also allowing for an application of a step-size search algorithm to enhance a training efficacy as required.

Figure 21:
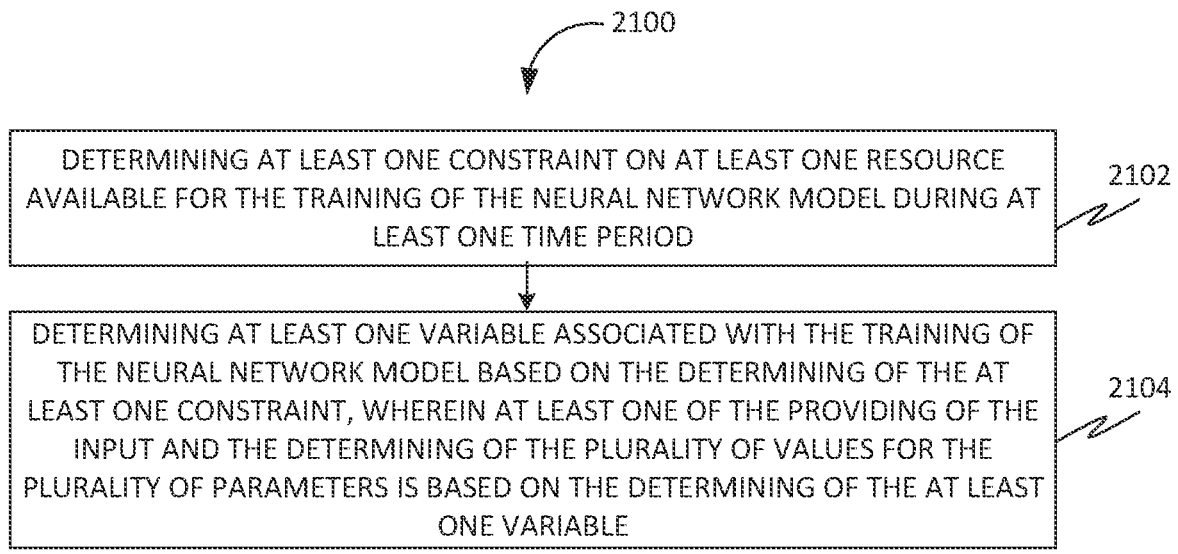
FIG. 21 is a flowchart of a method 2100 for training the neural network model, in accordance with some embodiments.

FIG. 21 is a flowchart of a method 2100 for training the neural network model, in accordance with some embodiments. Accordingly, at 2102, the method 2100 may include determining at least one constraint on at least one resource available for the training of the neural network model. Further, the at least one resource may include at least one computing resource of at least one computing device used for the training of the neural network model. Further, the at least one computing resource may correspond to a computing capacity. Further, the at least one computing resource may include a processor, a memory, a storage, a network resource, etc. Further, the at least one constraint may include an amount of available processing power, an amount of available memory, an amount of available storage, an amount of available bandwidth, etc. Further, the determining of the at least one constraint may be based on a hardware predictive model. Further, the hardware forecast model may be configured for predicting the at least one constraint. Further, the determining of the at least one constraint may be based on the predicting.

Further, at 2104, the method 2100 may include determining at least one variable associated with the training of the neural network model based on the determining of the at least one constraint. Further, the at least one variable may include a size of the batch, an indication of the at least one curvature data from a plurality of data, an indication for employing a sketching algorithm, etc. Further, at least one of the providing of the input and the determining of the plurality of values for the plurality of parameters may be based on the determining of the at least one variable.

Figure 22:
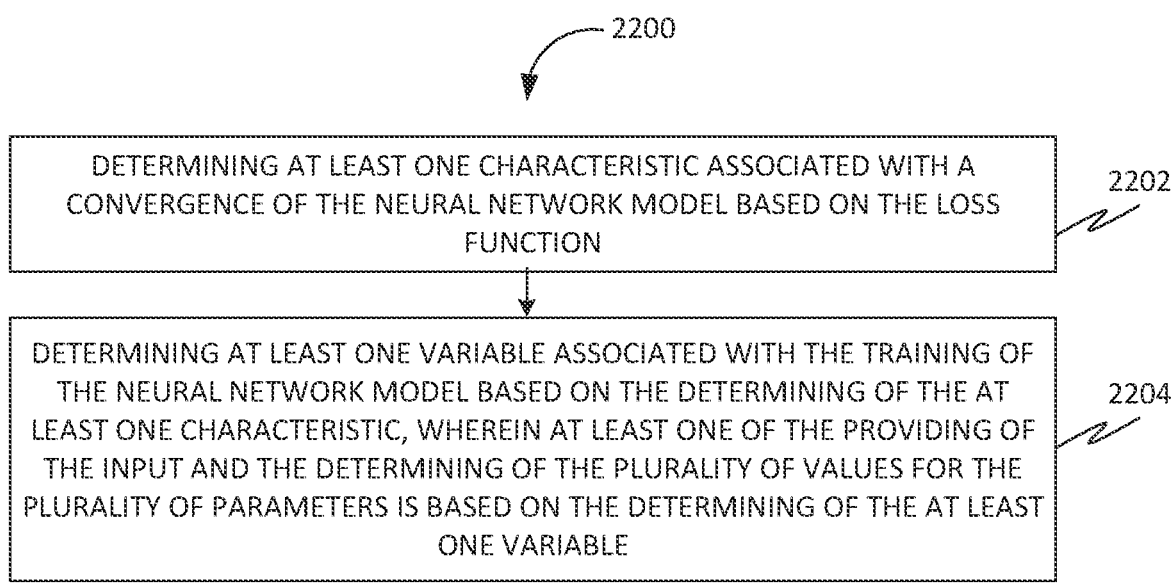
FIG. 22 is a flowchart of a method 2200 for training the neural network model, in accordance with some embodiments.

FIG. 22 is a flowchart of a method 2200 for training the neural network model, in accordance with some embodiments. Accordingly, at 2202, the method 2200 may include determining at least one characteristic associated with a convergence of the neural network model based on the loss function. Further, the at least one characteristic corresponds to at least one criterion for the convergence.

Further, at 2204, the method 2200 may include determining at least one variable associated with the training of the neural network model based on the determining of the at least one characteristic. Further, the at least one variable may include an indication for employing at least one line search strategy, an indication for employing damping or an adaptive damping, an indication for executing a preprocessing operation for the input, an indication for executing two or more of the at least one Sifr update to generate higher order updates, an indication for enhancing the at least one Sifr update by one or more generalization techniques known to practitioners, an input for performing input augmentation and noise perturbation, etc. Further, at least one of the providing of the input and the determining of the plurality of values for the plurality of parameters may be based on the determining of the at least one variable.

Figure 23:
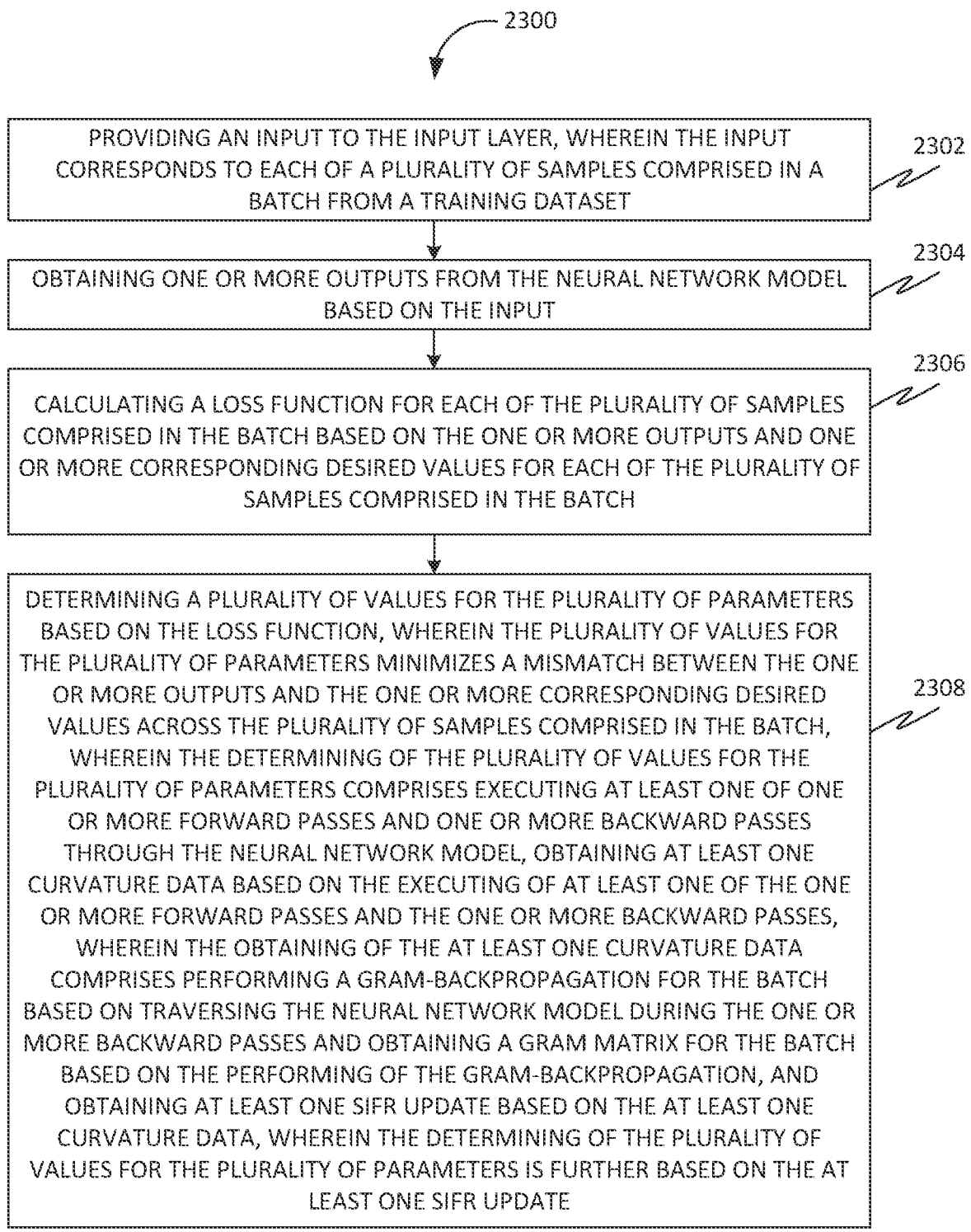
FIG. 23 is a flowchart of a method 2300 for training a neural network model having a plurality of layers comprising an input layer, at least one middle layer, one or more output layers, and a plurality of parameters commonly referred to as weights and biases, in accordance with some embodiments.

FIG. 23 is a flowchart of a method 2300 for training a neural network model having a plurality of layers comprising an input layer, at least one middle layer, one or more output layers, and a plurality of parameters commonly referred to as weights and biases, in accordance with some embodiments. Accordingly, at 2302, the method 2300 may include providing an input to the input layer. Further, the input corresponds to each of a plurality of samples comprised in a batch from a training dataset.

Further, at 2304, the method 2300 may include obtaining one or more outputs from the neural network model based on the input.

Further, at 2306, the method 2300 may include calculating a loss function for each of the plurality of samples comprised in the batch based on the one or more outputs and one or more corresponding desired values for each of the plurality of samples comprised in the batch.

Further, at 2308, the method 2300 may include determining a plurality of values for the plurality of parameters based on the loss function. Further, the plurality of values for the plurality of parameters minimizes a mismatch between the one or more outputs and the one or more corresponding desired values across the plurality of samples comprised in the batch. Further, the determining of the plurality of values for the plurality of parameters may include executing at least one of one or more forward passes and one or more backward passes through the neural network model. Further, the determining of the plurality of values for the plurality of parameters may include obtaining at least one curvature data based on the executing of at least one of the one or more forward passes and the one or more backward passes. Further, the at least one curvature data may include at least one of a covariance matrix and a Gram matrix of per-sample gradients. Further, the at least one curvature data may include one or more feasible approximations of at least one of the covariance matrix and the Gram matrix. Further, the obtaining of the at least one curvature data may include performing a Gram-backpropagation for the batch based on traversing the neural network model during the one or more backward passes and obtaining a Gram matrix for the batch based on the performing of the Gram-backpropagation. Further, the determining of the plurality of values for the plurality of parameters may include obtaining at least one Sifr update based on the at least one curvature data. Further, the obtaining of the at least one Sifr update may be based on the Gram matrix. Further, the determining of the plurality of values for the plurality of parameters may be based on the at least one Sifr update.

Further, in some embodiments, the performing of the Gram-backpropagation may include creating one or more partial Gram matrices for each of the plurality of layers based on the executing of the one or more backward passes. Further, the performing of the Gram-backpropagation may include sum reducing, aggregating, and performing an operation to the one or more partial Gram matrices of each of the plurality of layers based on the creating of the one or more partial Gram matrices. Further, the operation may be similar to the sum reducing and the aggregating Further, the obtaining of the Gram matrix may be based on the sum reducing, the aggregating, and the performing of the operation to the one or more partial Gram matrices.

Figure 24:
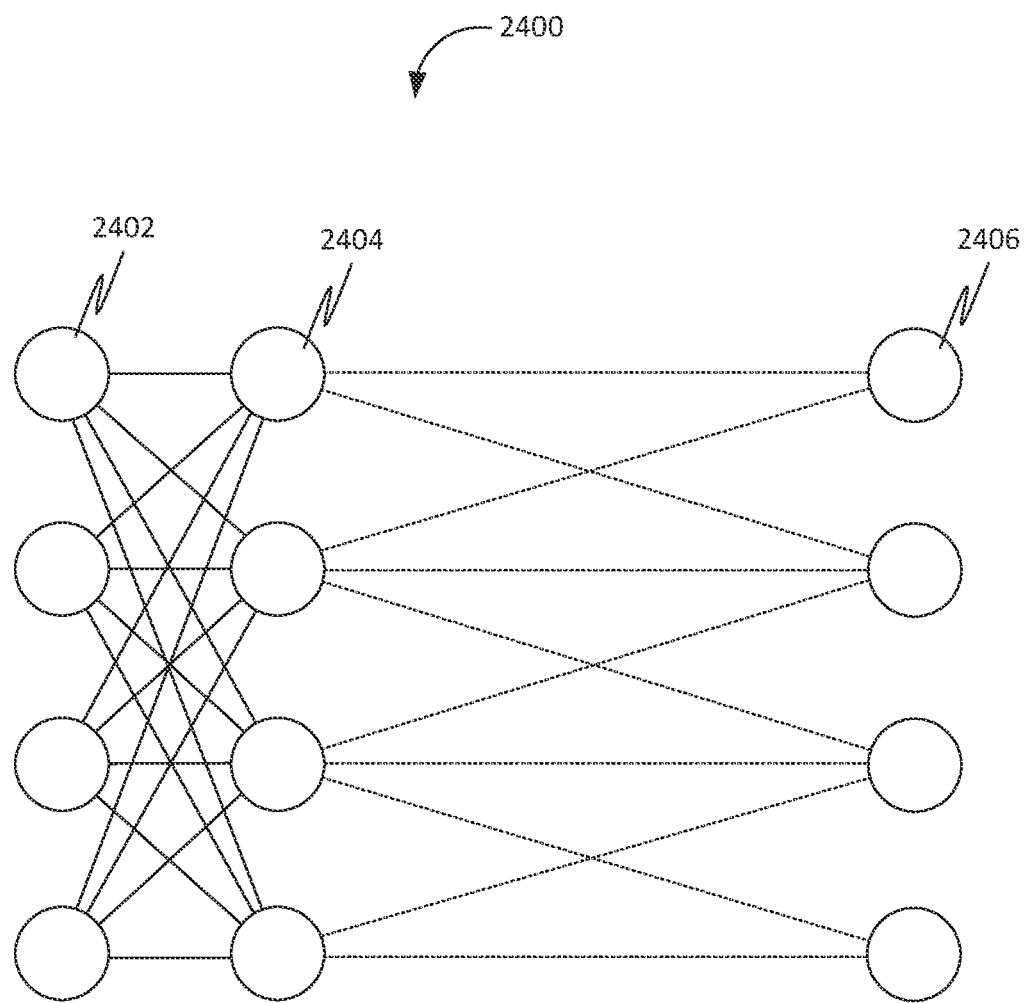
FIG. 24 illustrates a neural network model 2400 comprising a plurality of layers 2402-2406 comprising an input layer 2402, at least one middle layer 2404, one or more output layers 2406, and a plurality of parameters commonly referred to as weights and biases, in accordance with some embodiments.

FIG. 24 illustrates a neural network model 2400 comprising a plurality of layers 2402-2406 comprising an input layer 2402, at least one middle layer 2404, one or more output layers 2406, and a plurality of parameters commonly referred to as weights and biases, in accordance with some embodiments. Further, the neural network model 2400 may be trained using a method. Further, the method may include a step of providing an input to the input layer 2402. Further, the input corresponds to each of a plurality of samples comprised in a batch from a training dataset. Further, the method may include a step of obtaining one or more outputs from the neural network model 2400 based on the input. Further, the method may include a step of calculating a loss function for each of the plurality of samples comprised in the batch based on the one or more outputs and one or more corresponding desired values for each of the plurality of samples comprised in the batch. Further, the method may include a step of determining a plurality of values for the plurality of parameters based on the loss function. Further, the plurality of values for the plurality of parameters minimizes a mismatch between the one or more outputs and the one or more corresponding desired values across the plurality of samples comprised in the batch. Further, the determining of the plurality of values for the plurality of parameters may include executing at least one of one or more forward passes and one or more backward passes through the neural network model 2400. Further, the determining of the plurality of values for the plurality of parameters may include obtaining at least one curvature data based on the executing of at least one of the one or more forward passes and the one or more backward passes. Further, the at least one curvature data may include at least one of a covariance matrix and a Gram matrix of per-sample gradients. Further, the at least one curvature data may include one or more feasible approximations of at least one of the covariance matrix and the Grain matrix. Further, the determining of the plurality of values for the plurality of parameters may include obtaining at least one Sifr update based on the at least one curvature data. Further, the determining of the plurality of values for the plurality of parameters may be further based on the at least one Sifr update.

Further, in some embodiments, the determining of the plurality of values for the plurality of parameters further may include resolving at least one Sifr equation based on the at least one curvature data. Further, the obtaining of the at least one Sifr update may be based on the resolving of the at least one Sifr equation.

Further, in an embodiment, the obtaining of the at least one curvature data may be based on the at least one Sifr equation. Further, the at least one curvature data aligns with at least one resolution method for the resolving of the at least one Sifr equation.

Further, in an embodiment, the at least one Sifr equation may be $\ell_p(\theta)+(\nabla_\theta \ell_p)_T \epsilon \theta = \varepsilon_p$, for a batch of the plurality of samples, with $\ell_p(\theta)$ representing the loss associated with a particular parameter $\theta$ for a sample p, $\nabla_\theta \ell_p$ denoting a gradient of the loss function with respect to $\theta$, $\delta\theta$ signifying a parameter update, and EP representing an error term that is minimized through at least one of least squares and one or more variants of the least squares. Further the at least one Sifr equation forms the foundation for calculating the at least one Sifr update. Further, the at least one Sifr equation may be solved in least-squares, weighted least-squares or generalized least-squares sense.

Further, in some embodiments, the obtaining of the at least one curvature data: covariance or Gram matrix and approximations thereof, may include performing a Gram-backpropagation for the batch based on traversing the neural network model 2400 during the one or more backward passes. Further, the obtaining of the at least one curvature data may include obtaining a Gram matrix for the batch based on the performing of the Gram-backpropagation. Further, the obtaining of the at least one Sifr update may be further based on the Gram matrix.

Further, in an embodiment, the performing of the Gram-backpropagation may include creating one or more partial Gram matrices for each of the plurality of layers (2402-2406) based on the executing of the one or more backward passes. Further, the performing of the Gram-backpropagation may include sum reducing, aggregating, and performing an operation to the one or more partial Gram matrices of each of the plurality of layers (2402-2406) based on the creating of the one or more partial Gram matrices. Further, the obtaining of the Gram matrix may be based on the sum reducing, the aggregating, and the performing of the operation to the one or more partial Gram matrices.

Further, in some embodiments, the determining of the plurality of values for the plurality of parameters may include obtaining at least one preliminary Sifr update based on the at least one curvature data. Further, the determining of the plurality of values for the plurality of parameters may include refining the at least one preliminary Sifr update using at least one step-size search algorithm based on the obtaining of the at least one preliminary Sifr update. Further, the obtaining of the at least one Sifr update may be based on the refining. Further, the at least one Sifr update may be adapted to at least one objective associated with the training of the neural network model 2400 based on the refining.

Further, in some embodiments, the method may include a step of determining at least one constraint on at least one resource available for the training of the neural network model 2400. Further, the method may include a step of determining at least one variable associated with the training of the neural network model 2400 based on the determining of the at least one constraint. Further, at least one of the providing of the input and the determining of the plurality of values for the plurality of parameters may be based on the determining of the at least one variable.

Further, in some embodiments, the method may include a step of determining at least one characteristic associated with a convergence of the neural network model 2400 based on the loss function. Further, the method may include a step of determining at least one variable associated with the training of the neural network model 2400 based on the determining of the at least one characteristic. Further, at least one of the providing of the input and the determining of the plurality of values for the plurality of parameters may be based on the determining of the at least one variable.

Figure 25:
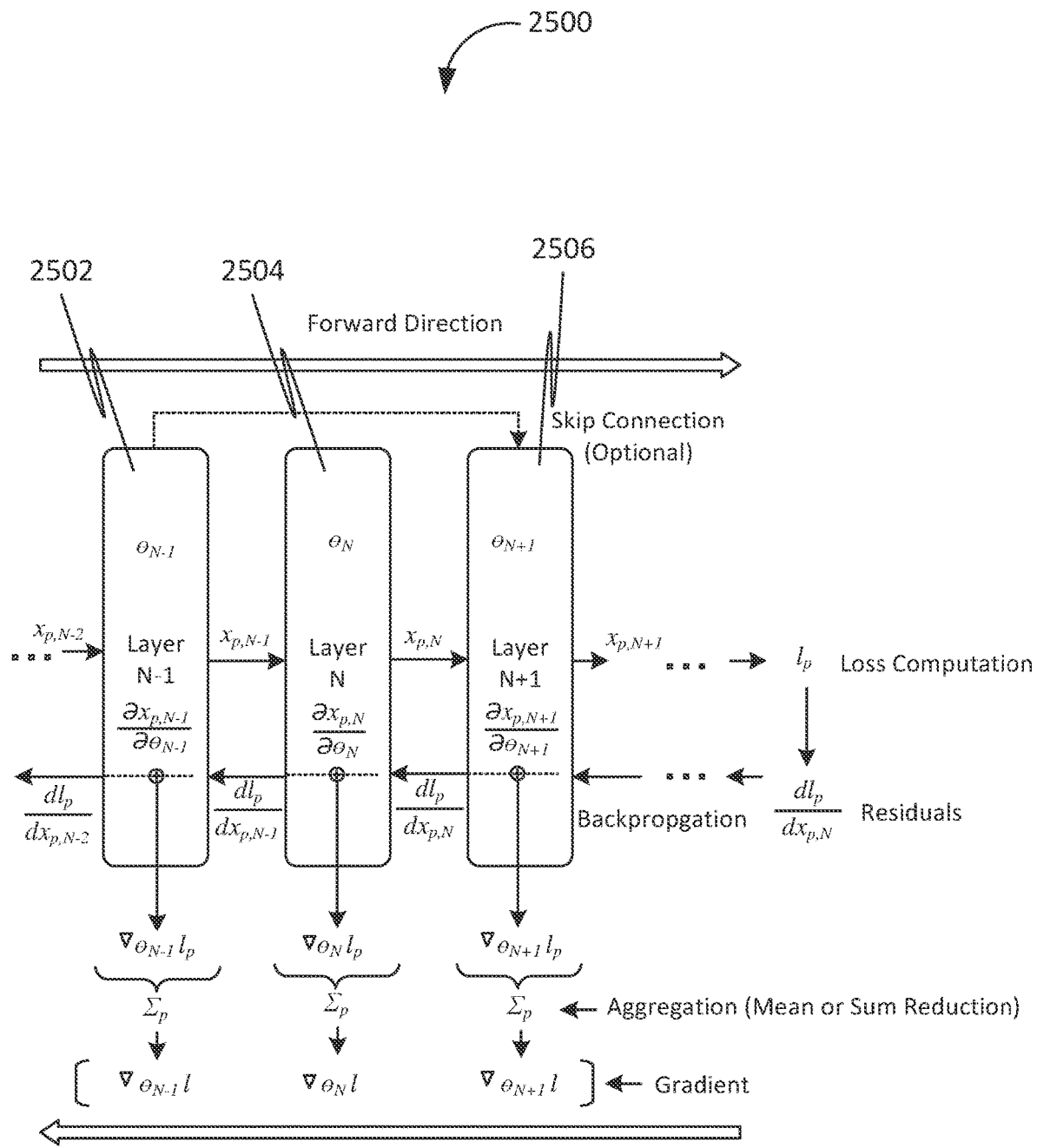
FIG. 25 illustrates a gradient calculation process for a neural network 2500.

FIG. 25 illustrates a gradient calculation process for a neural network 2500. Further, the gradient calculation process is based on forward and backward passes through a plurality of layers 2502-2506 of the neural network 2500. Further, the plurality of layers 2502-2506 may include a layer (N−1) 2502, a layer (N) 2504, a layer (N+1) 2506, etc. Further, in the gradient calculation process, the gradients-per-sample are summed or mean reduced "immediately" for a minimal use of resources. Removing the reduction and storing all the per-sample gradients is resource-intensive and not recommended for Gram matrix estimation.

Figure 26:
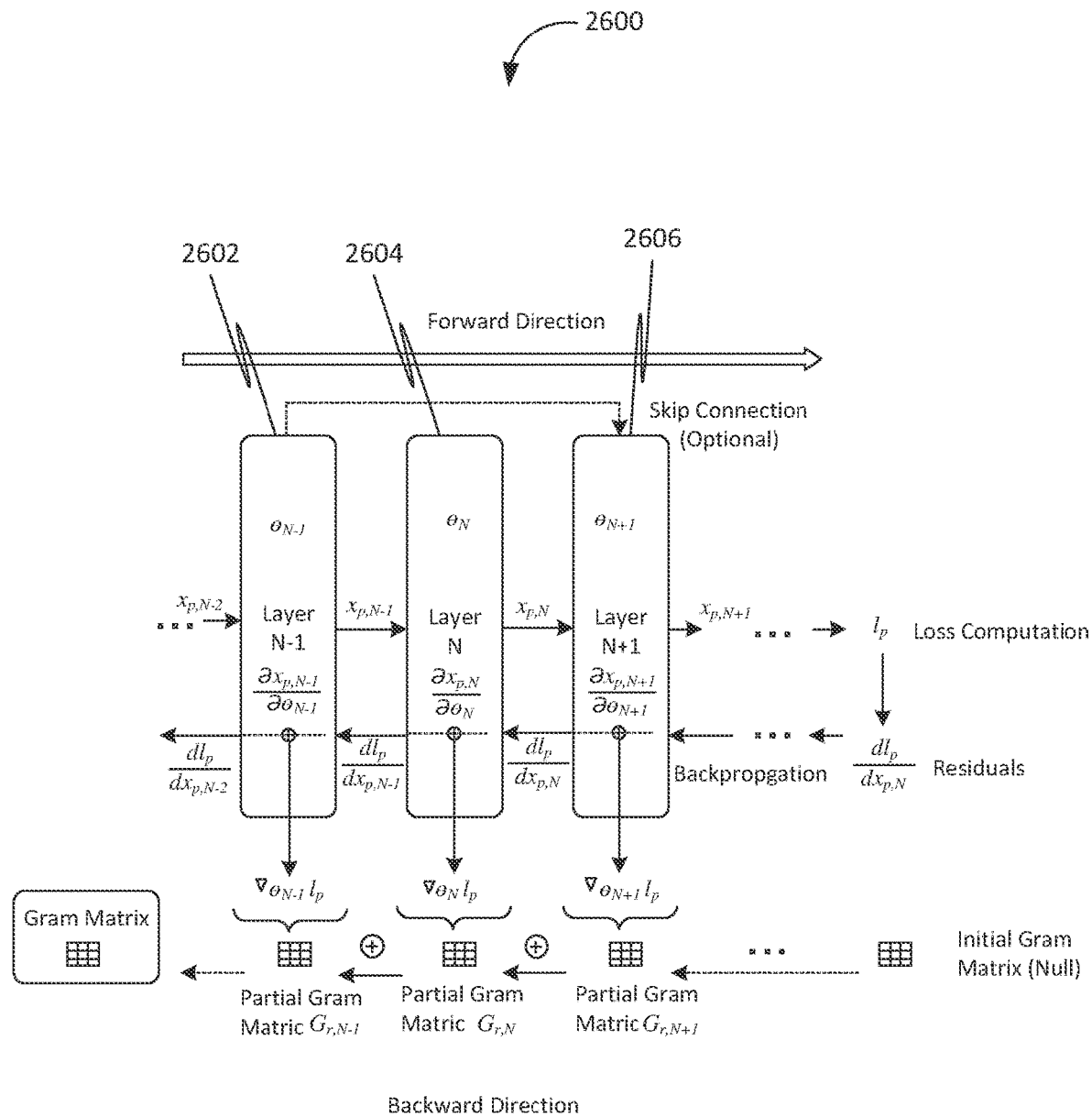
FIG. 26 illustrates a "Gram-Backpropagation" process calculation for a neural network 2600, in accordance with some embodiments.

FIG. 26 illustrates a "Gram-Backpropagation" process calculation for a neural network 2600, in accordance with some embodiments. Further, the neural network 2600 may include a plurality of layers 2602-2606. Further, the plurality of layers 2602-2606 may include a layer (N−1) 2602, a layer (N) 2604, a layer (N+1) 2606, etc. Further, the "Gram-Backpropagation" process calculation includes creating partial Gram matrices for each of the plurality of layers 2602-2606 with minimal resources, and sum reducing the partial Gram matrices the backpropagation process. Further, the "Gram-Backpropagation" makes the novel variant of the Sifr optimizer efficient for large-scale machine learning.

Figure 27:
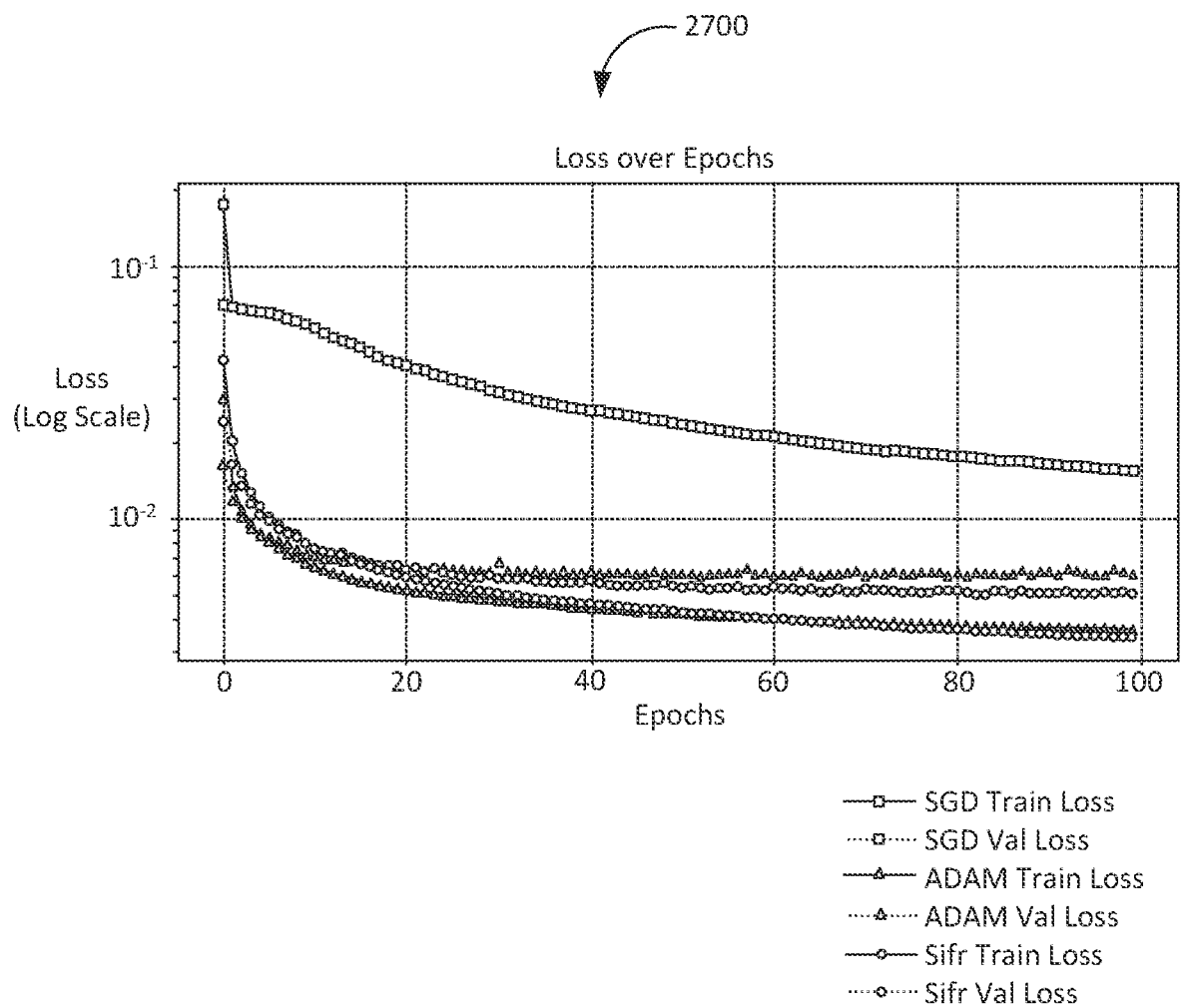
FIG. 27 is a graph 2700 of a loss over epoch for facilitating a performance comparison of a novel variant of a Sifr optimizer with other methods for neural network training, in accordance with some embodiments.

FIG. 27 is a graph 2700 of a loss over epoch for facilitating a performance comparison of a novel variant of a Sifr optimizer with other methods for neural network training, in accordance with some embodiments. Further, the other methods for the neural network training may include SGD and ADAM.

Figure 28:
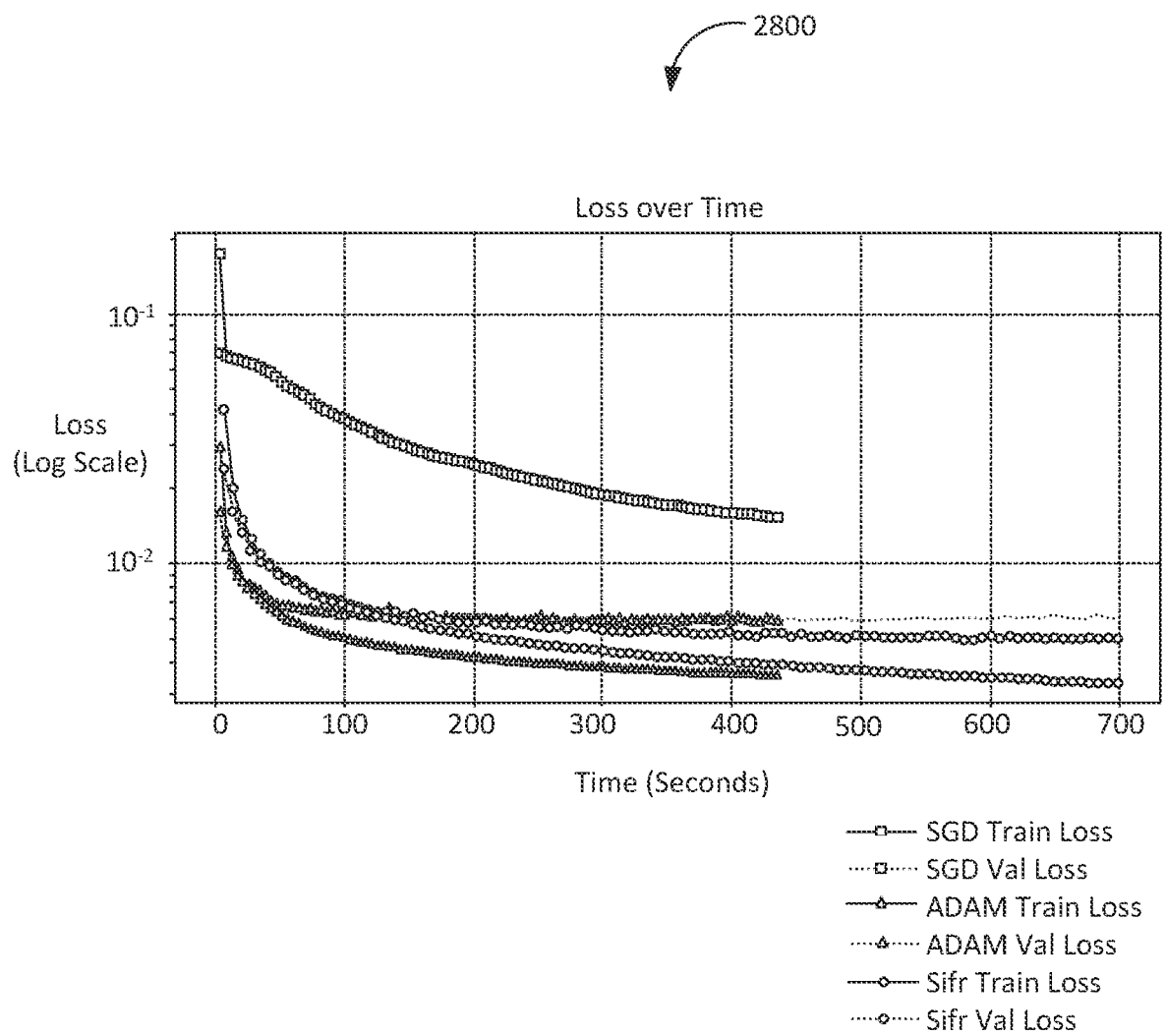
FIG. 28 is a graph 2800 of a loss over time for facilitating the performance comparison of the novel variant of the Sifr optimizer with the other methods for the neural network training, in accordance with some embodiments.

FIG. 28 is a graph 2800 of a loss over time for facilitating the performance comparison of the novel variant of the Sifr optimizer with the other methods for the neural network training, in accordance with some embodiments. Further, the graph 2700 and the graph 2800 showcase a comparison among the SGD, the ADAM, and the novel variant of the Sifr Optimizer on an autoencoder model [784, 1000, 500, 250, 30, 250, 500, 1000, 784] trained on a MNIST dataset. Despite the small size of the model—favorable for first-order methods—the novel variant of the Sifr Optimizer outperforms others in validation and loss reduction. Further, the training is executed on an NVIDIA A100 GPU (40 GB RAM), batch size 64, with configurations set to the SGD (learning rate: 0.01, momentum: 0.9), the ADAM (TensorFlow defaults), and the novel variant of the Sifr (learning rate: 1.0, momentum: 0.7). Further, the graph 2700 depicts loss metrics over epochs (log scale) and the graph 2800 depicts loss metrics over time, highlighting the novel variant of the Sifr's competitive performance even in scenarios traditionally dominated by standard $1^{st}$ order optimization techniques.

Figure 29:
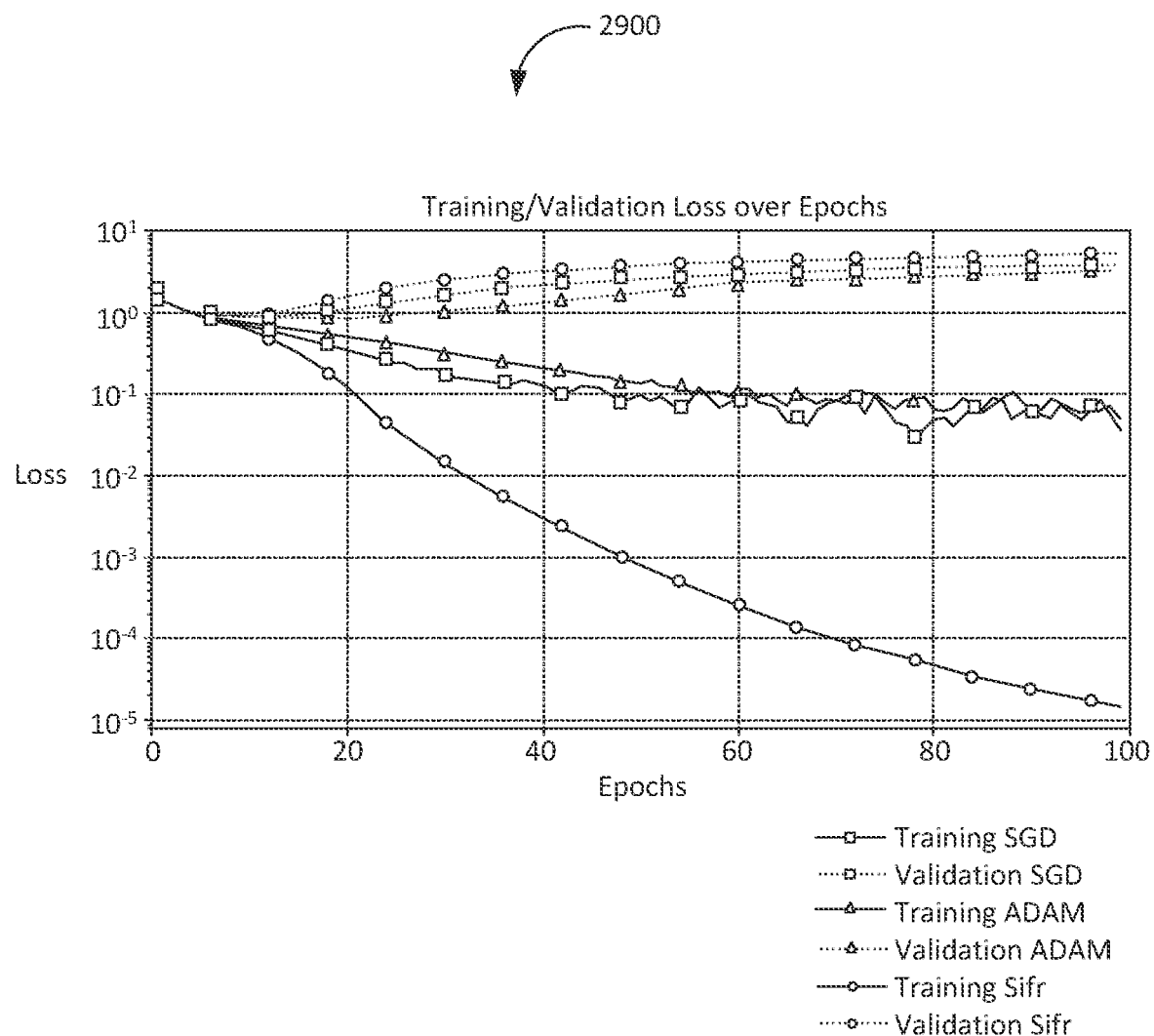
FIG. 29 is a graph 2900 of a training/validation loss over epochs for facilitating a performance comparison of a novel variant of a Sifr optimizer with other methods for neural network training, in accordance with some embodiments.

FIG. 29 is a graph 2900 of a training/validation loss over epochs for facilitating a performance comparison of a novel variant of a Sifr optimizer with other methods for neural network training, in accordance with some embodiments.

Figure 30:
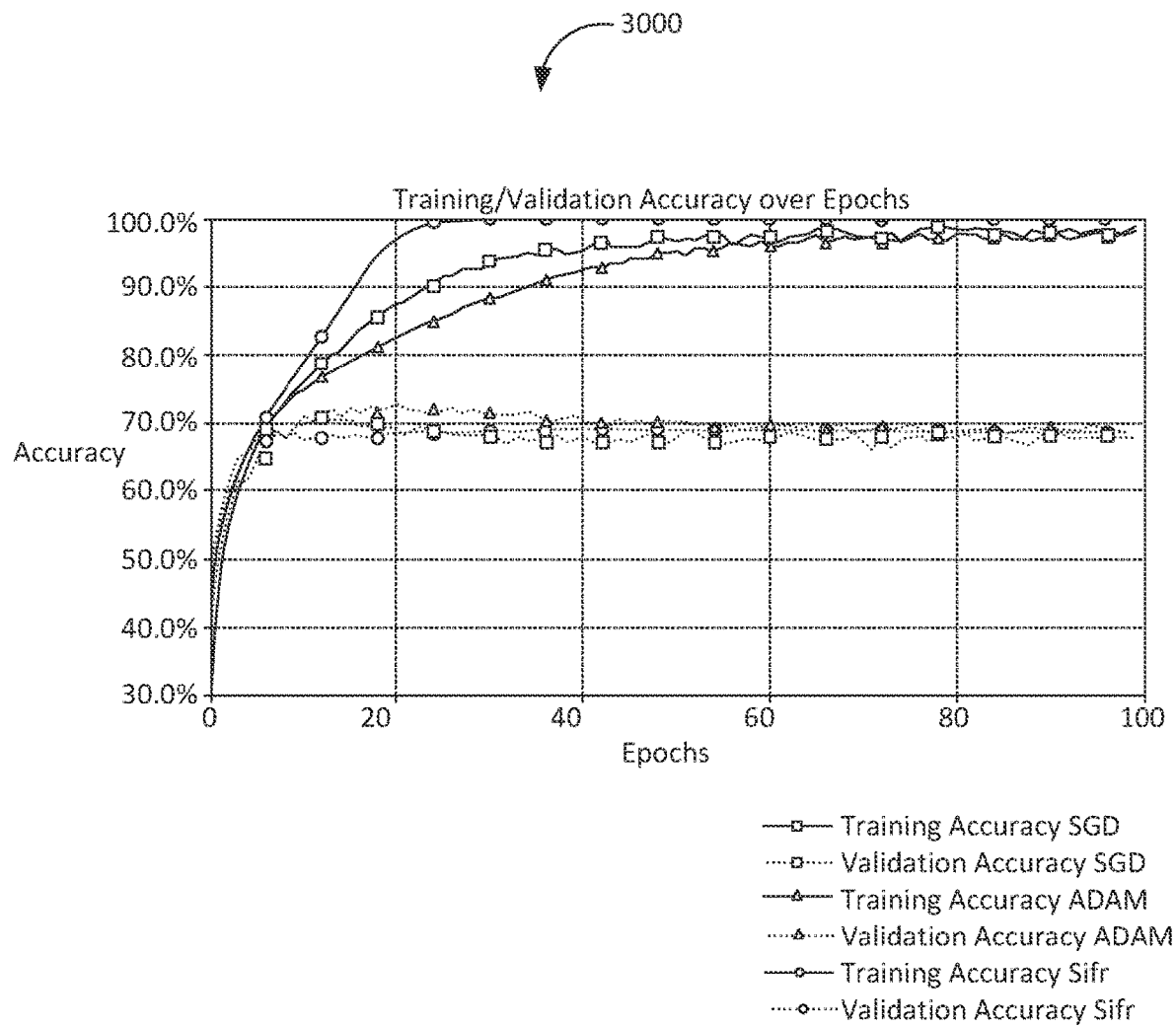
FIG. 30 is a graph 3000 of a training/validation accuracy over epochs for facilitating the performance comparison of the novel variant of the Sifr optimizer with the other methods for the neural network training, in accordance with some embodiments.

FIG. 30 is a graph 3000 of a training/validation accuracy over epochs for facilitating the performance comparison of the novel variant of the Sifr optimizer with the other methods for the neural network training, in accordance with some embodiments.

Figure 31:
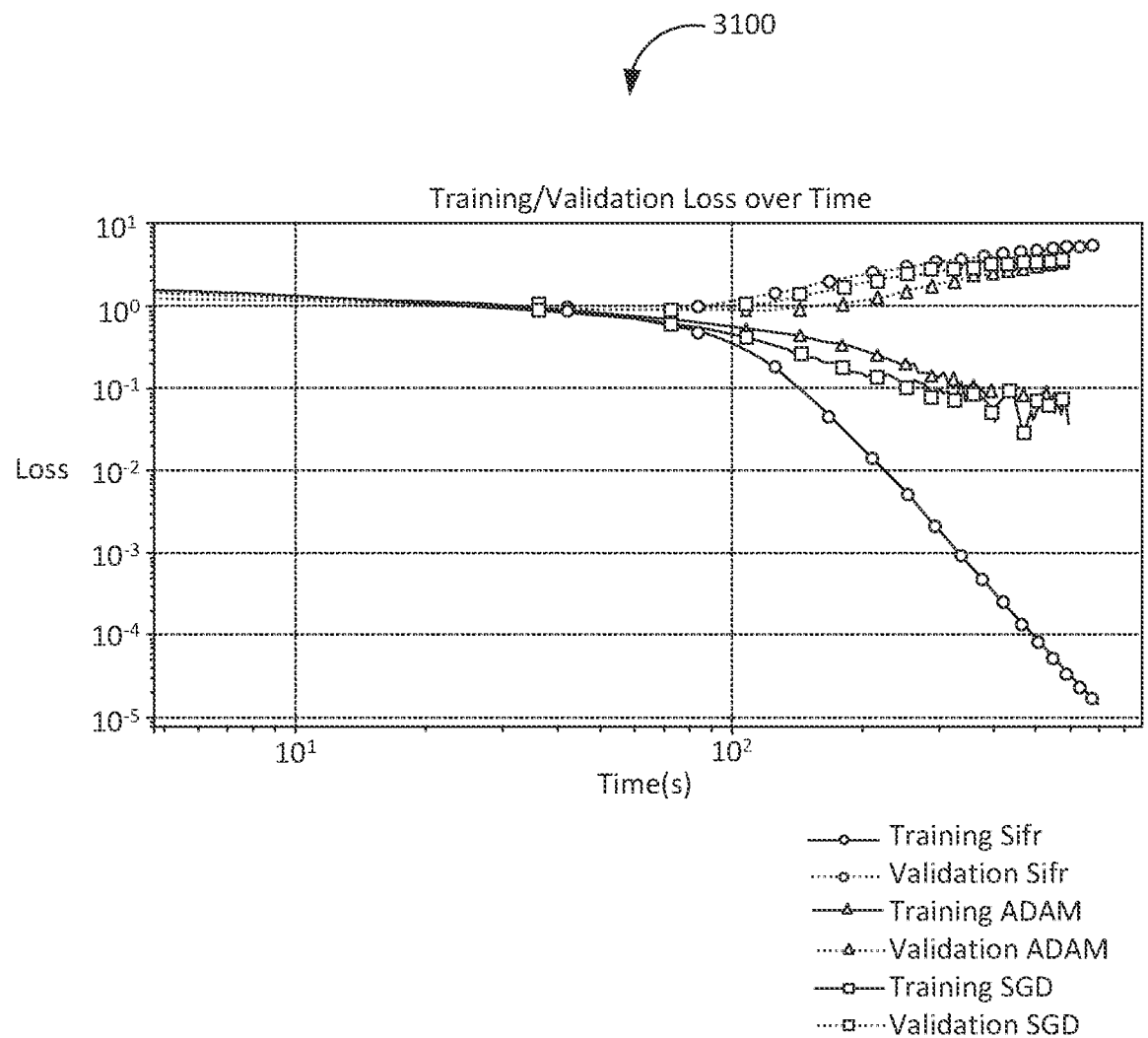
FIG. 31 is a graph 3100 of a training/validation loss over time for facilitating the performance comparison of the novel variant of the Sifr optimizer with the other methods for the neural network training, in accordance with some embodiments.

FIG. 31 is a graph 3100 of a training/validation loss over time for facilitating the performance comparison of the novel variant of the Sifr optimizer with the other methods for the neural network training, in accordance with some embodiments.

Figure 32:
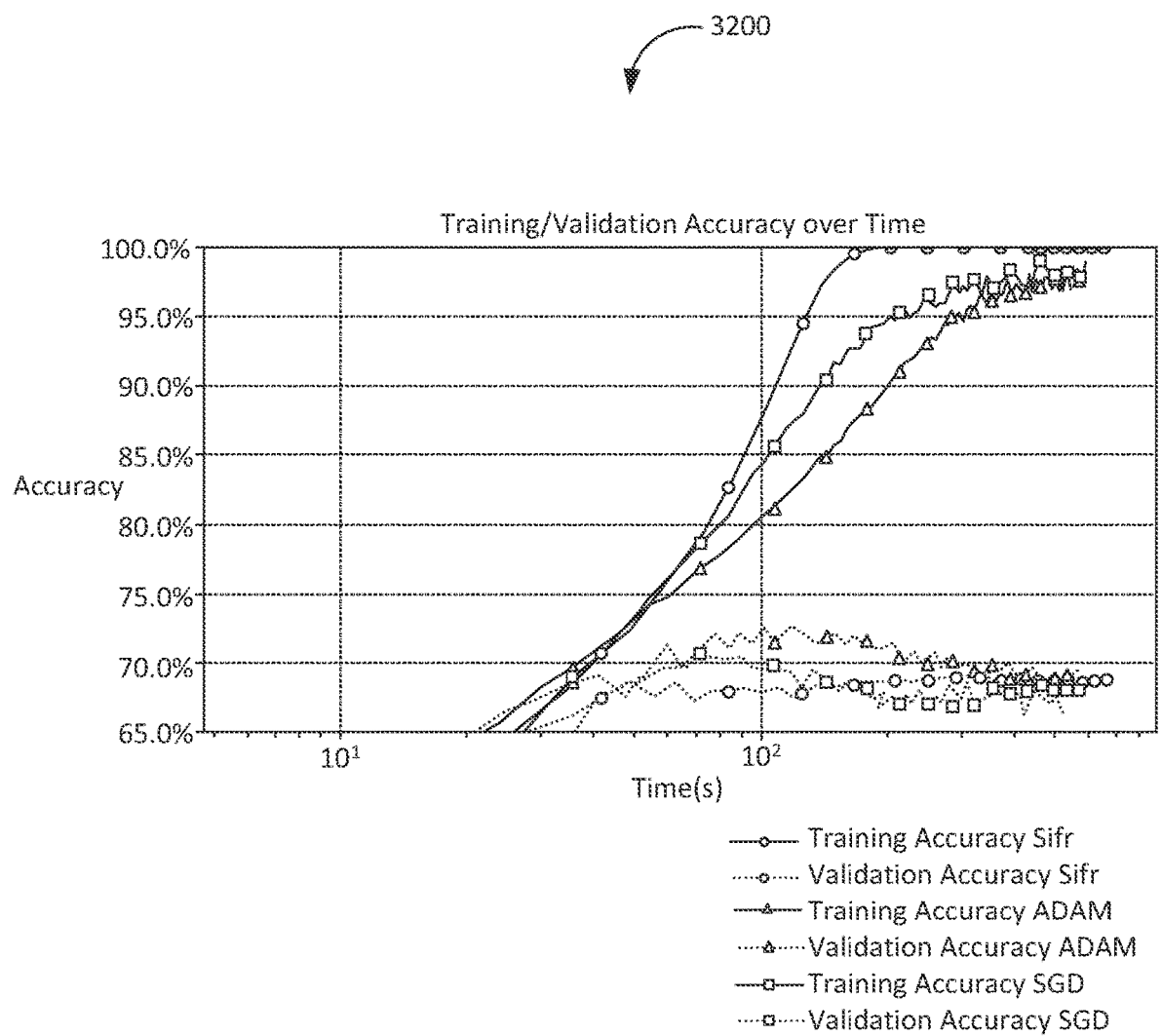
FIG. 32 is a graph 3200 of a training/validation accuracy over time for facilitating the performance comparison of the novel variant of the Sifr optimizer with the other methods for the neural network training, in accordance with some embodiments.

FIG. 32 is a graph 3200 of a training/validation accuracy over time for facilitating the performance comparison of the novel variant of the Sifr optimizer with the other methods for the neural network training, in accordance with some embodiments. Further, the graph 2900, the graph 3000, the graph 3100, and the graph 3200 illustrate the performance comparison of the novel variant of the Sifr optimizer with first-order methods, ADAM and SGD with momentum. Further, the neural network training is performed using the CIFAR-10 dataset and a convolutional network consisting of three convolutional layers and one dense, fully connected layer. The dataset was normalized to a range between 0.0 and 1.0 and split into training and validation (test) sets. A fixed learning rate of 1.0, with a 0.7 momentum was assigned for the novel variant of the Sifr Optimizer, the SGD is used with a learning rate of 0.01 and a momentum of 0.9, while the ADAM was deployed with TensorFlow's default parameters. Further, the SGD is the old standard of Machine Learning, while the ADAM is the current standard. The novel variant of the Sifr Optimizer outperforms both the SGD and the ADAM by driving the loss function sharply toward zero whilst maintaining competitive validation accuracy. Further, a Gram-Backpropagation process is key for the competitive running time of the novel variant of the Sifr optimizer. Further, the neural network training is run with one NVIDIA A100 GPU using 40 GB of RAM. Further, a batch size of 128 for a batch of the training dataset (CIFAR-10 dataset) is used for the neural network training.

Figure 33:
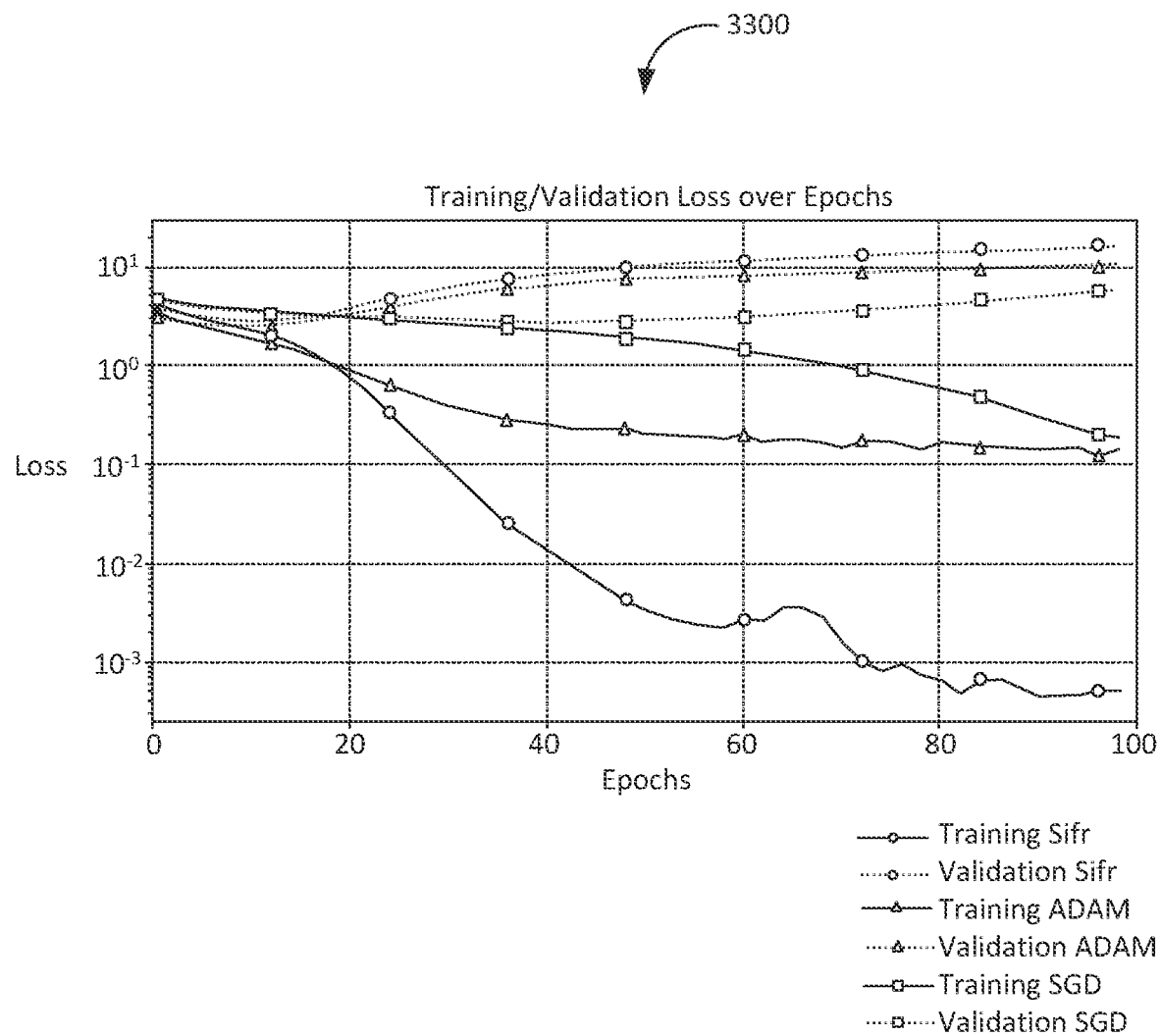
FIG. 33 is a graph 3300 of a training/validation loss over epochs for facilitating a performance comparison of a novel variant of a Sifr optimizer with other methods for neural network training, in accordance with some embodiments.

FIG. 33 is a graph 3300 of a training/validation loss over epochs for facilitating a performance comparison of a novel variant of a Sifr optimizer with other methods for neural network training, in accordance with some embodiments.

Figure 34:
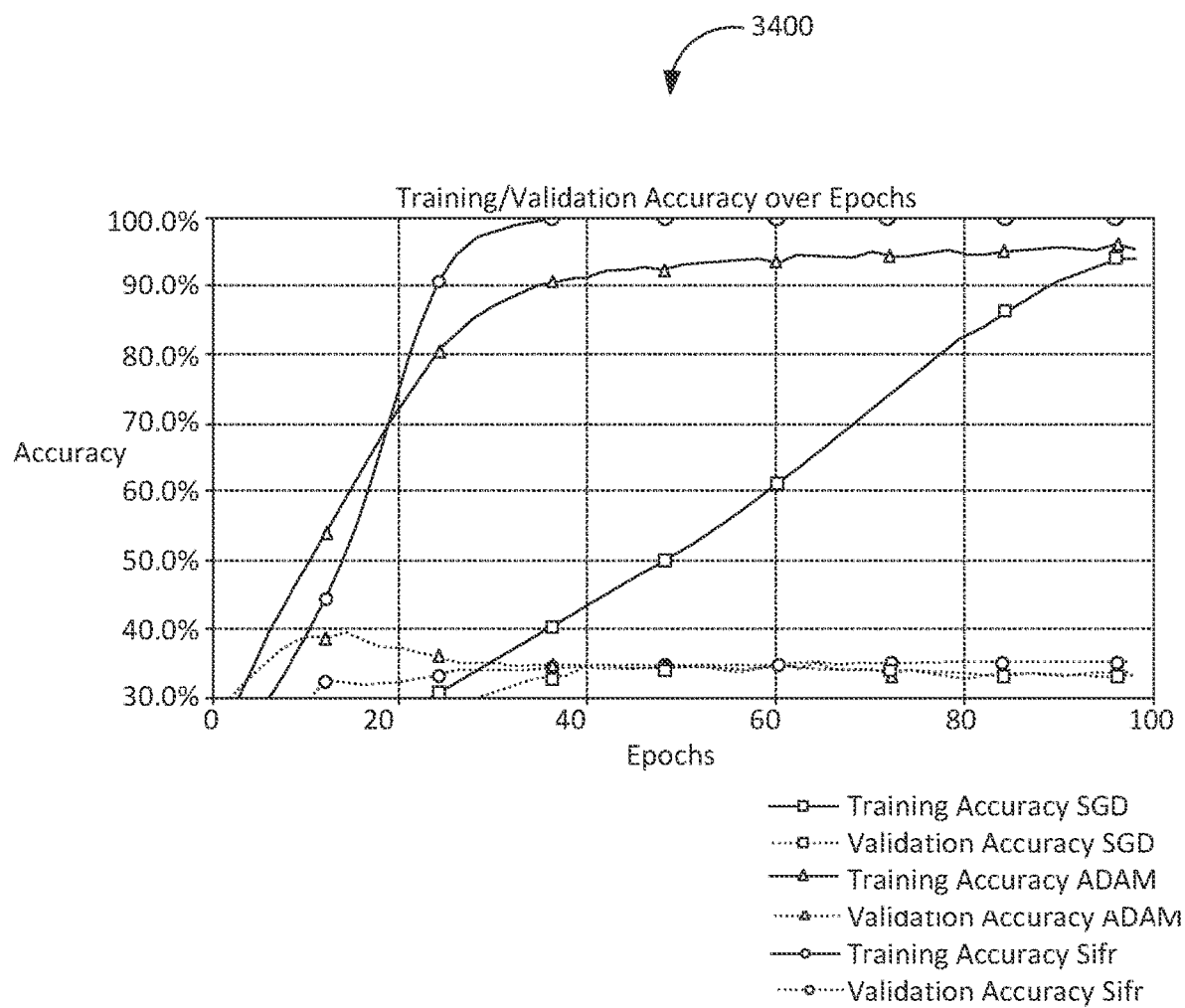
FIG. 34 is a graph 3400 of a training/validation accuracy over epochs for facilitating the performance comparison of the novel variant of the Sifr optimizer with the other methods for the neural network training, in accordance with some embodiments.

FIG. 34 is a graph 3400 of a training/validation accuracy over epochs for facilitating the performance comparison of the novel variant of the Sifr optimizer with the other methods for the neural network training, in accordance with some embodiments.

Figure 35:
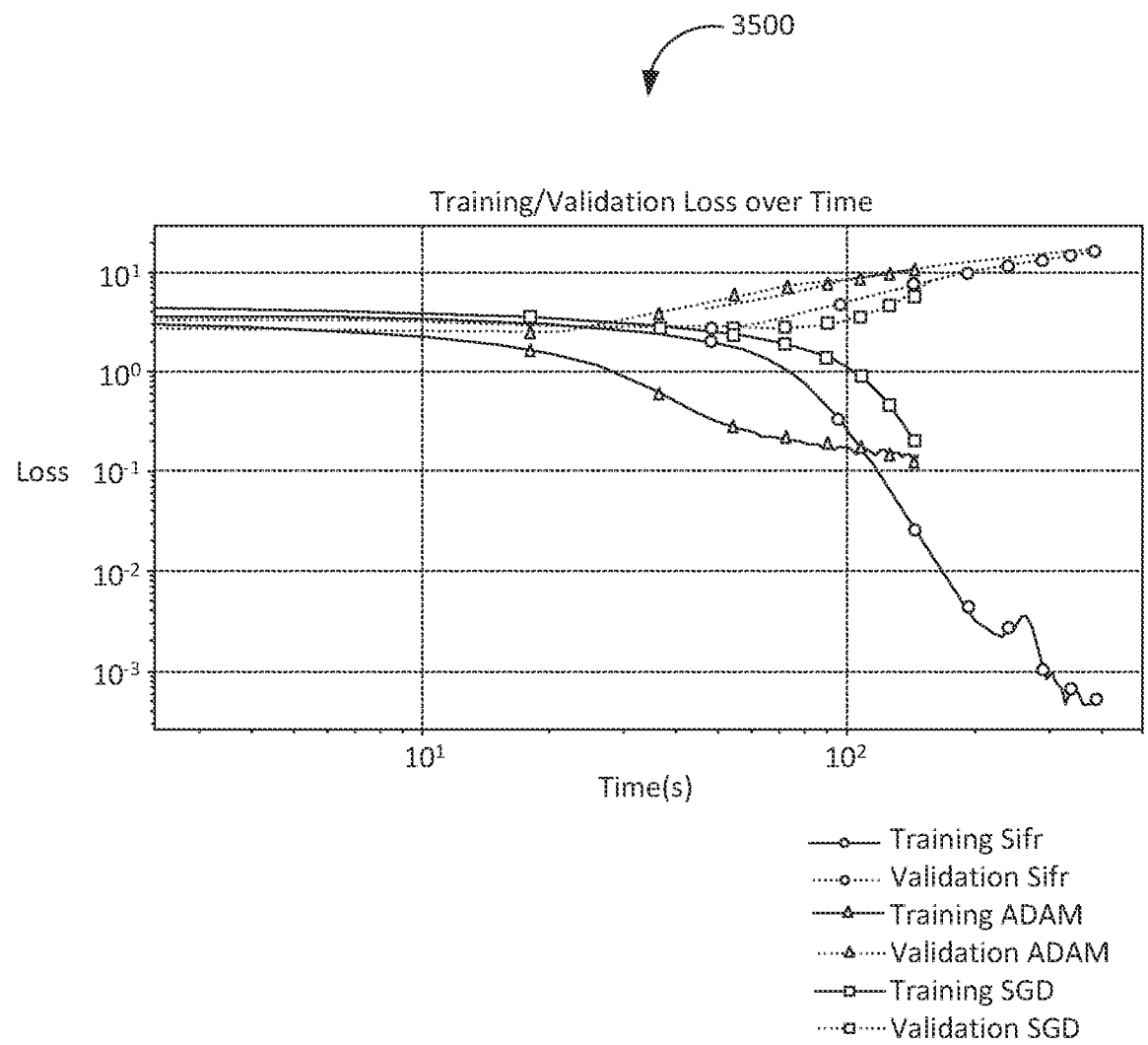
FIG. 35 is a graph 3500 of a training/validation loss over time for facilitating the performance comparison of the novel variant of the Sifr optimizer with the other methods for the neural network training, in accordance with some embodiments.

FIG. 35 is a graph 3500 of a training/validation loss over time for facilitating the performance comparison of the novel variant of the Sifr optimizer with the other methods for the neural network training, in accordance with some embodiments.

Figure 36:
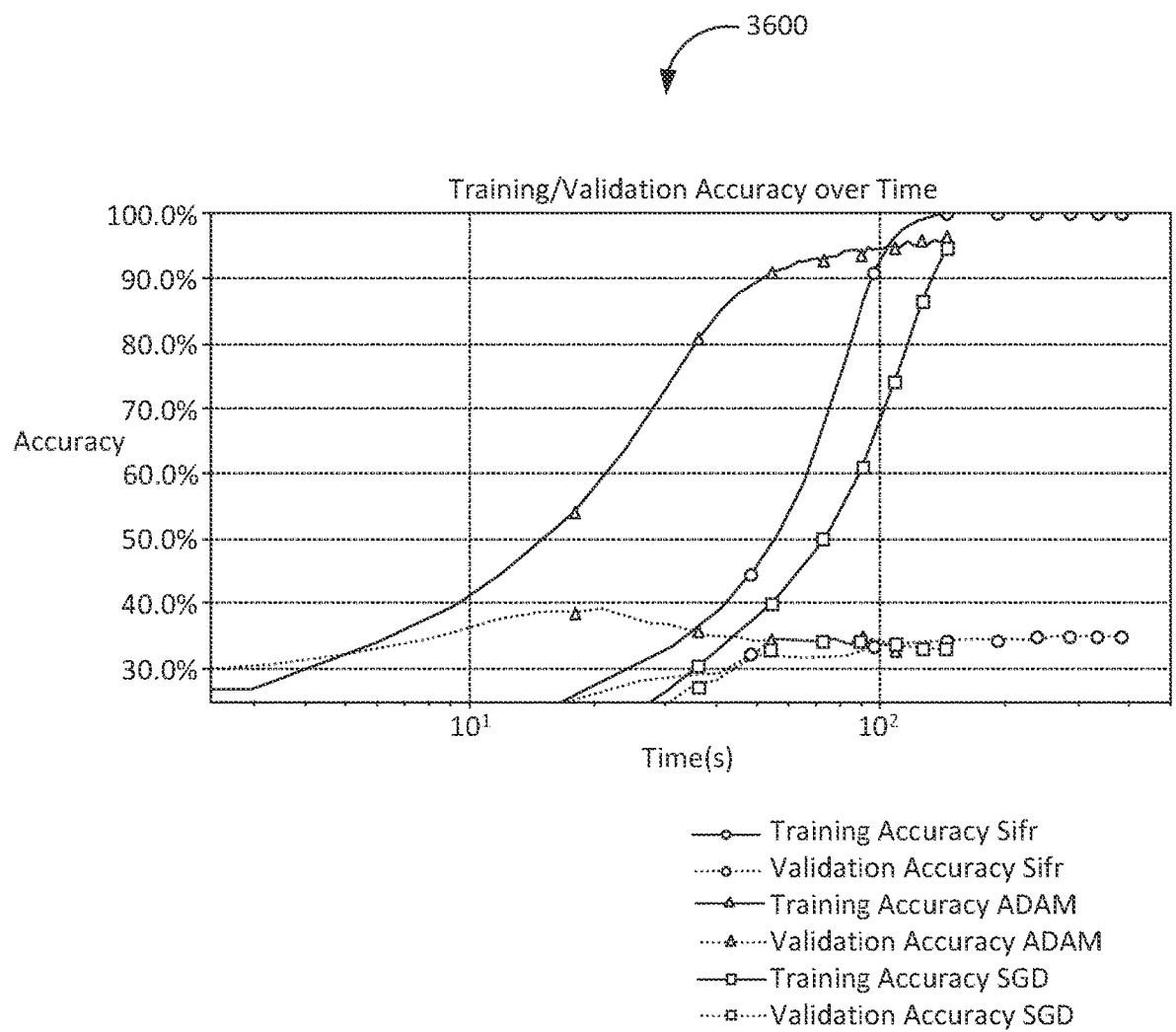
FIG. 36 is a graph 3600 of a training/validation accuracy over time for facilitating the performance comparison of the novel variant of the Sifr optimizer with the other methods for the neural network training, in accordance with some embodiments.

FIG. 36 is a graph 3600 of a training/validation accuracy over time for facilitating the performance comparison of the novel variant of the Sifr optimizer with the other methods for the neural network training, in accordance with some embodiments. Further, the graph 3300, the graph 3400, the graph 3500, and the graph 3600 illustrate the performance comparison of the novel variant of the Sifr optimizer against benchmark first-order techniques, including ADAM and SGD with momentum, utilizing the CIFAR-100 dataset. This dataset was processed through a neural network architecture comprising three convolutional layers followed by a densely connected layer. Prior to training, the dataset underwent normalization within the 0.0 to 1.0 range and was subsequently divided into training and validation subsets. The novel variant of the Sifr Optimizer employed a constant learning rate of 1.0 and momentum of 0.7. Further, the ADAM and the SGD were executed with their default settings in TensorFlow. Traditionally, the SGD has been the benchmark in Machine Learning, with the ADAM emerging as the contemporary norm. In the neural network training, the novel variant of the Sifr Optimizer demonstrates a superior loss reduction efficiency and maintains a robust validation accuracy when compared to the SGD and the ADAM. The neural network training includes the use of a single NVIDIA A100 GPU and 40 GB of RAM, with a batch size of 128, over 50 epochs. The novel variant of the Sifr optimizer is able to reach 99% training accuracy after only 17 epochs, and 99.9% at 23 epochs. Further, the ADAM and the SGD do not even reach these training accuracies after 50 epochs of training.

Figure 37:
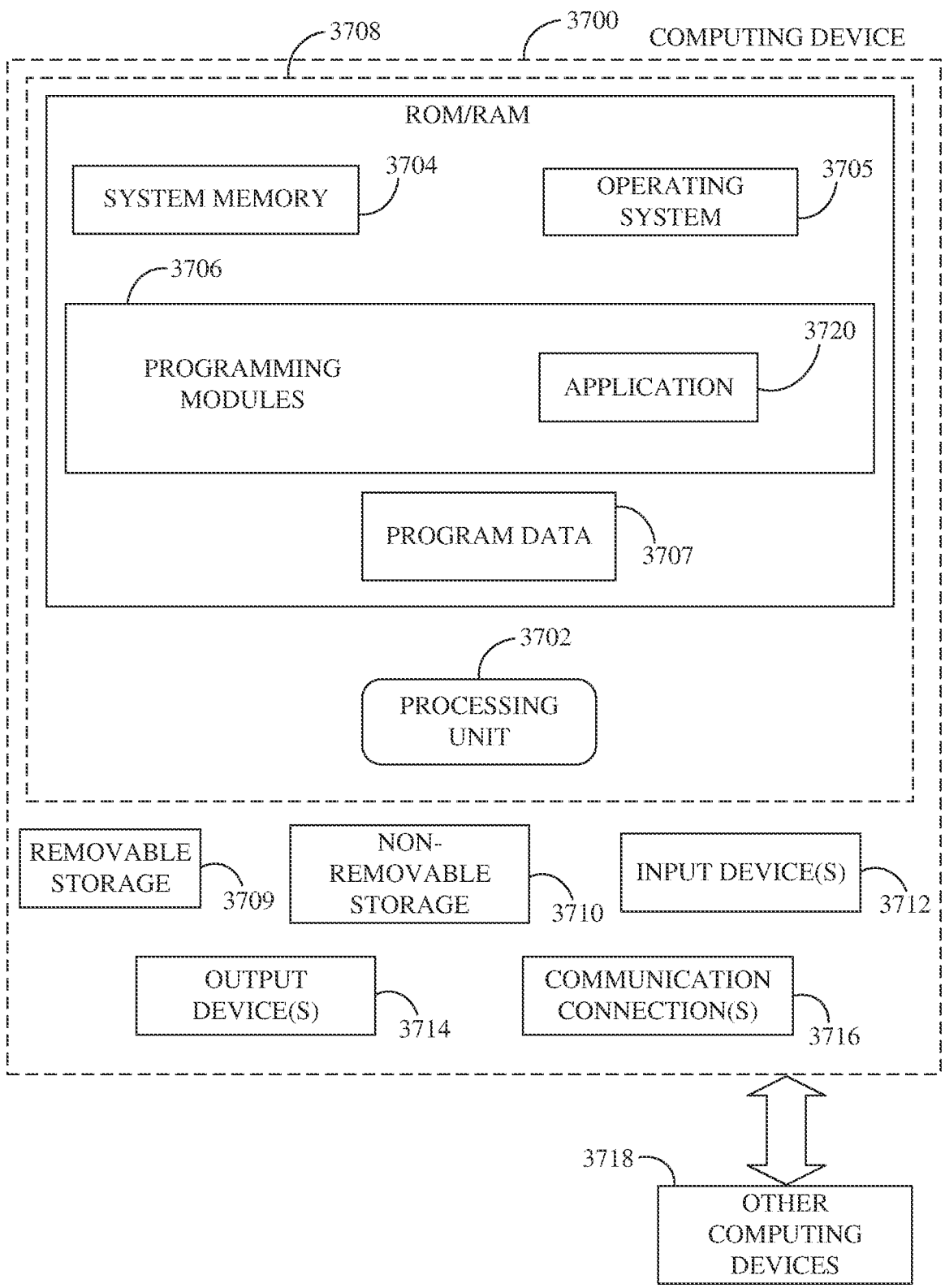
FIG. 37 is a block diagram of a computing device for implementing the methods disclosed herein, in accordance with some embodiments.

With reference to FIG. 37, a system consistent with an embodiment of the disclosure may include a computing device or cloud service, such as computing device 3700. In a basic configuration, computing device 3700 may include at least one processing unit 3702 and a system memory 3704. Depending on the configuration and type of computing device, system memory 3704 may comprise, but is not limited to, volatile (e.g., random-access memory (RAM)), non-volatile (e.g., read-only memory (ROM)), flash memory, or any combination. System memory 3704 may include operating system 3705, one or more programming modules 3706, and may include a program data 3707. Operating system 3705, for example, may be suitable for controlling computing device 3700's operation. In one embodiment, programming modules 3706 may include image-processing module and machine learning module. Furthermore, embodiments of the disclosure may be practiced in conjunction with a graphics library, other operating systems, or any other application program and is not limited to any particular application or system. This basic configuration is illustrated in FIG. 37 by those components within a dashed line 3708.

Computing device 3700 may have additional features or functionality. For example, computing device 3700 may also include additional data storage devices (removable and/or non-removable) such as, for example, magnetic disks, optical disks, or tape. Such additional storage is illustrated in FIG. 37 by a removable storage 3709 and a non-removable storage 3710. Computer storage media may include volatile and non-volatile, removable and non-removable media implemented in any method or technology for storage of information, such as computer-readable instructions, data structures, program modules, or other data. System memory 3704, removable storage 3709, and non-removable storage 3710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3700. Any such computer storage media may be part of device 3700. Computing device 3700 may also have input device(s) 3712 such as a keyboard, a mouse, a pen, a sound input device, a touch input device, a location sensor, a camera, a biometric sensor, etc. Output device(s) 3714 such as a display, speakers, a printer, etc. may also be included. The aforementioned devices are examples and others may be used.

Computing device 3700 may also contain a communication connection 3716 that may allow device 3700 to communicate with other computing devices 3718, such as over a network in a distributed computing environment, for example, an intranet or the Internet. Communication connection 3716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3704, including operating system 3705. While executing on processing unit 3702, programming modules 3706 may perform processes including, for example, one or more stages of methods, algorithms, systems, applications, servers, databases as described above. The aforementioned process is an example, and processing unit 3702 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

According to some aspects, a method for optimizing a neural network may include receiving an initial model of a neural network, implementing the Sifr optimizer that pursues parameter updates leading to exact Newton update at layers where the loss function is computed, and optimizing the model parameters until convergence of the optimization process or a stopping criterion is met.

Further, according to some aspects, the Sifr optimizer mitigates computational complexities associated with second-order optimization by solving for a reduced number of parameters equivalent to the batch size, irrespective of the model parameter dimensions.

Further, according to some aspects, the Sifr optimizer utilizes damping to enhance the conditioning of its inherent system, thereby facilitating more effective neural network training.

Further, according to some aspects, the Sifr optimizer employs convexity corrected gradients to reduce the parameters search space, leading to improved computational efficiency.

Further, according to some aspects, the Sifr Optimizer optimizes the training across various neural network architectures with standard activation functions, including but not limited to Convolutional Neural Networks (CNNs), Recurrent Neural Networks (RNNs), and Transformers.

Further, according to some aspects, the Sifr Optimizer accomplishes a rapid reduction in loss per epoch and reaches a lower loss level beyond what standard methods achieve, while maintaining competitive accuracy performance.

Further, according to some aspects, the Sifr optimizer enables accelerated convergence and improved fitting in neural network training by considering parameters search to create an exact Newton update at layers where the loss function is computed.

Further, according to some aspects, the Sifr optimizer effectively trains neural networks with a large number of layers, demonstrating its scalability and adaptability to various scales of neural network implementations.

Further, according to some aspects, the Sifr Optimizer effectively trains neural networks on various tasks, including but not limited to image classification, language modeling, and reinforcement learning.

Further, according to some aspects, the Sifr Optimizer effectively trains neural networks with various types of data, including but not limited to images, text, audio, and video, illustrating its versatility across different data types and tasks.

Further, according to some aspects, the Sifr Optimizer addresses non-convexity issues that are inherent in the standard Newton method by including quadratic terms when canceling the gradient, further enhancing the optimization process.

Further, according to some aspects, the Sifr Optimizer applies theoretical considerations that depart from standard Newton methods, yielding an optimizer that performs second-order updates without the computational complexity of forming the Hessian or its inverse.

Further, according to some aspects, the Sifr Optimizer achieves dimensionality reduction during the optimization process by leveraging the differential properties inherent in neural networks.

Further, according to some aspects, the Sifr Optimizer effectively optimizes various neural network architectures regardless of their size, demonstrating the scalability and versatility of the method.

According to some aspects, a device (computing system) for neural network optimization configured with standard components and potentially benefiting from additional resources such as multiple GPUs and extra RAM, may include an interface for inputting the initial model of the neural network, a data processing unit (processor) implementing the Sifr optimizer for training the neural network.

Further, according to some aspects, the Sifr optimizer in the data processing unit characterizes the Sifr update for optimization by reducing the parameter space to a vector of size equivalent to the batch size.

Further, according to some aspects, the Sifr optimizer in the data processing unit performs second-order updates, accommodating convexity corrections, and reducing dimensionality, leading to an efficient and accurate optimization process.

Further, according to some aspects, the Sifr optimizer in the data processing unit optimizes the training across various neural network architectures with standard activation functions, providing enhanced second-order training functionality across different neural network designs.

Further, according to some aspects, the data processing unit is configured with specific components and settings to facilitate the implementation of the Sifr Optimizer, providing a hardware solution that supports the efficient optimization of neural networks.

Further, according to some aspects, the Sifr Optimizer in the data processing unit can be efficiently implemented on multiple GPUs and with extensive RAM, demonstrating the flexibility of the method with respect to hardware configurations.

According to some aspects, a neural network training method employing a novel variant of "Sifr optimizer", adaptable to multiple architectures and batch sizes, which accelerates training by utilizing curvature information and network traits to compute a practical second-order "Sifr update", is disclosed. Further, the method may include receiving inputs for a batch from a training dataset at an input layer, with batch sizes flexible based on hardware capabilities. Further, the method may include generating outputs by one or more output layers in response to the inputs. Further, the method may include computing a loss function for each sample against target values, with the option for additional regularization. Further, the method may include optimizing parameters, including weights and biases, to minimize output-target disparities. Further, the optimization may include executing forward and backward passes through the network. Further, the optimization may include collecting key data during these passes for the novel variant of the "Sifr equation", enabling the second-order "Sifr update". Further, the data collection adapts to computational capacity and may cover sample-specific losses, their respective derivatives with respect to the network output, and curvatures (the latter being the loss function's second derivative), the Jacobian matrix, associated with network outputs and parameters, applicable for small networks with ample resources, per-sample gradients or their curvature-adjusted versions, subject to computational availability, and the covariance or the Gram matrix of these gradients, preferred for efficiency or when large matrices are impractical. Further, the optimization may include integrating these elements to solve the novel variant of the Sifr equation, leading to the Sifr update. This optimizer broadens support for various network types, beyond feedforward networks, adapts to various batch sizes, and addresses optimization landscape complexities. The Sifr update's development is tailored to the available computational infrastructure, particularly memory, to enhance the network's training.

Further, according to some aspects, the novel variant of the "Sifr optimizer" selectively gathers data from forward and backward passes, focusing on the novel variant of the Sifr equation's components rather than calculating the Sifrian functional, to align with the chosen resolution method.

Further, according to some aspects, the method may include deriving the "Sifr update" directly from the Jacobian matrix when resources allow, using a least squares method with potential for damping, and foregoing dimensionality reduction.

Further, according to some aspects, applying dimensionality reduction to the Jacobian for second-order updates leads to the novel variant of the "Sifr equation". This method utilizes gradients and output-layer Newton updates to form a manageable system, adaptable to resource availability, with an option for damping, and solvable directly or iteratively.

Further, according to an aspect, the method may include solving the novel variant of the "Sifr equation" to conserve memory for large networks. Further, the backpropagation leverages incremental Gram matrix computations (layer by layer for example) instead of aggregating gradients, bypassing the need for storing individual per-sample gradients. With large-scale networks, the batch size being smaller than the parameter count makes the Gram matrix an efficient tool in resolving the novel variant of the Sifr equation using a least squares method with optional damping. Depending on the batch size, the inverse Gram matrix is applied precisely or iteratively through linear solvers to the reduced Newton updates at the output layer, formulating the efficient "Sifr update" for diverse network configurations.

Further, according to an aspect, the resolving of the novel variant of the Sifr equation excludes storage of per-sample gradients and instead estimates the Gram matrix. This estimation allows for either a direct or iterative calculation of the inverse's influence on the reduced Newton updates at the output layer. Such calculation results in a coefficient vector, which is employed to determine a weighted loss for each sample. A subsequent backward pass processes these weighted losses, producing the Sifr update as an adjusted gradient that requires minimal memory, thereby streamlining the second-order update process and improving the overall efficiency of neural network training.

Further, according to an aspect, the estimation of the Sifr update is performed through a weighted or generalized least squares method, instead of a classical least-squares method.

Further, according to an aspect, the Sifr update is constructed iteratively using rapid matrix-vector multiplication available typically through forward-mode automatic differentiation. Employing iterative algorithms such as the conjugate gradient method, the Sifr update is refined from an initial approximation. This process utilizes fast matrix-vector operations to iteratively enhance the output, thereby achieving the targeted Newton updates at the output layer.

Further, according to some aspects, the method may include an optional adaptive step size selection feature, which may employ line search strategies or equivalent techniques conforming to predefined convergence criteria. This feature ensures that each step in the update sequence meaningfully aids in achieving convergence, thereby optimizing the learning path of the neural network model.

Further, according to an aspect, the Sifr update includes a further dimensionality reduction technique employing a sketching algorithm to selectively condense the computational task in accordance with resource constraints. This approach facilitates a feasible update process tailored to operate efficiently within environments with limited computational resources.

Further, according to some aspects, the method may include employing an adaptive damping mechanism that modulates based on the network's parameters or the norm of the gradients within the batch, thereby optimizing the stability and promoting convergence during the neural network training process.

Further, according to some aspects, the method may include employing adaptive enhancement of the Sifr update, which may include, but not limited to, momentum and weight decay techniques. Subsequent iterations leverage prior computed Sifr updates as supplementary information to incrementally refine the training process.

Further, according to an aspect, the iterative refinement incorporates a feedback loop capable of dynamically modulating the batch size for the Sifr update estimation to either enhance convergence by exposing the network to larger input or to adapt to computational constraints, thus ensuring the training process is optimized for both effectiveness and operational efficiency.

Further, according to an aspect, the dynamic batch size adjustment for the Sifr update estimation is directed by a hardware predictive model that forecasts computational resource allocation, thus maintaining training efficacy without detracting from the Sifr update's methodological integrity.

Further, according to an aspect, the method may include performing a preprocessing operation on the inputs designed to favorably condition the Gram matrix, thereby reinforcing the stability of the Sifr update against input data anomalies.

Further, according to some aspects, the method may include the execution of two or several consecutive Sifr updates to create accelerations, such as in Nesterov acceleration, wherein a sequence of two or more Sifr updates is applied in tandem to formulate an accelerated update, thereby enhancing the refinement of the neural network model's training process.

Further, according to some aspects, the Sifr update is integrated with adversarial training techniques, employing the novel variant of the Sifr optimizer to create adversarial perturbations or to adjust the neural network model in response to adversarially perturbed inputs, which promotes the model's resilience to input variations and adversarial attacks.

Further, according to some aspects, the Sifr update is applied to a neural network model and is enhanced by one or more generalization-promoting strategies. Such strategies include but are not limited to, regularization techniques like sharpness aware minimization or variance reduction, which are known to steer model parameters towards flat regions of the loss surface that are associated with enhanced generalization. These strategies are integrated with the Sifr update to synergistically expedite the neural network training while maintaining robustness against overfitting.

Further, according to some aspects, the method may include incorporating dropout strategies in tandem with the Sifr update to increase the neural network model's ability to generalize. This method probabilistically deactivates neurons during the training phase with the novel variant of the Sifr optimizer, particularly addressing the overfitting tendencies associated with second-order optimization methods, while concurrently capitalizing on the efficiency afforded by the Sifr update.

Further, according to some aspects, the method may include encompassing a regime of input augmentation and noise perturbation aimed at countering the overfitting that might be associated with the novel variant of the Sifr optimizer usage. This technique methodically varies the input data through targeted transformations and controlled noise introduction before training with the novel variant of the Sifr optimizer. In this context, the Sifr update is leveraged to adapt the model to efficiently generalize from modified and noise-injected inputs.

Although the present disclosure has been explained in relation to its preferred embodiment, it is to be understood that many other possible modifications and variations can be made without departing from the spirit and scope of the disclosure.

What is claimed is:

1. A method for training a neural network model having a plurality of layers comprising an input layer, at least one middle layer, one or more output layers, and a plurality of parameters commonly referred to as weights and biases, the method comprising:

providing an input to the input layer, wherein the input corresponds to each of a plurality of samples comprised in a batch from a training dataset;

obtaining one or more outputs from the neural network model based on the input;

calculating a loss function for each of the plurality of samples comprised in the batch based on the one or more outputs and one or more corresponding desired values for each of the plurality of samples comprised in the batch; and determining a plurality of values for the plurality of parameters based on the loss function, wherein the plurality of values for the plurality of parameters minimizes a mismatch between the one or more outputs and the one or more corresponding desired values across the plurality of samples comprised in the batch, wherein the determining of the plurality of values for the plurality of parameters comprises:

executing at least one of one or more forward passes and one or more backward passes through the neural network model;

obtaining at least one curvature data based on the executing of at least one of the one or more forward passes and the one or more backward passes, wherein the at least one curvature data comprises at least one of a covariance matrix and a Gram matrix of per-sample gradients, wherein the at least one curvature data further comprises one or more feasible approximations of at least one of the covariance matrix and the Gram matrix, wherein the one or more feasible approximations comprises at least one of diagonal matrices and block-diagonal matrices;

obtaining at least one Sifr update based on the at least one curvature data, wherein the determining of the plurality of values for the plurality of parameters is further based on the at least one Sifr update, wherein the at least one curvature data informs a computation of the at least one Sifr update; and resolving at least one Sifr equation based on the at least one curvature data, wherein the obtaining of the at least one Sifr update is further based on the resolving of the at least one Sifr equation.

2. The method of claim 1, wherein the obtaining of the at least one curvature data is further based on the at least one Sifr equation, wherein the at least one curvature data aligns with at least one resolution method for the resolving of the at least one Sifr equation.

3. The method of claim 1, wherein the at least one Sifr equation is $\ell_p(\theta)+(\nabla_\theta \ell_p)^T \delta\theta = \varepsilon_p$, for the batch of the plurality of samples, with $\ell_p(\theta)$ representing the loss associated with a particular parameter $\theta$ for a sample p, $\nabla_\theta \ell_p$ denoting a gradient of the loss function with respect to $\theta$, $\delta\theta$ signifying a parameter update, and $\varepsilon_p$ representing an error term that is minimized through at least one of least squares and one or more variants of the least squares, wherein the at least one Sifr equation forms the foundation for calculating the at least one Sifr update.

4. The method of claim 1, wherein the obtaining of the at least one curvature data comprises:

performing a Gram-backpropagation for the batch based on traversing the neural network model during the one or more backward passes; and obtaining the Gram matrix for the batch based on the performing of the Gram-backpropagation, wherein the obtaining of the at least one Sifr update is further based on the Gram matrix.

5. The method of claim 4, wherein the performing of the Gram-backpropagation comprises:

creating one or more partial Gram matrices for each of the plurality of layers based on the executing of the one or more backward passes; and sum reducing, aggregating, and performing an operation to the one or more partial Gram matrices of each of the plurality of layers based on the creating of the one or more partial Gram matrices, wherein the operation is similar to the sum reducing and the aggregating, wherein the obtaining of the Gram matrix is further based on the sum reducing, the aggregating, and the performing of the operation to the one or more partial Gram matrices.

6. The method of claim 1, wherein the determining of the plurality of values comprising one or more values for the plurality of parameters comprising one or more network parameters further comprises:

obtaining at least one preliminary Sifr update using a selected curvature information associated with the at least one curvature data, wherein the obtaining of the at least one preliminary Sifr update comprises employing at least one of the covariance matrix and the one or more feasible approximations of the covariance matrix, and the Gram matrix and the one or more feasible approximations of the Gram Matrix, wherein the employing is contingent upon an availability of computational resources, wherein a representation of a curvature is refined by utilizing a historical curvature data with an introduction of damping as needed to maintain an invertibility of the at least one curvature data;

refining the at least one preliminary Sifr update by potentially incorporating the historical curvature data through one or more momentum strategies or performing one or more Sifr update calculations in line with one or more acceleration schemes to facilitate a rapid convergence and an improved optimization efficiency; and selecting a step size for the at least one Sifr update, typically adhering to a unity step size characteristic of a second-order optimizer, while also allowing for an application of a step-size search algorithm to enhance a training efficacy as required.

7. The method of claim 1 further comprises:

determining at least one constraint on at least one resource available for the training of the neural network model; and determining at least one variable associated with the training of the neural network model based on the determining of the at least one constraint, wherein at least one of the providing of the input and the determining of the plurality of values for the plurality of parameters is based on the determining of the at least one variable.

8. The method of claim 1 further comprises:

determining at least one characteristic associated with a convergence of the neural network model based on the loss function; and determining at least one variable associated with the training of the neural network model based on the determining of the at least one characteristic, wherein at least one of the providing of the input and the determining of the plurality of values for the plurality of parameters is based on the determining of the at least one variable.

9. A method for training a neural network model having a plurality of layers comprising an input layer, at least one middle layer, one or more output layers, and a plurality of parameters commonly referred to as weights and biases, the method comprising:
providing an input to the input layer, wherein the input corresponds to each of a plurality of samples comprised in a batch from a training dataset;
obtaining one or more outputs from the neural network model based on the input;
calculating a loss function for each of the plurality of samples comprised in the batch based on the one or more outputs and one or more corresponding desired values for each of the plurality of samples comprised in the batch; and
determining a plurality of values for the plurality of parameters based on the loss function, wherein the plurality of values for the plurality of parameters minimizes a mismatch between the one or more outputs and the one or more corresponding desired values across the plurality of samples comprised in the batch, wherein the determining of the plurality of values for the plurality of parameters comprises:
executing at least one of one or more forward passes and one or more backward passes through the neural network model;
obtaining at least one curvature data based on the executing of at least one of the one or more forward passes and the one or more backward passes, wherein the obtaining of the at least one curvature data comprises:
performing a Gram-backpropagation for the batch based on traversing the neural network model during the one or more backward passes; and
obtaining a Gram matrix for the batch based on the performing of the Gram-backpropagation; and
obtaining at least one Sifr update based on the at least one curvature data, wherein the obtaining of the at least one Sifr update is further based on the Gram matrix, wherein the determining of the plurality of values for the plurality of parameters is further based on the at least one Sifr update.

10. The method of claim 9, wherein the performing of the Gram-backpropagation comprises:
creating one or more partial Gram matrices for each of the plurality of layers based on the executing of the one or more backward passes; and
sum reducing, aggregating, and performing an operation to the one or more partial Gram matrices of each of the plurality of layers based on the creating of the one or more partial Gram matrices, wherein the operation is similar to the sum reducing and the aggregating, wherein the obtaining of the Gram matrix is further based on the sum reducing, the aggregating, and the performing of the operation to the one or more partial Gram matrices.

11. A neural network model comprising a plurality of layers comprising an input layer, at least one middle layer, one or more output layers, and a plurality of parameters commonly referred to as weights and biases, wherein the neural network model is trained using a method, wherein the method comprises:
providing an input to the input layer, wherein the input corresponds to each of a plurality of samples comprised in a batch from a training dataset;
obtaining one or more outputs from the neural network model based on the input;
calculating a loss function for each of the plurality of samples comprised in the batch based on the one or more outputs and one or more corresponding desired values for each of the plurality of samples comprised in the batch; and
determining a plurality of values for the plurality of parameters based on the loss function, wherein the plurality of values for the plurality of parameters minimizes a mismatch between the one or more outputs and the one or more corresponding desired values across the plurality of samples comprised in the batch, wherein the determining of the plurality of values for the plurality of parameters comprises:
executing at least one of one or more forward passes and one or more backward passes through the neural network model;
obtaining at least one curvature data based on the executing of at least one of the one or more forward passes and the one or more backward passes, wherein the at least one curvature data comprises at least one of a covariance matrix and a Gram matrix of per-sample gradients, wherein the at least one curvature data further comprises one or more feasible approximations of at least one of the covariance matrix and the Gram matrix, wherein the one or more feasible approximations comprises at least one of diagonal matrices and block-diagonal matrices;
obtaining at least one Sifr update based on the at least one curvature data, wherein the determining of the plurality of values for the plurality of parameters is further based on the at least one Sifr update, wherein the at least one curvature data informs a computation of the at least one Sifr update; and
resolving at least one Sifr equation based on the at least one curvature data, wherein the obtaining of the at least one Sifr update is further based on the resolving of the at least one Sifr equation.

12. The neural network model of claim 11, wherein the obtaining of the at least one curvature data is further based on the at least one Sifr equation, wherein the at least one curvature data aligns with at least one resolution method for the resolving of the at least one Sifr equation.

13. The neural network model of claim 1, wherein the at least one Sifr equation is $\ell_p(\theta)+(\nabla_\theta \ell_p)^T \delta\theta = \varepsilon_p$, for the batch of the plurality of samples, with $\ell_p(\theta)$ representing the loss associated with a particular parameter $\theta$ for a sample p, $\nabla_\theta \ell_p$ denoting a gradient of the loss function with respect to $\theta$, $\delta\theta$ signifying a parameter update, and $\varepsilon_p$ representing an error term that is minimized through at least one of least squares and one or more variants of the least squares, wherein the at least one Sifr equation forms the foundation for calculating the at least one Sifr update.

14. The neural network model of claim 11, wherein the obtaining of the at least one curvature data comprises:
performing a Gram-backpropagation for the batch based on traversing the neural network model during the one or more backward passes; and
obtaining the Gram matrix for the batch based on the performing of the Gram-backpropagation, wherein the obtaining of the at least one Sifr update is further based on the Gram matrix.

15. The neural network model of claim 14, wherein the performing of the Gram-backpropagation comprises:
creating one or more partial Gram matrices for each of the plurality of layers based on the executing of the one or more backward passes; and sum reducing, aggregating, and performing an operation to the one or more partial Gram matrices of each of the plurality of layers based on the creating of the one or more partial Gram matrices, wherein the operation is similar to the sum reducing and the aggregating, wherein the obtaining of the Gram matrix is further based on the sum reducing, the aggregating, and the performing of the operation to the one or more partial Gram matrices.

16. The neural network model of claim 11, wherein the determining of the plurality of values comprising one or more values for the plurality of parameters comprising one or more network parameters further comprises:

obtaining at least one preliminary Sifr update using a selected curvature information associated with the at least one curvature data, wherein the obtaining of the at least one preliminary Sifr update comprises employing at least one of the covariance matrix and the one or more feasible approximations of the covariance matrix, and the Gram matrix and the one or more feasible approximations of the Gram Matrix, wherein the employing is contingent upon an availability of computational resources, wherein a representation of a curvature is refined by utilizing a historical curvature data with an introduction of damping as needed to maintain an invertibility of the at least one curvature data;

refining the at least one preliminary Sifr update by potentially incorporating the historical curvature data through one or more momentum strategies or performing one or more Sifr update calculations in line with one or more acceleration schemes to facilitate a rapid convergence and an improved optimization efficiency; and selecting a step size for the at least one Sifr update, typically adhering to a unity step size characteristic of a second-order optimizer, while also allowing for a application of a step-size search algorithm to enhance a training efficacy as required.

17. The neural network model of claim 11, wherein the method further comprises:

determining at least one constraint on at least one resource available for the training of the neural network model; and determining at least one variable associated with the training of the neural network model based on the determining of the at least one constraint, wherein at least one of the providing of the input and the determining of the plurality of values for the plurality of parameters is based on the determining of the at least one variable.

18. The neural network model of claim 11, wherein the method further comprises:

determining at least one characteristic associated with a convergence of the neural network model based on the loss function; and determining at least one variable associated with the training of the neural network model based on the determining of the at least one characteristic, wherein at least one of the providing of the input and the determining of the plurality of values for the plurality of parameters is based on the determining of the at least one variable.

\* \* \* \* \*